(12) United States Patent
Suzuki et al.

(10) Patent No.: US 8,970,949 B2
(45) Date of Patent: Mar. 3, 2015

(54) OPTICAL BODY WITH SUPPRESSED CHANGE IN COLOR TONE AND WINDOW MEMBER, FITTING, AND SOLAR SHADING INCLUDING THE OPTICAL BODY

(75) Inventors: Masaki Suzuki, Miyagi (JP); Tsutomu Nagahama, Miyagi (JP); Hiroya Takenaka, Miyagi (JP); Masashi Enomoto, Tokyo (JP)

(73) Assignee: Dexerials Corporation, Tokyo (JP)

( * ) Notice: Subject to any disclaimer, the term of this patent is extended or adjusted under 35 U.S.C. 154(b) by 281 days.

(21) Appl. No.: 13/155,620

(22) Filed: Jun. 8, 2011

(65) Prior Publication Data
US 2012/0140316 A1    Jun. 7, 2012

(30) Foreign Application Priority Data

Jun. 16, 2010 (JP) ................................ P2010-137784

(51) Int. Cl.
*F21V 9/04* (2006.01)
*G02B 5/20* (2006.01)

(52) U.S. Cl.
CPC ...................................... *G02B 5/208* (2013.01)
USPC ............................ 359/360; 359/359; 359/634

(58) Field of Classification Search
USPC ......... 359/359–360, 629, 634, 639, 601, 602, 359/608, 609, 589, 590, 529–530; 427/162, 427/163.4
See application file for complete search history.

(56) References Cited

U.S. PATENT DOCUMENTS

| 3,257,486 A | | 6/1966 | Luboshez |
| 3,867,175 A | * | 2/1975 | Dornte .......................... 428/412 |
| 5,071,206 A | * | 12/1991 | Hood et al. ................... 359/360 |
| 5,091,258 A | | 2/1992 | Moran |

(Continued)

FOREIGN PATENT DOCUMENTS

| GB | 2051675 A | 1/1981 |
| JP | 2007-152773 | 6/2007 |

(Continued)

OTHER PUBLICATIONS

European Patent Office, Extended European Search Report, issued in connection with European Patent Application No. 11004728.9, mailed on Oct. 31, 2011. (7 pages).
Written Opinion and Search Report issued Jan. 31, 2012, for corresponding Singapore Appln. No. 201104223-1.

*Primary Examiner* — Arnel C Lavarias
(74) *Attorney, Agent, or Firm* — Oliff PLC

(57) ABSTRACT

An optical body includes a first optical layer having a concave-convex surface, a wavelength-selective reflecting layer formed on the concave-convex surface, and a second optical layer formed on the wavelength-selective reflecting layer to embed the concave-convex surface, the wavelength-selective reflecting layer having a multilayer structure formed by successively stacking at least a first high refractive index layer, a metal layer, and a second high refractive index layer, wherein, given that optical film thicknesses of the first high refractive index layer and the second high refractive index layer are x and y, respectively, and a geometrical film thickness of the metal layer is z, x, y and z satisfy the following formula (1):

$$z \leq 12.1 \exp\left\{-\frac{1}{2}\left(\frac{x-120}{145.17}\right)^2 - \frac{1}{2}\left(\frac{y-120}{123.14}\right)^2\right\} \quad (1)$$

25 Claims, 36 Drawing Sheets

(56) References Cited

U.S. PATENT DOCUMENTS

| | | | |
|---|---|---|---|
| 5,880,886 A | 3/1999 | Milner | |
| 6,311,437 B1 | 11/2001 | Lorenz | |
| 8,199,406 B2 * | 6/2012 | Takenaka et al. | 359/634 |
| 2003/0161997 A1 | 8/2003 | Moran | |
| 2009/0185265 A1 * | 7/2009 | Myers | 359/350 |
| 2011/0222145 A1 | 9/2011 | Ito | |

FOREIGN PATENT DOCUMENTS

| | | |
|---|---|---|
| WO | 2007005357 | 1/2007 |
| WO | WO 2007005357 A1 * | 1/2007 |
| WO | 2007/044814 A1 | 4/2007 |
| WO | 2008/065962 A1 | 6/2008 |
| WO | 2009146371 | 12/2009 |

* cited by examiner

INNER SIDE    OUTER SIDE 4 3 5

4 3 5

OPTICAL BODY WITH SUPPRESSED CHANGE IN COLOR TONE AND WINDOW MEMBER, FITTING, AND SOLAR SHADING INCLUDING THE OPTICAL BODY

CROSS REFERENCES TO RELATED APPLICATIONS

The present application claims priority Japanese Priority Patent Application JP 2010-137784 filed in the Japan Patent Office on Jun. 16, 2010, the entire contents of which are hereby incorporated by reference.

BACKGROUND

The present application relates to an optical body, a window member, a fitting, and a solar shading device, which can suppress change in color tone.

Recently, there have been increased the cases of coating layers for partly absorbing or reflecting the sunlight on architectural glasses for high-rise buildings and housings, vehicular window glasses, etc. Such a trend represents one of energy-saving measures with the view of preventing global warming, and it is intended to reduce a load of cooling equipment, which is increased with solar energy, i.e., the sunlight, entering the indoor through windows and raising the indoor temperature. Optical energy incoming from the sun is primarily given by light in a visible range at wavelengths of 380 to 780 nm and light in a near infrared range at wavelengths of 780 to 2100 nm. Because transmittance of the light in the latter near infrared range through windows is unrelated to visibility of human eyes, the transmittance of the near infrared light is an important factor affecting the performance that is to be provided by a window having high transparency and a high thermal shielding ability.

As an example of methods for cutting off the light in the near infrared range while maintaining transparency to the light in the visible range, there is a method of providing, on a window glass, an optical body having a high reflectance in the near infrared range. With regards to such a method, a technique using, as a reflecting layer, an optical multilayer film is disclosed (see, e.g., Japanese Unexamined Patent Application Publication No. 2007-152773). However, the reflecting layer used in the disclosed technique is formed on a flat film or a flat window glass, and the incident sunlight is just specularly (regularly) reflected. Therefore, the light incoming from the sky and specularly reflected by the flat film or window glass reaches other buildings and the ground in the nearby outside where the light is absorbed and converted to heat, thus raising the ambient temperature. Accordingly, a local temperature rise occurs in the surroundings of a building in which all windows are coated with the above-mentioned type of reflecting layer. This gives rise to the problems that, in urban areas, a heat island phenomenon is accelerated and grass does not grow in areas irradiated with the reflected light.

SUMMARY

It is desirable to provide an optical body, a window member, a fitting, and a solar shading device, which can selectively directionally reflect light in a specific wavelength band while transmitting light other than the specific wavelength band therethrough.

As a result of conducting intensive studies with the view of solving the above-mentioned problems in the related art, the inventors have found an optical body in which a wavelength-selective reflecting layer is formed on an optical layer having a three-dimensional shape.

In such an optical body, however, the wavelength-selective reflecting layer is formed on a sloped surface. Therefore, if that type of optical body is fabricated by applying the ordinary design technique, as it is, with which a heat-ray cutoff film is designed by forming a multilayer film on a flat plate, the spectrum of reflected light deviates from the designed one, whereby a color tone of the reflected light is changed in such a way that the reflected light becomes reddish or bluish.

As a result of conducting intensive studies with the view of avoiding the reflected light becoming reddish or bluish, the inventors have found that the change in color tone can be suppressed by setting film thicknesses of layers in a multilayer film, which constitute a wavelength-selective reflecting layer, so as to satisfy one or more predetermined relational expressions.

According to one embodiment of the present application, there is provided an optical body including a first optical layer having a concave-convex surface, a wavelength-selective reflecting layer formed on the concave-convex surface, and a second optical layer formed on the wavelength-selective reflecting layer to embed the concave-convex surface, the wavelength-selective reflecting layer having a multilayer structure formed by successively stacking at least a first high refractive index layer, a metal layer, and a second high refractive index layer, wherein, given that optical film thicknesses of the first high refractive index layer and the second high refractive index layer are x and y, respectively, and a geometrical film thickness of the metal layer is z, x, y and z satisfy the following formula (1):

$$z \le 12.1 \exp\left\{-\frac{1}{2}\left(\frac{x-120}{145.17}\right)^2 - \frac{1}{2}\left(\frac{y-120}{123.14}\right)^2\right\} \quad (1)$$

According to another embodiment of the present application, there is provided an optical body including a first optical layer having a concave-convex surface, a wavelength-selective reflecting layer formed on the concave-convex surface, and a second optical layer formed on the wavelength-selective reflecting layer to embed the concave-convex surface, the wavelength-selective reflecting layer having a multilayer structure formed by successively stacking at least a first high refractive index layer, a metal layer, and a second high refractive index layer, wherein, given that optical film thicknesses of the first high refractive index layer and the second high refractive index layer are x and y, respectively, and a geometrical film thickness of the metal layer is z, x, y and z satisfy the following formula (2):

$$z \le 12.2 \exp\left\{-\frac{1}{4}\left(\frac{x-y}{62.71}\right)^2 - \frac{1}{2}\left(\frac{0.70(x+y)-120}{99.41}\right)^2\right\} \quad (2)$$

According to still another embodiment of the present application, there is provided an optical body including a first optical layer having a concave-convex surface, a wavelength-selective reflecting layer formed on the concave-convex surface, and a second optical layer formed on the wavelength-selective reflecting layer to embed the concave-convex surface, the wavelength-selective reflecting layer having a multilayer structure formed by successively stacking at least a first high refractive index layer, a metal layer, and a second high refractive index layer, wherein, given that optical film thicknesses of the first high refractive index layer and the second high refractive index layer are x and y, respectively, and a geometrical film thickness of the metal layer is z, x, y and z satisfy the following formulae (1) and (2):

$$z \le 12.1\exp\left\{-\frac{1}{2}\left(\frac{x-120}{145.17}\right)^2 - \frac{1}{2}\left(\frac{y-120}{123.14}\right)^2\right\} \quad (1)$$

$$z \le 12.2\exp\left\{-\frac{1}{4}\left(\frac{x-y}{62.71}\right)^2 - \frac{1}{2}\left(\frac{0.70(x+y)-120}{99.41}\right)^2\right\} \quad (2)$$

With the embodiments of the present application, a redness index value is held in a predetermined range by selecting x, y and z so as to satisfy the foregoing formula (1). A blueness index value is held in a predetermined range by selecting x, y and z so as to satisfy the foregoing formula (2). Further, the redness index value and the blueness index value are both held in the predetermined ranges by selecting x, y and z so as to satisfy the foregoing formulae (1) and (2).

Thus, the change in color tone is suppressed by properly selecting x, y and z, namely by properly setting the film thicknesses of layers in the multilayer structure of the wavelength-selective reflecting layer.

With the embodiments of the present application, the change in color tone depending on an incident angle can be suppressed.

Additional features and advantages are described herein, and will be apparent from the following Detailed Description and the figures.

DETAILED DESCRIPTION

Embodiments of the present application will be described below in detail with reference to the drawings.

1. First embodiment (in which structures are arrayed in a one-dimensional pattern)
2. Second embodiment (in which structures are arrayed in a two-dimensional pattern)
3. Third embodiment (in which a reflecting layer is disposed in the form of a louver)
4. Fourth embodiment (in which an optical film includes a light scatterer)
5. Fifth embodiment (in which the reflecting layer is exposed)
6. Sixth embodiment (in which an optical film includes a self-cleaning effect layer)
7. Seventh embodiment (in which the optical film is applied to a window blind (shade))
8. Eighth embodiment (in which the optical film is applied to a rolling screen device)
9. Ninth embodiment (in which the optical film is applied to a fitting)

1. First Embodiment
Construction of Optical Film

Figure 1A:
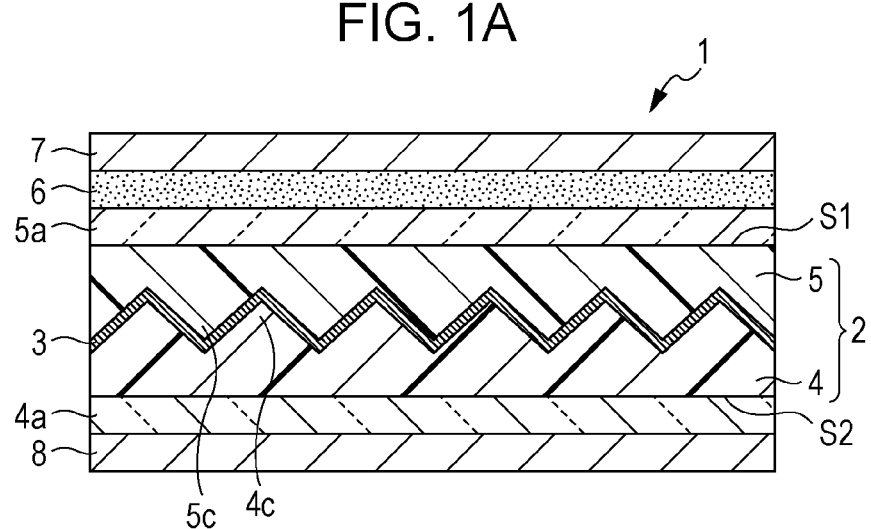
FIG. 1A is a sectional view illustrating one example of construction of an optical film according to a first embodiment of the present application.
Figure 1B:
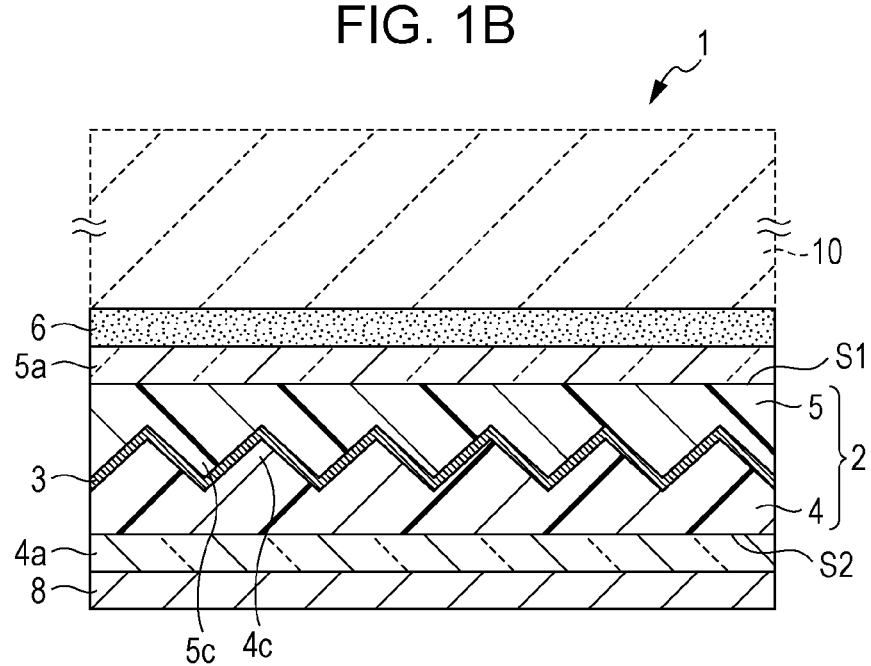
FIG. 1B is a sectional view illustrating an example in which the optical film according to the first embodiment of the present application is affixed to an adherend (affixing target)

FIG. 1A is a sectional view illustrating one example of construction of an optical film 1 according to a first embodiment of the present application, and FIG. 1B is a sectional view illustrating an example in which the optical film according to the first embodiment of the present application is affixed to an adherend (affixing target). The optical film 1, as one form of an optical body, is an optical film having the so-called directional reflective property. As illustrated in FIG. 1A, the optical film 1 includes an optical layer 2 having an interface formed therein in a concave-convex shape, and a reflecting layer 3 formed at the interface in the optical layer 2. The optical layer 2 includes a first optical layer 4 having a first surface in a concave-convex shape, and a second optical layer 5 having a second surface in a concave-convex shape. The interface in the optical layer 2 is formed by the first concave-convex surface and the second concave-convex surface, which are arranged to face each other. Stated another way, the optical film 1 includes the first optical layer 4 having a concave-convex surface, the reflecting layer 3 formed on the concave-convex surface of the first optical layer 4, and the second optical layer 5 formed on the reflecting layer 3 so as to embed the concave-convex surface on which the reflecting layer 3 is formed. The optical film 1 has an incident surface S1 on which light, such as the sunlight, is incident, and an emergent surface S2 from which part of the light incident on the incident surface S1 emerges, the part having passed through the optical film 1. The optical film 1 is suitably applied to inner wall members, outer wall members, window members, wall materials, and so on. Further, the optical film 1 is suitably applied to a slat (one example of a solar shading member) of a window blind (shade) and a screen (another example of the solar shading member) of a rolling screen device. Moreover, the optical film 1 is suitably employed as an optical body that is disposed in a lighting portion of a fitting (i.e., an interior member or an exterior member), such as a shoji (i.e., a paper-made and/or glass-fitted sliding door).

The optical film 1 may further include a first base 4a, when necessary, on the emergent surface S2 of the optical layer 2. The optical film 1 may further include a second base 5a, when necessary, on the incident surface S1 of the optical layer 2. When the optical film 1 includes the first base 4a and/or the second base 5a, optical characteristics described later, such as transparency and color of the transmitted light, are preferably satisfied in a state where the optical film 1 includes the first base 4a and/or the second base 5a.

The optical film 1 may further include an affixing layer 6, when necessary. The affixing layer 6 is formed on one of the incident surface S1 and the emergent surface S2 of the optical film 1, which is to be affixed to a window member 10. Thus, the optical film 1 is affixed to the indoor or outdoor side of the window member 10, i.e., the adherend, with the affixing layer 6 interposed therebetween. The affixing layer 6 can be formed, for example, as a bonding layer containing a bond (e.g., a UV-cured resin or a two-liquid mixed resin) as a main component, or as an adhesive layer containing an adhesive (e.g., a PSA (Pressure Sensitive Adhesive)) as a main component. When the affixing layer 6 is the adhesive layer, a peel-off layer 7 is preferably further formed on the affixing layer 6. This enables the optical film 1 to be easily affixed, just by peeling off the peel-off layer 7, to the adherend, e.g., the window member 10, with the affixing layer 6 interposed therebetween.

From the viewpoint of increasing adhesion between the second base 5a and one or both of the affixing layer 6 and the second optical layer 5, the optical film 1 may further include a primer layer (not shown) between the second base 5a and one or both of the affixing layer 6 and the second optical layer 5. Also, from the viewpoint of increasing adhesion at the same location(s), it is preferable to carry out ordinary physical pretreatment instead of or in addition to forming the primer layer. The ordinary physical pretreatment includes, e.g., plasma treatment or corona treatment.

The optical film 1 may further include a barrier layer (not shown) on one of the incident surface S1 and the emergent surface S2, which one is affixed to the adherend, e.g., the window member 10, or between that one surface and the reflecting layer 3. With the presence of the barrier layer, it is possible to reduce diffusion of moisture toward the reflecting layer 3 from the incident surface S1 or the emergent surface S2 and to suppress deterioration of a metal, etc. contained in the reflecting layer 3. Accordingly, durability of the optical film 1 can be improved.

The optical film 1 may further include a hard coat layer 8 from the viewpoint of giving the surface of the optical film 1 with resistance against excoriation, scratching, etc. The hard coat layer 8 is preferably formed on one of the incident surface S1 and the emergent surface S2 of the optical film 1, which one is positioned on the opposite side to the surface affixed to the adherend, e.g., the window member 10. A water-repellent or hydrophilic layer may be further formed on the incident surface S1 of the optical film 1 from the viewpoint of providing an antifouling property, etc. The layer having such a function may be formed, for example, directly on the optical layer 2 or on one of various functional layers such as the hard coat layer 8.

The optical film 1 preferably has flexibility from the viewpoint of enabling the optical film 1 to be easily affixed to the adherend, e.g., the window member 10. Herein, the term "film" is to be construed as including a sheet. In other words, the optical film 1 includes an optical sheet as well.

The optical film 1 preferably has transparency. The transparency preferably falls within a later-described range of transmission image clarity. The difference in refractive index between the first optical layer 4 and the second optical layer 5 is preferably 0.010 or less, more preferably 0.008 or less, and even more preferably 0.005 or less. If the difference in refractive index exceeds 0.010, a transmission image tends to blur in appearance. When the difference in refractive index is more than 0.008 and not more than 0.010, there are no problems in daily life though depending on outdoor brightness. When the difference in refractive index is more than 0.005 and not more than 0.008, the outdoor sight can be clearly viewed although only a very bright object, such as a light source, causes a displeasing diffraction pattern. When the difference in refractive index is 0.005 or less, the diffraction pattern is hardly displeasing. One of the first optical layer 4 and the second optical layer 5, which one is positioned on the side affixed to, e.g., the window member 10, may contain an adhesive as a main component. With such a feature, the optical film 1 can be affixed to, e.g., the window member 10 by direct attachment of the first optical layer 4 or the second optical layer 5 that contains the adhesive as a main component. In that case, the difference in refractive index with respect to the adhesive is preferably held in the above-described range.

The first optical layer 4 and the second optical layer 5 preferably have the same optical characteristics, such as the refractive index. More specifically, the first optical layer 4 and the second optical layer 5 are preferably made of the same material, e.g., the same resin material, having transparency in the visible range. By using the same material to form the first optical layer 4 and the second optical layer 5, the refractive indexes of both the optical layers are equal to each other, and hence transparency to visible light can be improved. However, care is to be paid to such a point that, even when the starting material is the same, the refractive indexes of finally formed layers may differ from each other depending on, e.g., curing conditions in a film forming process. On the other hand, when the first optical layer 4 and the second optical layer 5 are made of different materials, a transmission image tends to blur for the reason that light is refracted at the reflecting layer 3, which provides a boundary, due to the difference in refractive index between the optical layers 4 and 5. In particular, there is a tendency that when observing an object analogous to a point light source, such as a lamp at a far distance, a diffraction pattern is conspicuously observed. Note that, in order to adjust a value of the refractive index, an additive may be mixed in the first optical layer 4 and/or the second optical layer 5.

The first optical layer 4 and the second optical layer 5 preferably have transparency in the visible range. Herein, the term "transparency" is defined as having two meanings, i.e., as not absorbing light and not scattering light. When the term "transparency" is generally used, it often implies the former meaning alone. However, the optical film 1 according to the first embodiment preferably has the transparency in both the meanings. A currently employed retroreflector is intended to visually confirm light reflected from road signs, clothes for night workers, etc. to provide a noticeable indication. Therefore, even when the retroreflector has a scattering property, light reflected from an underlying reflector can be visually observed if the retroreflector is in close contact with the underlying reflector. Such a phenomenon is based on the same principle as that an image can be visually confirmed even when antiglare treatment providing a scattering property is applied to a front surface of an image display for the purpose of imparting an antiglare property. In contrast, the optical film 1 according to the first embodiment preferably does not scatter light for the reason that the optical film 1 is featured in transmitting light other than the directionally reflected light of specific wavelengths, and that the optical film 1 is affixed to a transmissive member transmitting light primarily at transmission wavelengths, thus allowing the transmitted light to be observed. Depending on usage, however, the second optical layer 5 may be intentionally provided with the scattering property.

The optical film 1 is preferably used in such a way that it is affixed to a rigid member, e.g., the window member 10, which has transmissivity primarily to the light having passed through the optical film and falling in bands other than the specific wavelengths, with, e.g., an adhesive interposed therebetween. Examples of the window member 10 include architectural window members for high-rise buildings, housings, etc. and window members for vehicles. When the optical film 1 is applied to the architectural window members, it is preferably applied to the window member 10 that is oriented to face in some direction within a range, in particular, from east to south and further to west (e.g., within a range from southeast to southwest). This is because, by applying the optical film 1 to the window member 10 oriented as mentioned above, heat rays can be more effectively reflected. The optical film 1 can be applied to not only a single-layer window glass, but also a special glass, such as a multilayer glass. Further, the window member 10 is not limited to a glass-made member, and it may be a member made of a high polymeric material having transparency. The optical layer 2 preferably has transparency in the visible range. The reason is that, with the optical layer 2 having transparency in the visible range, when the optical film 1 is affixed to the window member 10, e.g., the window glass, visible light is allowed to pass through the optical film 1 and lighting with the sunlight can be ensured. The optical film 1 may be affixed to not only an inner surface of a glass pane, but also an outer surface thereof.

Further, the optical film 1 can be used in combination with an additional heat-ray cutoff film. For example, a light absorption coating may be disposed at the interface between air and the optical film 1 (i.e., on the outermost surface of the optical film 1). Still further, the optical film 1 can be used in combination with a hard coat layer, an ultraviolet cutoff layer, a surface anti-reflection layer, etc. When one or more of those functional layers are used in a combined manner, the functional layer(s) is preferably disposed at the interface between the optical film 1 and air. However, the ultraviolet cutoff layer is to be disposed on the side closer to the sun than the optical film 1. Thus, particularly when the optical film 1 is affixed to an inner surface of the window glass on the side facing the interior of a room, the ultraviolet cutoff layer is desirably disposed between the inner surface of the window glass and the optical film 1. In that case, an ultraviolet absorber may be mixed in an affixing layer between the inner surface of the window glass and the optical film 1.

Depending on the usage of the optical film 1, the optical film 1 may be colored to have a visually attractive design. When the visually attractive design is given to the optical film 1, it is preferable that at least one of the first optical layer 4 and the second optical layer 5 absorbs primarily light in a particular wavelength band within the visible range to such an extent as not reducing transparency.

Figure 2:
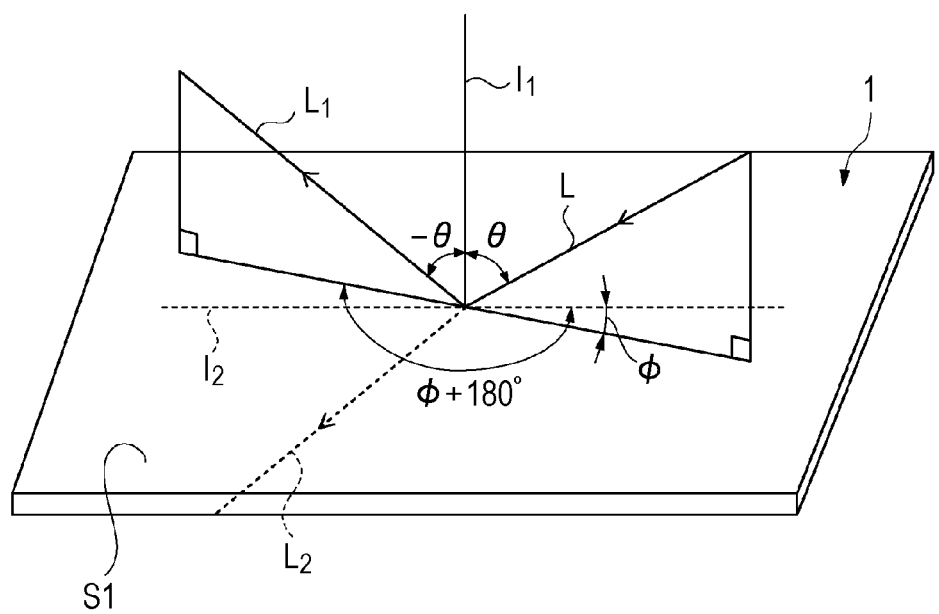
FIG. 2 is a perspective view illustrating the relationship between incident light that is incident on the optical film and reflected light that is reflected by the optical film.

FIG. 2 is a perspective view illustrating the relationship between incident light that is incident on the optical film 1 and reflected light that is reflected by the optical film 1. The optical film 1 has the incident surface S1 on which light L is incident. It is preferable that, of the light L entering the incident surface S1 at an incident angle ($\theta$, $\phi$), the optical film 1 selectively directionally reflects light $L_1$ in a specific wavelength band in a direction other than a specular reflection direction ($-\theta$, $\phi+180°$) while transmitting light $L_2$ other than the specific wavelength band therethrough. Also, the optical film 1 has transparency to the light other than the specific wavelength band. The transparency preferably falls within the later-described range of transmission image clarity. Herein, $\theta$ is an angle formed by a perpendicular line $l_1$ with respect to the incident surface S1 and the incident light L or the reflected light $L_1$. Also, $\phi$ is an angle formed by a specific linear line $l_2$ in the incident surface S1 and a component resulting from projecting the incident light L or the reflected light $L_1$ to the incident surface S1. The specific linear line $l_2$ in the incident surface S1 implies an axis in which the reflection intensity is maximized in the direction $\phi$ when the optical film 1 is rotated about an axis provided by the perpendicular line $l_1$ with respect to the incident surface S1 of the optical film 1 while the incident angle ($\theta$, $\phi$) is held fixed (see FIGS. 3A to 3C and FIGS. 4A and 4B). When there are plural axes (directions) in which the reflection intensity is maximized, one of those axes is selected as the linear line $l_2$. Further, an angle $\theta$ rotated clockwise from the perpendicular line $l_1$ as a reference is defined as "+$\theta$", and an angle $\theta$ rotated counterclockwise from the perpendicular line $l_1$ is defined as "−$\theta$". An angle $\phi$ rotated clockwise from the linear line $l_2$ as a reference is defined as "+$\phi$", and an angle $\phi$ rotated counterclockwise from the linear line $l_2$ is defined as "−$\phi$".

The light in the specific wavelength band, which is to be selectively directionally reflected, and the light other than the specific wavelength band to be transmitted are set differently depending on the usage of the optical film 1. For example, when the optical film 1 is applied to the window member 10, the light in the specific wavelength band, which is to be selectively directionally reflected, is preferably near infrared light and the transmitted light other than the specific wavelength band is preferably visible light. In more detail, the light in the specific wavelength band, which is to be selectively directionally reflected, is preferably near infrared light primarily falling in a wavelength band of 780 nm to 2100 nm. By reflecting the near infrared light, a temperature rise inside a building can be suppressed when the optical film 1 is affixed to the window member 10 such as the window glass. Accordingly, a cooling load can be reduced and energy saving can be achieved. Herein, the expression "directionally reflect" implies that light is reflected in a particular direction other than the specular reflection direction and the intensity of the reflected light is sufficiently stronger than the intensity of light diffusely reflected with no directionality. Also, the expression "reflect" implies that the reflectance in a specific wavelength band, e.g., in the near infrared range, is preferably 30% or more, more preferably 50% or more, and even more preferably 80% or more. Further, the expression "transmit" implies that the transmittance in a specific wavelength band, e.g., in the visible range, is preferably 30% or more, more preferably 50% or more, and even more preferably 70% or more.

A direction $\phi_o$ in which the incident light is directionally reflected by the optical film 1 is preferably in the range of −90° or more to 90° or less. On such a condition, when the optical film 1 is affixed to the window member 10, it can return, of the light incoming from the sky, the light in the specific wavelength band toward the sky. When there are no high-rise buildings in the surroundings, the optical film 1 directionally reflecting the incident light in the above-mentioned range is usefully employed. Further, the direction of the directional reflection is preferably in the vicinity of ($\theta$, −$\phi$). The expression "vicinity" implies that a deviation in the direction of the directional reflection is preferably within 5 degrees, more preferably within 3 degrees, and even more preferably within 2 degrees with respect to ($\theta$, −$\phi$). The reason is that, by setting the direction of the directional reflection as described above, when the optical film 1 is affixed to the window member 10, it can efficiently return, of the light incoming from the sky above buildings standing side by side at substantially the same height, the light in the specific wavelength band toward the sky above the other buildings. In order to realize such directional reflection, it is preferable, for example, to employ a three-dimensional structure that is formed by using not only a part of a spherical surface or a hyperbolic surface, but also a triangular pyramid, a quadrangular pyramid, or a circular cone. The light incoming in the direction ($\theta$, $\phi$) (−90°<$\phi$<90°) can be reflected in a direction ($\theta_o$, $\phi_o$) (0°<$\theta_o$<90° and −90°<$\phi_o$<90°) in accordance with the shape of the three-dimensional structure. As an alternative, the three-dimensional structure may have a pillar-like shape extending in one direction. In that case, the light incoming in the direction ($\theta$, $\phi$) (−90°<$\phi$<90°) can be reflected in a direction ($\theta_o$, −$\phi_o$) (0°<$\theta_o$<90°) in accordance with a slope angle of the pillar-like shape.

The light in the specific wavelength band is preferably directionally reflected by the optical film 1 in a direction in the vicinity of the direction of retroreflection. In other words, with respect to the light incident on the incident surface S1 at the incident angle ($\theta$, $\phi$), the direction of the reflection of the light in the specific wavelength band is preferably in the vicinity of ($\theta$, $\phi$). The reason is that when the optical film 1 is affixed to the window member 10, it can return, of the light incoming from the sky, the light in the specific wavelength band toward the sky. Herein, the expression "vicinity" implies that a deviation in the direction of the directional reflection is preferably within 5 degrees, more preferably within 3 degrees, and even more preferably within 2 degrees. By setting the direction of the directional reflection as described above, when the optical film 1 is affixed to the window member 10, it can efficiently return, of the light incoming from the sky, the light in the specific wavelength band toward the sky. In the case of, e.g., an infrared sensor or an infrared image pickup device where an infrared light emitting unit and a light receiving unit are arranged adjacent to each other, the direction of retroreflection is to be set aligned with the incident direction. However, when sensing in a specific direction is not performed as in the embodiments of the present application, the direction of retroreflection and the incident direction may be set not so exactly aligned with each other.

A value of the transmission image clarity in the wavelength band where the optical film 1 has transmissivity is preferably 50 or larger, more preferably 60 or larger, and even more preferably 75 or larger when an optical comb with a comb width of 0.5 mm is used. If the value of the transmission image clarity is smaller than 50, a transmission image tends to blur in appearance. When the value of the transmission image clarity is not smaller than 50 and smaller than 60, there are no problems in daily life though depending on outdoor brightness. When the value of the transmission image clarity is not smaller than 60 and smaller than 75, the outdoor sight can be clearly viewed although only a very bright object, such as a light source, causes a displeasing diffraction pattern. When the value of the transmission image clarity is not smaller than 75, a diffraction pattern is hardly displeasing. Further, a total of values of the transmission image clarity measured using optical combs with comb widths of 0.125 mm, 0.5 mm, 1.0 mm and 2.0 mm is preferably 230 or larger, more preferably 270 or larger, and even more preferably 350 or larger. If the total value of the transmission image clarity is smaller than 230, a transmission image tends to blur in appearance. When the total value of the transmission image clarity is not smaller than 230 and smaller than 270, there are no problems in daily life though depending on outdoor brightness. When the total value of the transmission image clarity is not smaller than 270 and smaller than 350, the outdoor sight can be clearly viewed although only a very bright object, such as a light source, causes a displeasing diffraction pattern. When the total value of the transmission image clarity is not smaller than 350, the diffraction pattern is hardly displeasing. Herein, the value of the transmission image clarity is measured in conformity with JIS K7105 by using ICM-1T made by Suga Test Instruments Co., Ltd. When the wavelength to be transmitted differs from that of the D65 light source, the measurement is preferably performed after calibration using a filter having the wavelength to be transmitted.

Haze occurred in the wavelength band where the optical film 1 has transmissivity is preferably 6% or less, more preferably 4% or less, and even more preferably 2% or less. If the haze exceeds 6%, the transmitted light is scattered and a view is obscured. Herein, the haze is measured in accordance with the measurement method stipulated in JIS K7136 by using HM-150 made by Murakami Color Research Laboratory Co., Ltd. When the wavelength to be transmitted differs from that of the D65 light source, the measurement is preferably performed after calibration using a filter having the wavelength to be transmitted. The incident surface S1, preferably both the incident surface S1 and the emergent surface S2, of the optical film 1 have smoothness at such a level as not degrading the transmission image clarity. More specifically, arithmetic mean roughness Ra of the incident surface S1 and the emergent surface S2 is preferably 0.08 μm or less, more preferably 0.06 μm or less, and even more preferably 0.04 μm or less. Note that the arithmetic mean roughness Ra is obtained as a roughness parameter by measuring the surface roughness of the incident (emergent) surface and deriving a roughness curve from a two-dimensional profile curve. Measurement conditions are set in conformity with JIS B0601:2001. Details of a measuring apparatus and the measurement conditions are as follows;

measuring apparatus: full-automated fine shape measuring machine SURFCODER ET4000A (made by Kosaka Laboratory Ltd.), $\lambda c$=0.8 mm, evaluation length: 4 mm, cutoff: ×5, and data sampling interval: 0.5 µm.

The light transmitted through the optical film 1 is preferably as close as possible to neutral in color. Even when the transmitted light is colored, the color preferably has a pale tone in blue, blue-green, or green, for example, which provides a cool feeling. From the viewpoint of obtaining such a color tone, it is desired that chromaticity coordinates Cx and Cy of the reflected light and the transmitted light, output from the emergent surface S2 after entering the incident surface S1 and passing through the optical layer 2 and the reflecting layer 3, satisfy respective ranges of preferably 0.20<Cx<0.35 and 0.20<Cy<0.40, more preferably 0.25<Cx<0.32 and 0.25<Cy<0.37, and even more preferably 0.30<Cx<0.32 and 0.30<Cy<0.35, when the measurement is conducted for irradiation using the D65 light source, for example. Further, from the viewpoint of avoiding the color tone from becoming reddish, it is desired that the chromaticity coordinates Cx and Cy satisfy the relationship of preferably Cy>Cx−0.02 and more preferably Cy>Cx. In addition, change in color tone of the reflected light depending on the incident angle is undesired because, when the optical film is applied to, e.g., building windows, the color tone is different depending on a viewing place and an appearing color is changed upon walking. From the viewpoint of suppressing the above-mentioned changes in the color tone of the reflected light, the light preferably enters the incident surface S1 or the emergent surface S2 at the incident angle $\theta$ of 5° or larger and 60° or smaller, and each of an absolute value of difference between chromaticity coordinates Cx and an absolute value of difference between chromaticity coordinates Cy of the light specularly reflected by the optical film 1 is preferably 0.05 or smaller, more preferably 0.03 or smaller, and even more preferably 0.01 or smaller at each of both the principal surfaces of the optical film 1. The above-described limitations on numerical ranges regarding the chromaticity coordinates Cx and Cy of the reflected light are desirably satisfied for both the incident surface S1 and the emergent surface S2.

The first optical layer 4, the second optical layer 5, and the reflecting layer 3, which constitute the optical film 1, will be described in more detail below.

First Optical Layer and Second Optical Layer

The first optical layer 4 serves to, for example, support and protect the reflecting layer 3. The first optical layer 4 is made of a layer containing, e.g., a resin as a main component from the viewpoint of giving the optical film 1 with flexibility. For example, one of two principal surfaces of the first optical layer 4 is a smooth surface and the other is a concave-convex surface (first surface). The reflecting layer 3 is formed on the concave-convex surface of the first optical layer 4.

The second optical layer 5 serves to protect the reflecting layer 3 by embedding the first surface (concave-convex surface) of the first optical layer 4 on which the reflecting layer 3 is formed. The second optical layer 5 is made of a layer containing, e.g., a resin as a main component from the viewpoint of giving the optical film 1 with flexibility. For example, one of two principal surfaces of the second optical layer 5 is a smooth surface and the other is a concave-convex surface (second surface). The concave-convex surface of the first optical layer 4 and the concave-convex surface of the second optical layer 5 are reversed to each other in a concave-convex relation.

The concave-convex surface of the first optical layer 4 is formed, for example, by a plurality of structures 4c arrayed in a one-dimensional pattern, and the concave-convex surface of the second optical layer 5 is formed, for example, by a plurality of structures 5c arrayed in a one-dimensional pattern (see FIGS. 3A to 3C and FIGS. 4A and 4B). Because the structures 4c of the first optical layer 4 and the structures 5c of the second optical layer 5 differ only in that the concave-convex relation is reversed to each other, the following description is made just about the structures 4c of the first optical layer 4.

In the optical film 1, an array pitch P of the structures 4c is preferably not smaller than 5 µm and not larger than 5 mm, more preferably not smaller than 5 µm and smaller than 250 and even more preferably not smaller than 20 µm and not larger than 200 µm. If the array pitch P of the structures 4c is smaller than 5 µm, part of the light of the transmission wavelengths may be reflected in some cases because it is generally difficult to form the structures 4c in the desired shape and to sharpen a wavelength selection characteristic of the reflecting layer 3. The occurrence of the above-described partial reflection has a tendency of generating diffraction and causing even higher-order reflections to be visually recognized, thus making people viewing through the optical film feel poorer in transparency. On the other hand, if the array pitch P of the structures 4c exceeds 5 mm, a necessary film thickness is increased and flexibility is lost when the shape of the structures 4c necessary for the directional reflection is taken into consideration, thus causing a difficulty in affixing the optical film 1 to a rigid body, such as the window member 10. Further, by setting the array pitch P of the structures 4c to be smaller than 250 µm flexibility is increased to such an extent that the optical film 1 can be easily manufactured in a roll-to-roll manner and batch production is not necessary. When the optical film 1 according to the embodiment of the present application is applied to building components such as windows, a length of about several meters is necessary for the optical film 1 and roll-to-roll production is more suitable than the batch production. By setting the array pitch P to be not smaller than 20 µm and not larger than 200 µm, productivity can be further increased.

The shape of the structures 4c formed on the surface of the first optical layer 4 is not limited to one type, and the structures 4c may be formed in plural shapes on the surface of the first optical layer 4. When the structures 4c are formed in plural shapes on the surface of the first optical layer 4, a predetermined pattern including the plural shapes of the structures 4c may be cyclically repeated. As an alternative, the plural shapes of the structures 4c may be formed at random (non-cyclically) depending on the desired characteristic.

Figure 3A:
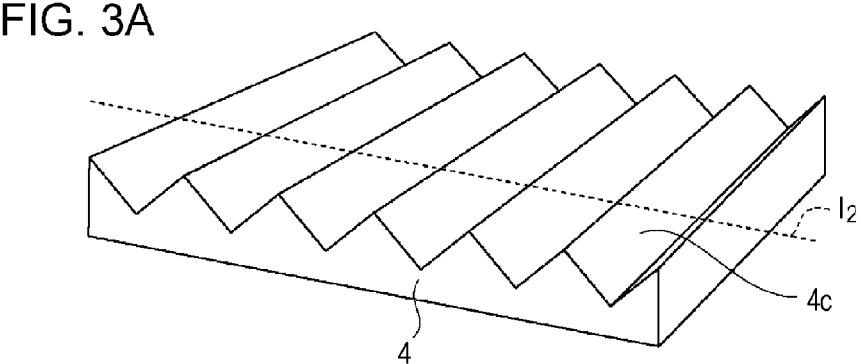
FIGS. 3A to 3C are each a perspective view illustrating an example of the shape of a structure formed in a first optical layer.
Figure 3B:
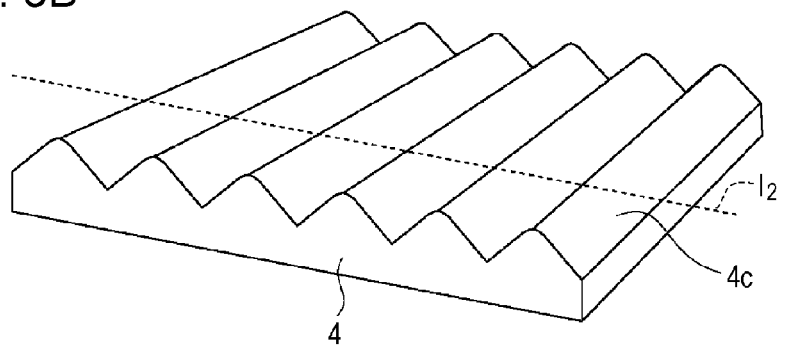
Figure 3C:
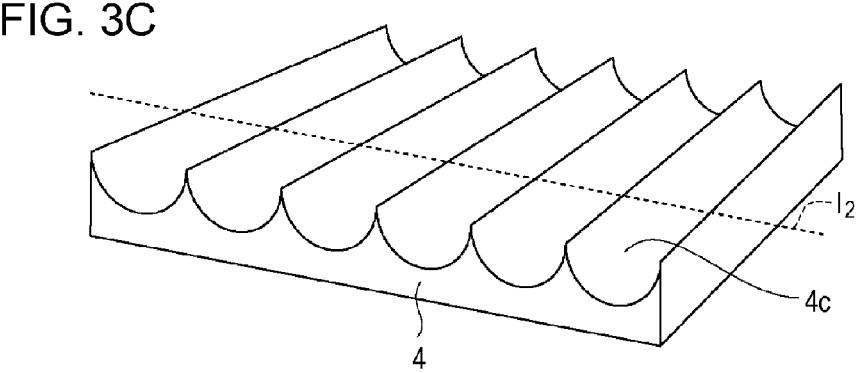

FIGS. 3A to 3C are perspective views illustrating examples of the shape of the structures 4c formed in the first optical layer 4. The structures 4c are each in the form of a pillar-like concave (recess) extending in one direction. The pillar-like structures 4c are arrayed side by side in one direction, i.e., in a one-dimensional pattern. The reflecting layer 3 is formed on the structures 4c. Therefore, the reflecting layer 3 has the same shape as the surface shape of the structures 4c.

The shape of the structures 4c can be, for example, one of a prism-like shape illustrated in FIG. 3A, a shape obtained by rounding a ridge portion of each prism as illustrated in FIG. 3B, a shape obtained by reversing a lenticular shape as illustrated in FIG. 3C, and a shape obtained by reversing one of the illustrated shapes. Herein, the term "lenticular shape" implies that a projection of each structure has a cross-sectional shape, which is, as viewed perpendicularly to a ridgeline of the projection, part of a circular-arc, substantially circular-arc, elliptical-arc, substantially elliptical-arc, parabolic, or substantially parabolic shape. Thus, a cylindrical shape is also included in the lenticular shape. Further, as illustrated in FIG. 3B, the ridge portion of the projection may be rounded to have a curvature radius R. A ratio R/P of the curvature radius R to the array pitch P is preferably 7% or less, more preferably 5% or less, and even more preferably 3% or less. Note that the shape of the structure 4c is not limited to the examples illustrated in FIGS. 3A to 3C or the shapes reversed to the illustrated shapes, and it may be a toroidal, hyperbolic cylindrical, elliptic cylindrical, polyhedral cylindrical, or a free-form shape. Further, an apex portion of the prism-like or lenticular shape may have a polygonal shape (e.g., a pentagonal shape). When the structure 4c has a prism-like shape, a slope angle γ (see FIG. 14) of the prism-like structure 4c is, e.g., 45°. From the viewpoint of reflecting larger part of light incoming from the sky to be returned toward the sky when the optical film is applied to the window member 10, the structure 4c preferably has a flat surface or a curved surface, each of which is sloped at the slope angle of 45° or larger. With the structure 4c having such a shape, the incident light can be returned toward the sky after being reflected substantially just once. Accordingly, even when the reflectance of the reflecting layer 3 is not so high, the incident light can be efficiently reflected toward the sky, and absorption of light by the reflecting layer 3 can be reduced.

Figure 4A:
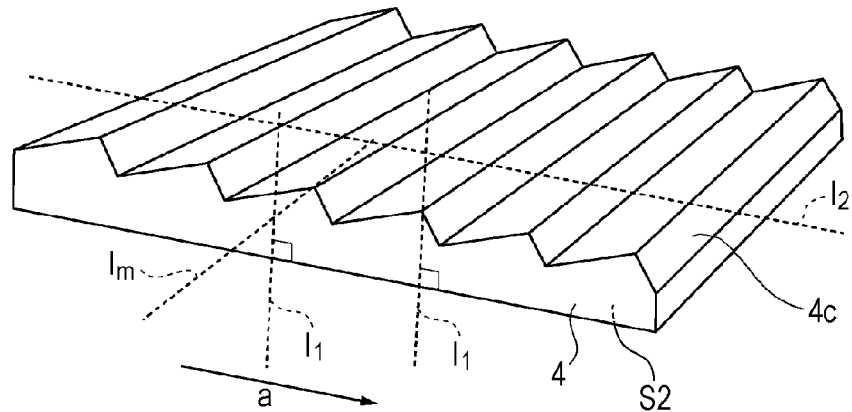
FIGS. 4A is a perspective view illustrating another example of the shape of the structure formed in the first optical layer, and 4B is a sectional view illustrating an example of construction of an optical film including the first optical layer in which the structure illustrated in FIG. 4A is formed.
Figure 4B:
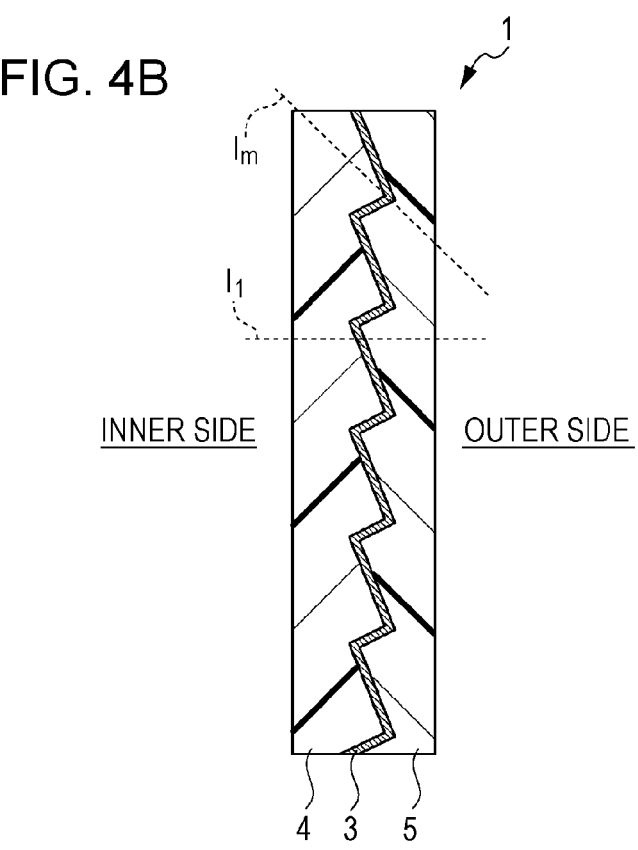

As illustrated in FIG. 4A, the shape of the structure 4c may be asymmetrical with respect to a line l1 perpendicular to the incident surface S1 or the emergent surface S2 of the optical film 1. In such a case, a principal axis lm of the structure 4c is inclined from the perpendicular line l1 as a reference in a direction a in which the structures 4c are arrayed side by side. Herein, the principal axis lm of the structure 4c represents a linear line passing a midpoint of a bottom side of the structure and an apex of the structure in a cross-section thereof. When the optical film 1 is affixed to the window member 10 arranged substantially vertically to the ground, the principal axis lm of the structure 4c is preferably inclined, as illustrated in FIG. 4B, to the downward side (ground side) of the window member 10 from the perpendicular line l1 as a reference. In general, a larger amount of heat (optical energy) arrives from the sun through windows in a time zone past the noon, and the altitude (elevation angle) of the sun is mostly higher than 45° in such a time zone. By employing the structure having the above-described shape, the light incoming from the sun at the high altitude can be efficiently reflected upward. In the example illustrated in FIGS. 4A and 4B, the prism-like structure 4c is formed in an asymmetrical shape with respect to the perpendicular line l1. Additionally, the structure 4c having a shape other than the prism-like shape may also be formed in an asymmetrical shape with respect to the perpendicular line l1. For example, a corner cube may be formed in an asymmetrical shape with respect to the perpendicular line l1.

The first optical layer 4 preferably contains, as a main component, a resin of the type exhibiting a small reduction in its storage (elastic) modulus at 100° C. and not providing a significant difference in storage modulus between 25° C. and 100° C. In more detail, the first optical layer 4 preferably contains a resin having the storage modulus of 3×10⁹ Pa or less at 25° C. and the storage modulus of 3×10⁷ Pa or more at 100° C. The first optical layer 4 is preferably made of one type of resin, but it may contain two or more types of resins. Further, the first optical layer 4 may be mixed with an additive, when necessary.

When the first optical layer 4 contains, as a main component, the resin of the type exhibiting a small reduction in its storage modulus at 100° C. and not providing a significant difference in storage modulus between 25° C. and 100° C. as described above, the first optical layer 4 can substantially maintain the interface shape as per design even when a process under application of heat or both of heat and pressure is carried out after forming the concave-convex surface (first surface) of the first optical layer 4. On the other hand, if the first optical layer 4 contains, as a main component, a resin of the type exhibiting a large reduction in its storage modulus at 100° C. and providing a significant difference in storage modulus between 25° C. and 100° C., the interface shape is deformed from the designed shape to such a large extent that the optical film 1 may be curled.

The process under application of heat includes not only a process of directly applying heat to the optical film 1 or components thereof, such as annealing, but also a process in which temperature at the surface of a formed film is locally raised and heat is indirectly applied to the film surface, for example, during formation of a thin film and during curing of a resin composition, and a process in which the temperature of a mold (die) is raised upon irradiation with energy rays and heat is indirectly applied to the optical film. Further, the effect resulting from restricting the numerical range of the storage modulus as described above is not limited to the case using the particular type of resin and can be similarly obtained when a thermoplastic resin, a thermosetting resin, and an energy-ray irradiation resin are used.

The storage modulus of the first optical layer 4 can be confirmed, for example, as follows. When the surface of the first optical layer 4 is exposed, the storage modulus of the first optical layer 4 can be confirmed by measuring the storage modulus of the exposed surface with a micro-hardness tester. When the first base 4a, etc. are formed on the surface of the first optical layer 4, the storage modulus of the first optical layer 4 can be confirmed by peeling off the first base 4a, etc. to make the surface of the first optical layer 4 exposed, and then measuring the storage modulus of the exposed surface with a micro-hardness tester.

A reduction in the storage modulus at high temperatures can be suppressed, for example, by a method of adjusting, e.g., the length and the kind of a side chain when the thermoplastic resin is used, and by a method of adjusting, e.g., the number of cross-linking points and the molecular structure of a cross-linking agent when the thermosetting resin or the energy-ray irradiation resin is used. However, it is preferable that the characteristics demanded for the resin material itself are not degraded with such a structural change. Depending on the type of the cross-linking agent, for example, the storage modulus at about room temperature may be increased to such an extent that a resin film becomes brittle, or that the resin film is curved or curled due to large shrinkage. It is, therefore, preferable to properly select the type of the cross-linking agent depending on the demanded characteristics.

When the first optical layer 4 contains a crystalline high-polymeric material as a main component, it preferably contains, as a main component, a resin having the glass transition point higher than a maximum temperature during a manufacturing process and exhibiting a small reduction in the storage modulus at the maximum temperature during the manufacturing process. On the other hand, if a resin having the glass transition point in the range of the room temperature 25° C. to the maximum temperature during the manufacturing process and exhibiting a large reduction in the storage modulus at the maximum temperature during the manufacturing process is used, a difficulty occurs in maintaining the ideal interface shape as per design during the manufacturing process.

When the first optical layer 4 contains a non-crystalline (amorphous) high-polymeric material as a main component, it preferably contains, as a main component, a resin having the melting point higher than the maximum temperature during the manufacturing process and exhibiting a small reduction in the storage modulus at the maximum temperature during a manufacturing process. On the other hand, if a resin having the melting point in the range of the room temperature 25° C. to the maximum temperature during the manufacturing process and exhibiting a large reduction in the storage modulus at the maximum temperature during the manufacturing process is used, a difficulty occurs in maintaining the ideal interface shape as per design during the manufacturing process.

Herein, the expression "maximum temperature during the manufacturing process" implies a maximum temperature at the concave-convex surface (first surface) of the first optical layer 4 during the manufacturing process. Preferably, the second optical layer 5 also satisfies the above-mentioned numerical range of the storage modulus and the above-mentioned temperature range of the glass transition point.

Thus, at least one of the first optical layer 4 and the second optical layer 5 preferably contains the resin having the storage modulus of $3 \times 10^9$ Pa or less at 25° C. On such a condition, the optical film 1 can be given with flexibility at the room temperature 25° C. and can be manufactured with the roll-to-roll process.

The first base 4a and the second base 5a have transparency in an exemplary case. Each base is preferably in the form of a film from the viewpoint of giving the optical film 1 with flexibility, but the form of the base is not particularly limited to the film. The first base 4a and the second base 5a can be each formed by using, e.g., general high polymeric materials. Examples of the general high polymeric materials include triacetylcellulose (TAC), polyester (TPEE), polyethylene terephthalate (PET), polyimide (PI), polyamide (PA), aramid, polyethylene (PE), polyacrylate, polyethersulfone, polysulfone, polypropylene (PP), diacetyl cellulose, polyvinyl chloride, acrylic resin (PMMA), polycarbonate (PC), epoxy resin, urea resin, urethane resin, and melamine resin. However, the materials of the first base 4a and the second base 5a are not limited to the above-mentioned particular examples. The thickness of each of the first base 4a and the second base 5a is preferably 38 to 100 μm from the viewpoint of productivity, but it is not limited to such a particular range. The first base 4a or the second base 5a is preferably transmissive to an energy ray. The reason is that when the first base 4a or the second base 5a is transmissive to an energy ray, an energy-ray curable resin interposed between the first base 4a or the second base 5a and the reflecting layer 3 can be cured, as described later, by irradiating the energy-ray curable resin with the energy ray from the side including the first base 4a or the second base 5a.

The first optical layer 4 and the second optical layer 5 have transparency in an exemplary case. The first optical layer 4 and the second optical layer 5 are each obtained, for example, by curing a resin composition. As the resin composition, an energy-ray curable resin capable of being cured upon irradiation with light or an electron beam, or a thermosetting resin capable of being cured upon application of heat is preferably used from the viewpoint of easiness in production. As the energy-ray curable resin, a photosensitive resin composition capable of being cured upon irradiation with light is preferable, and an ultraviolet curable resin composition capable of being cured upon irradiation with an ultraviolet ray is most preferable. From the viewpoint of increasing adhesion between the first optical layer 4 or the second optical layer 5 and the reflecting layer 3, the resin composition preferably further contains a compound containing phosphoric acid, a compound containing succinic acid, and a compound containing butyrolactone. The compound containing phosphoric acid may be, e.g., (meth)acrylate containing phosphoric acid, preferably a (meth)acryl monomer or oligomer having phosphoric acid in a functional group. The compound containing succinic acid may be, e.g., (meth)acrylate containing succinic acid, preferably a (meth)acryl monomer or oligomer having succinic acid in a functional group. The compound containing butyrolactone may be, e.g., (meth)acrylate containing butyrolactone, preferably a (meth)acryl monomer or oligomer having butyrolactone in a functional group.

The ultraviolet curable resin composition contains, e.g., (meth)acrylate and a photopolymerization initiator. The ultraviolet curable resin composition may further contain, when necessary, a photo-stabilizer, a flame retardant, a leveling agent, and/or an anti-oxidant.

As the acrylate, a monomer and/or an oligomer having two or more (meth)acryloyl groups is preferably used. Examples of such a monomer and/or oligomer include urethane (meth)acrylate, epoxy (meth)acrylate, polyester (meth)acrylate, polyol (meth)acrylate, polyether (meth)acrylate, and melamine (meth)acrylate. Herein, the term "(meth)acryloyl group" implies an acryloyl group or a methacryloyl group. The term "oligomer" used herein implies a molecule having molecular weight of 500 or more to 60000 or less.

The photopolymerization initiator used here can be selected, as appropriate, from among general materials. As examples of the general materials, benzophenone derivatives, acetophenone derivatives, anthraquinone derivatives, etc. can be used alone or in combination. An amount of the photopolymerization initiator mixed is preferably 0.1% by mass or more and 10% by mass or less of the solid content. If the amount of the photopolymerization initiator mixed is less than 0.1% by mass, photo-curability is reduced to such a level as being not suitable for industrial production from the practical point of view. On the other hand, if the amount of the photopolymerization initiator mixed exceeds 10% by mass, an odor tends to remain in a formed coating when an amount of light emitted for the irradiation is insufficient. Herein, the term "solid content" implies all components constituting the first optical layer 4 or the second optical layer 5 after being cured. The solid content includes, for example, the acrylate, the photopolymerization initiator, etc.

Preferably, the resin has such a property that a structure can be transferred to the resin upon, e.g., irradiation with the energy ray or application of heat. Any type of resin, including a vinyl-based resin, an epoxy-based resin, a thermoplastic resin, etc., can be used as long as the resin satisfies the above-described requirements for the refractive index.

The resin may be mixed with an oligomer to reduce curing shrinkage. The resin may further contain, e.g., polyisocyanate as a curing agent. In consideration of adhesion between the first optical layer 4 or the second optical layer 5 and the adjacent layer, the resin may be further mixed with suitable one or more of monomers having a hydroxyl group, a carboxyl group and a phosphoric group; polyols; coupling agents such as carboxylic acid, silane, aluminum and titanium; and various chelating agents.

The resin composition preferably further contains a cross-linking agent. In particular, a cyclic cross-linking agent is preferably used as the cross-linking agent. By using the cross-linking agent, the resin can be made heat-resistant without greatly changing the storage modulus at the room temperature. If the storage modulus at the room temperature is greatly changed, the optical film 1 may become brittle and a difficulty may occur in fabricating the optical film 1 with the roll-to-roll process. Examples of the cyclic cross-linking agent include dioxaneglycol diacrylate, tricyclodecanedimethanol diacrylate, tricyclodecanedimethanol dimethacrylate, ethylene oxide-modified isocyanurate diacrylate, ethylene oxide-modified isocyanurate triacrylate, and caprolactone-modified tris(acryloxyethyl) isocyanurate.

Preferably, the first base 4a or the second base 5a has water vapor permeability lower than that of the first optical layer 4 or the second optical layer 5, respectively. For example, when the first optical layer 4 is formed by using the energy-ray curable resin, e.g., urethane acrylate, the first base 4a is preferably formed by using a resin having water vapor permeability lower than that of the first optical layer 4 and being transmissive to the energy ray, e.g., polyethylene terephthalate (PET). As a result, diffusion of moisture into the reflecting layer 3 from the incident surface S1 or the emergent surface S2 can be reduced and deterioration of a metal, etc. contained in the reflecting layer 3 can be suppressed. Hence, durability of the optical film 1 can be improved. Note that the water vapor permeability of PET having a thickness of 75 μm is about 10 g/m$^2$/day (40° C., 90% RH).

Preferably, at least one of the first optical layer 4 and the second optical layer 5 contains a functional group having high polarity, and the content of such a functional group differs between the first optical layer 4 and the second optical layer 5. More preferably, both the first optical layer 4 and the second optical layer 5 contain a phosphoric compound (e.g., phosphoric ester), and the content of the phosphoric compound differs between the first optical layer 4 and the second optical layer 5. The difference in the content of the phosphoric compound between the first optical layer 4 and the second optical layer 5 is preferably two or more times, more preferably five or more times, and even more preferably ten or more times.

When at least one of the first optical layer 4 and the second optical layer 5 contains the phosphoric compound, the reflecting layer 3 preferably contains an oxide, a nitride, or an oxynitride in its surface contacting with the first optical layer 4 or the second optical layer 5 that contains the phosphoric compound. It is particularly preferable that the reflecting layer 3 includes a layer, which contains zinc oxide (ZnO) or niobium oxide, in its surface contacting with the first optical layer 4 or the second optical layer 5 that contains the phosphoric compound. Such a feature is effective in increasing adhesion between the first optical layer 4 or the second optical layer 5 and the reflecting layer 3. Another reason is that an anticorrosion effect is increased when the reflecting layer 3 contains a metal, such as Ag. Additionally, the reflecting layer 3 may contain a dopant, such as Al or Ga. The reason is that the dopant improves film quality and smoothness when a metal oxide layer is formed by, e.g., sputtering.

From the viewpoint of giving the optical film 1, the window member 10, etc. with a visually attractive design, at least one of the first optical layer 4 and the second optical layer 5 preferably has a characteristic of absorbing light in a particular wavelength band within the visible range. A pigment dispersed in the resin may be either an organic pigment or an inorganic pigment. In particular, an inorganic pigment having high weatherbility in itself is preferable. Practical examples of the inorganic pigment include zircone gray (Co- and Ni-doped $ZrSiO_4$), praseodymium yellow (Pr-doped $ZrSiO_4$), chrome-titania yellow (Cr- and Sb-doped $TiO_2$ or Cr- and W-doped $TiO_2$), chrome green (such as $Cr_2O_3$), peacock blue $((CoZn)O(AlCr)_2O_3)$, Victoria green $((Al, Cr)_2O_3)$, deep blue $(CoO.Al_2O_3.SiO_2)$, vanadium-zirconium blue (V-doped $ZrSiO_4$), chrome-tin pink (Cr-doped $CaO.SnO_2.SiO_2$), manganese pink (Mn-doped $Al_2O_3$), and salmon pink (Fe-doped $ZrSiO_4$). Examples of the organic pigment include an azo-based pigment and a phthalocyanine pigment.

As described above, the second optical layer 5 serves to protect the reflecting layer 3 by embedding the first surface (concave-convex surface) of the first optical layer 4 on which the reflecting layer 3 is formed. By setting the refractive index of the second optical layer 5 to fall within a predetermined range, it is possible to refract the light entering the optical film 1 at the incident surface 51 and to modify an actual incident angle with respect to the reflecting layer 3. It is further possible to suppress a reduction of the directionally reflected component, which is caused by the reflection of the incident light at the air/resin interface. Accordingly, even when the shapes of tip portions of the structures constituting the reflecting layer 3, e.g., the shapes of ridge portions in the case of the structures being made of corner cubes, are deformed (collapsed), an overall rate of the directionally reflected component can be held high.

The refractive index of the second optical layer 5 is preferably 1.1 or more and 1.9 or less, more preferably 1.4 or more and 1.6 or less, and even more preferably 1.49 or more and 1.55 or less. By setting the refractive index of the resin embedding the reflecting layer to be held in the above-mentioned range, a reduction in the directional reflection performance of the optical film can be suppressed even when the shapes of tip portions of the structures are deformed from the ideal one.

Reflecting Layer

The reflecting layer 3 is, for example, a wavelength-selective reflecting layer in the form of a multilayer (stacked) film, which directionally reflects, of the light entering the incident surface at the incident angle (θ, φ), the light in the specific wavelength band, while transmitting the light other than the specific wavelength band therethrough. A mean film thickness of the reflecting layer 3 is preferably 20 μm or less, more preferably 5 μm or less, and even more preferably 1 μm or less. If the mean film thickness of the reflecting layer 3 exceeds 20 μm, the length of an optical path in which the transmitted light is refracted is increased, and the transmission image tends to distort in appearance. The reflecting layer 3 can be formed, for example, by sputtering, vapor deposition, dip coating, or die coating.

The multilayer film has a multilayer structure formed, for example, by successively stacking a high refractive index layer having a high refractive index with respect to a metal layer in the visible range and serving as an anti-reflection layer, the metal layer having a high reflectance in the infrared range, and a high refractive index layer having a high refractive index with respect to the metal layer in the visible range and serving as an anti-reflection layer. An optical transparent layer or a transparent electroconductive layer can be used as the high refractive index layer.

The metal layer having a high reflectance in the infrared range contains, as a main component, Au, Ag, Cu, Al, Ni, Cr, Ti, Pd, Co, Si, Ta, W, Mo or Ge alone, or an alloy containing two or more selected from among those elements, for example. Of those examples, Ag-, Cu-, Al-, Si- or Ge-based materials are preferable in consideration of practicability. When an alloy is used as the material of the metal layer, the metal layer preferably contains, as a main component, AlCu, Alti, AlCr, AlCo, AlNdCu, AlMgSi, AgBi, AgNdCu, AgPdCu, AgPdTi, AgCuTi, AgPdCa, AgPdMg, AgPdFe, Ag, or SiB, for example. To retard corrosion of the metal layer, an additional material, such as Ti or Nd, is preferably mixed in the metal layer. In particular, when Ag is used as the material of the metal layer, it is preferable to mix the additional material.

The optical transparent layer is a layer having a high refractive index in the visible range and serving as an anti-reflection layer. The optical transparent layer contains, as a main component, a high-dielectric material, e.g., niobium oxide, tantalum oxide, or titanium oxide. The transparent electroconductive layer contains, as a main component, ZnO-based oxide or indium-doped tin oxide. The ZnO-based oxide can be, for example, at least one selected from among a group including zinc oxide (ZnO), gallium (Ga)- and aluminum (Al)-doped zinc oxide (GAZO), aluminum (Al)-doped zinc oxide (AZO), and gallium (Ga)-doped zinc oxide (GZO).

The refractive index of the high refractive index layer included in the multilayer film is preferably in the range of 1.7 or more to 2.6 or less, more preferably 1.8 or more to 2.6 or less, and even more preferably 1.9 or more to 2.6 or less. By setting the refractive index as mentioned above, anti-reflection can be realized in the visible range with a film that is so thin as not to cause cracking. Note that the refractive index is measured at a wavelength of 550 nm. The high refractive index layer is a layer containing, as a main component, a metal oxide, for example. In some cases, the metal oxide used here is preferably to be other than zinc oxide from the viewpoint of relaxing stresses in the layer and suppressing the occurrence of cracks. In particular, at least one selected from among a group including niobium oxide (e.g., niobium pentoxide), tantalum oxide (e.g., tantalum pentoxide), and titanium oxide is preferably used. A film thickness of the high refractive index layer is preferably 10 nm or more and 120 nm or less, more preferably 10 nm or more and 100 nm or less, and even more preferably 10 nm or more and 80 nm or less. If the film thickness is less than 10 nm, the high refractive index layer is more apt to reflect the visible light. On the other hand, if the film thickness exceeds 120 nm, the high refractive index layer is more apt to reduce transmittance and to cause cracking.

Figure 5:
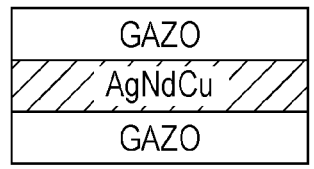
FIG. 5 illustrates one example of layer structure of a wavelength-selective reflecting layer.

FIG. 5 illustrates one example of layer structure of the reflecting layer 3. The following description is made on an assumption that stacked layers are called a first layer, a second layer, and a third layer in order from the emergent surface side of the reflecting layer 3. The first layer and the third layer are each a high refractive index layer containing, e.g., GAZO as a main component and are formed in film thicknesses substantially equal to each other. The difference in film thickness between the first layer and the third layer is preferably 10% or less, more preferably 5% or less, and even more preferably 3% or less with respect to the film thickness of the counterpart (comparison target) of those two layers. The second layer is a metal layer containing, e.g., AgNdCu as a main component.

Figure 6A:
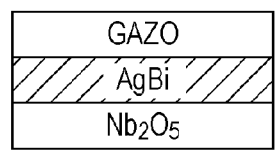
FIG. 6A illustrates an example of the wavelength-selective reflecting layer in which a high refractive index layer as a first layer is a layer containing $Nb_2O_5$ as a main component, and a metal layer as a second layer is a layer containing AgBi as a main component.
Figure 6B:
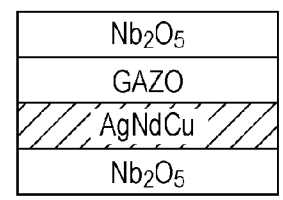
FIG. 6B illustrates an example of the wavelength-selective reflecting layer in which a high refractive index layer as a third layer has a multilayer structure that a layer containing GAZO as a main component and a layer containing $Nb_2O_5$ as a main component are stacked.
Figure 6C:
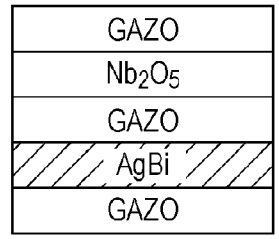
FIG. 6C illustrates an example of the wavelength-selective reflecting layer in which the high refractive index layer as the third layer has a multilayer structure that a layer containing GAZO as a main component, a layer containing $Nb_2O_5$ as a main component, and a layer containing GAZO as a main component are successively stacked.
Figure 6D:
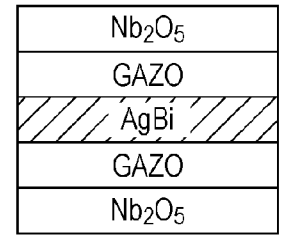
FIG. 6D illustrates an example of the wavelength-selective reflecting layer in which each of the high refractive index layers as the first layer and the third layer has a multilayer structure that a layer containing GAZO as a main component and a layer containing $Nb_2O_5$ as a main component are stacked.
Figure 6E:
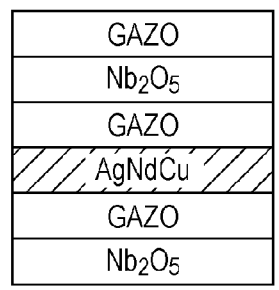
FIG. 6E illustrates an example of the wavelength-selective reflecting layer in which the high refractive index layer as the first layer has a multilayer structure that a layer containing $Nb_2O_5$ as a main component and a layer containing GAZO as a main component are stacked, and in which the high refractive index layer as the third layer has a multilayer structure that a layer containing GAZO as a main component, a layer containing $Nb_2O_5$ as a main component, and a layer containing GAZO as a main component are successively stacked.

The layer structure of the reflecting layer 3 is not limited to that illustrated in FIG. 5. FIGS. 6A to 6E illustrate other examples of the layer structure of the reflecting layer 3. FIG. 6A illustrates an example in which the high refractive index layer as the first layer is a layer containing $Nb_2O_5$ as a main component, and the metal layer as the second layer is a layer containing AgBi as a main component.

As another example, each high refractive index layer may have a multilayer structure that two or more layers having different refractive indexes are stacked. FIGS. 6B to 6E illustrate examples of the reflecting layer 3 in which the high refractive index layer has a multilayer structure. In the example illustrated in FIG. 6B, the high refractive index layer as the third layer has a multilayer structure that a layer containing GAZO as a main component and a layer containing $Nb_2O_5$ as a main component are stacked. In the example illustrated in FIG. 6C, the high refractive index layer as the third layer has a multilayer structure that a layer containing GAZO as a main component, a layer containing $Nb_2O_5$ as a main component, and a layer containing GAZO as a main component are successively stacked. In the example illustrated in FIG. 6D, each of the high refractive index layers as the first layer and the third layer has a multilayer structure that a layer containing GAZO as a main component and a layer containing $Nb_2O_5$ as a main component are stacked. In the example illustrated in FIG. 6E, the high refractive index layer as the first layer has a multilayer structure that a layer containing $Nb_2O_5$ as a main component and a layer containing GAZO as a main component are stacked, and the high refractive index layer as the third layer has a multilayer structure that a layer containing GAZO as a main component, a layer containing $Nb_2O_5$ as a main component, and a layer containing GAZO as a main component are successively stacked.

Individual films constituting the multilayer film are not limited to thin films made of inorganic materials, and the multilayer film may be formed by stacking a thin film made of a high polymeric material, or a layer containing fine particles, etc. dispersed in a high polymeric material. Further, a thin buffer layer made of, e.g., Ti and having a thickness of about several nanometers may be formed at the interface between the formed optical transparent layer and the adjacent layer for the purpose of preventing oxidation degradation of a metal in the underlying layer when the optical transparent layer is formed. Herein, the term "buffer layer" implies a layer that is self-oxidized to suppress oxidation of e.g., a metal layer as an underlying layer when an overlying layer is formed.

Suppression of Change in Color Tone

In the embodiment of the present application, change in color tone is suppressed by setting an index value that represents a color tone, e.g., redness or blueness, and by forming a multilayer film so as to satisfy the set index value. Herein, a redness index and a blueness index are employed to set the index value representing the color tone.

The redness index provides an index value for determining whether the transmitted light appears reddish. The redness index value is calculated by dividing a value, which is resulted from integrating the product of a light source spectrum, a reflectance, and a luminosity factor (visual sensitivity) in the wavelength range of 620 nm to 750 nm, by a value resulted from integrating the product of a light source spectrum and a visual sensitivity.

The redness index value is preferably 0.258 or smaller, more preferably 0.250 or smaller, and even more preferably 0.200 or smaller. When the redness index value is 0.200 or smaller, redness is not displeasing regardless of external environments. When the redness index value is larger than 0.200 and not larger than 0.250, redness is hardly displeasing. When the redness index value is larger than 0.250 and not larger than 0.258, redness is not so sensibly displeasing though depending on outdoor brightness. On the other hand, if the redness index value is larger than 0.258 and not larger than 0.299, the transmitted light tends to appear somewhat reddish in a particular angle direction. If the redness index value is larger than 0.299, the transmitted light tends to appear reddish deeply in the particular angle direction.

The blueness index provides an index value for determining whether the transmitted light appears bluish. Similarly to the redness index value, the blueness index value is calculated by dividing a value, which is resulted from integrating the product of a light source spectrum, a reflectance, and a visual sensitivity (luminosity factor) in the wavelength range of 620 nm to 750 nm, by a value resulted from integrating the product of a light source spectrum and a visual sensitivity.

The blueness index value is preferably 0.210 or smaller, more preferably 0.200 or smaller, and even more preferably 0.170 or smaller. When the blueness index value is 0.170 or smaller, blueness is not displeasing regardless of external environments. When the blueness index value is larger than 0.170 and not larger than 0.200, blueness is hardly displeasing. When the blueness index value is larger than 0.200 and not larger than 0.210, blueness is not so sensibly displeasing though depending on outdoor brightness. On the other hand, if the blueness index value is larger than 0.210 and not larger than 0.219, the transmitted light tends to appear somewhat bluish in a particular angle direction. If the blueness index value is larger than 0.219, the transmitted light tends to appear bluish deeply in the particular angle direction.

Function of Optical Film

Figure 7A:
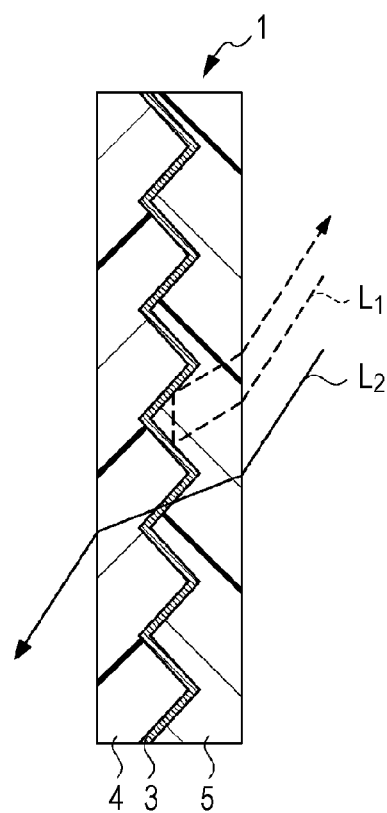
FIGS. 7A and 7B are each a sectional view to explain one example of function of the optical film.
Figure 7B:
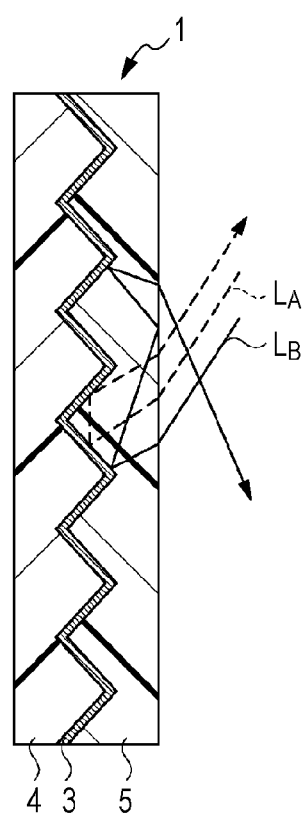

FIGS. 7A and 7B are each a sectional view to explain one example of function of the optical film. The following description is made, by way of example, in connection with the case where each of the structures constituting the concave-convex surface has a prism-like shape with a slope angle of 45°. As illustrated in FIG. 7A, part of a near infrared ray $L_1$ in the sunlight entering the optical film 1 is directionally reflected toward the sky in a substantially reversed relation to the direction of the incident light. On the other hand, visible light $L_2$ passes through the optical film 1.

Further, as illustrated in FIG. 7B, the light entering the optical film 1 and reflected by the reflecting surface of the reflecting layer 3 is separated into a component $L_A$ reflected toward the sky and a component $L_B$ not reflected toward the sky at a proportion depending on the incident angle. The component $L_B$ not reflected toward the sky is totally reflected at the interface between the second optical layer 5 and air and is then finally reflected in a direction differing from the incident direction.

Given that the light incident angle is $\delta$, the refractive index of the second optical layer 5 is n, and the reflectance of the reflecting layer 3 is R, a proportion M of the upward reflected component $L_A$ with respect to the total incident component can be expressed by the following formula (7):

$$M=(\sin(45-\delta')+\cos(45-\delta')/\tan(45+\delta'))/(\sin(45-\delta')+\cos(45-\delta'))\times R2 \quad (7)$$

where $\delta'=\sin-1(\sin \delta/n)$

Figure 8A:
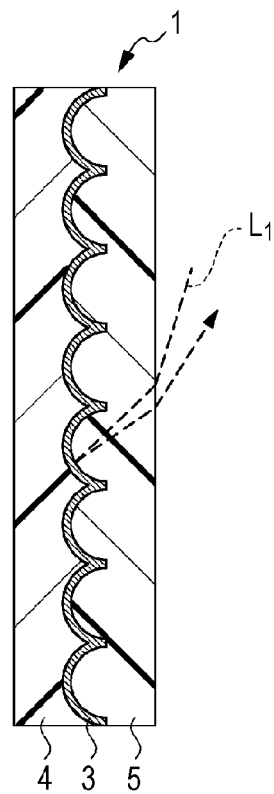
FIGS. 8A and 8B are each a sectional view to explain one example of function of the optical film.
Figure 8B:
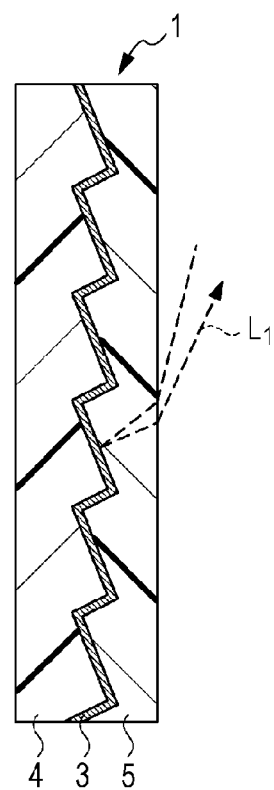

As the proportion of the component $L_B$ not reflected toward the sky increases, the proportion at which the incident light is reflected toward the sky decreases. Contriving or improving the shape of the reflecting layer 3, i.e., the shape of the structure 4c of the first optical layer 4, is effective in increasing the proportion of the component reflected toward the sky. To increase the proportion of the upward reflection, the structure 4c preferably has, for example, the lenticular shape illustrated in FIG. 3C or the asymmetrical shape illustrated in FIGS. 4A and 4B. With the structure 4c having such a shape, the light entering building window members, etc. from the sky (upward direction) can be reflected at a larger proportion to the sky (upward direction) even though the light is not reflected in exactly the same direction as the incident light. In the case of the two shapes illustrated in FIG. 3C and FIGS. 4A and 4B, the incident light can be returned to the sky after being reflected once by the reflecting layer 3, as illustrated in FIGS. 8A and 8B, and hence the reflected component can be finally obtained in a larger amount than that obtained in the case of the shape, illustrated in FIGS. 7A and 7B, where the incident light is reflected twice (or three or more times). Given that the reflectance of the reflecting layer 3 at a certain wavelength is 80%, for example, when the incident light is returned to the sky after being reflected twice, the upward reflectance is theoretically 64%. However, when the incident light is returned to the sky after being reflected once, the upward reflectance is theoretically 80%.

Figure 9A:
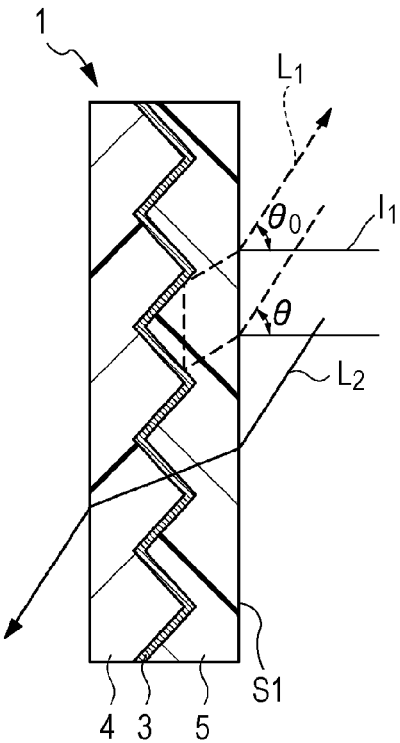
FIG. 9A is a sectional view to explain one example of function of the optical film.
Figure 9B:
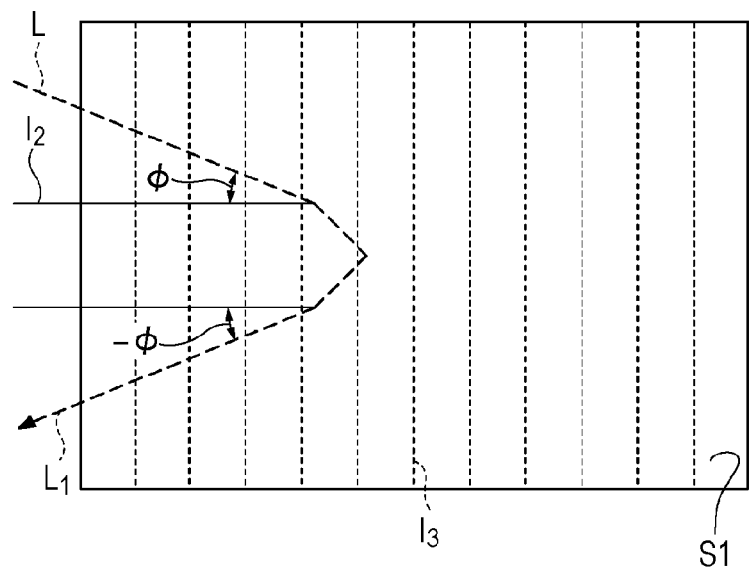
FIG. 9B is a plan view to explain one example of function of the optical film.

FIGS. 9A and 9B illustrate the relationship among a ridgeline $l_3$ of the pillar-like structure 4c, the incident light L, and the reflected light $L_1$. It is preferable that, of the light L entering the incident surface S1 at an incident angle $(\theta, \phi)$, the optical film 1 selectively directionally reflects the light $L_1$ in the specific wavelength band in a direction $(\theta_0, -\phi)$ $(0°<\theta_0<90°)$ while transmitting the light $L_2$ other than the specific wavelength band therethrough. By satisfying that relationship, the optical film 1 can reflect the light in the specific wavelength band toward the sky. Herein, $\theta$ is an angle formed by a perpendicular line $l_1$ with respect to the incident surface S1 and the incident light L or the reflected light $L_1$. Also, $\phi$ is an angle formed in the incident surface S1 by a linear line $l_2$, which is orthogonal to the ridgeline $l_3$ of the pillar-like structure 4c, and a component resulting from projecting the incident light L or the reflected light $L_1$ to the incident surface S1. Further, an angle $\theta$ rotated clockwise from the perpendicular line $l_1$ as a reference is defined as "+$\theta$", and an angle $\theta$ rotated counterclockwise from the perpendicular line $l_1$ is defined as "−$\theta$". An angle $\phi$ rotated clockwise from the linear line $l_2$ as a reference is defined as "+$\phi$", and an angle $\phi$ rotated counterclockwise from the linear line $l_2$ is defined as "−$\phi$".

Apparatus for Manufacturing Optical Film

Figure 10:
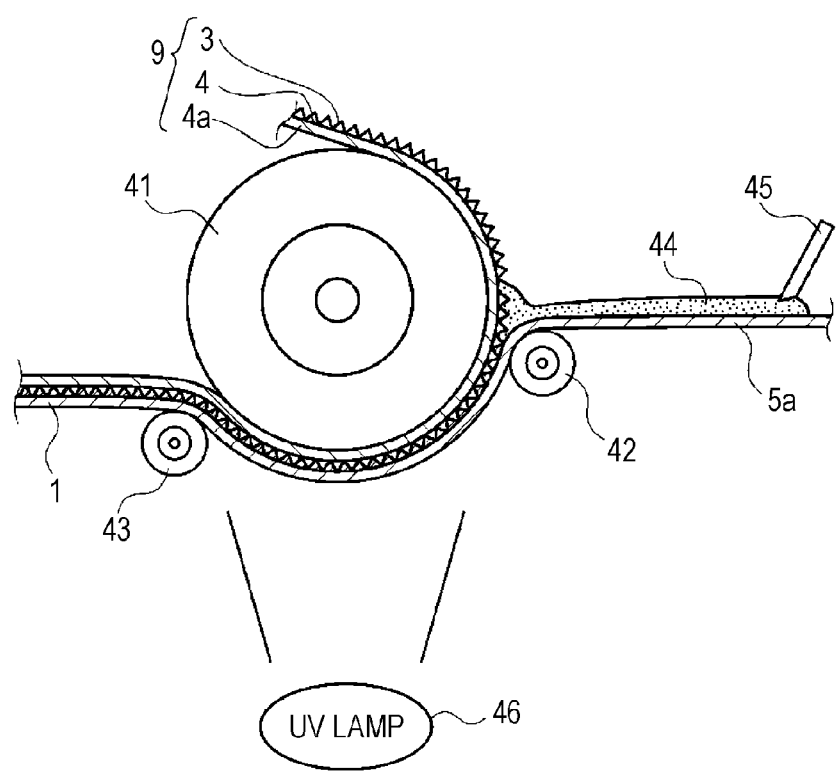
FIG. 10 is a schematic view illustrating one example of construction of an apparatus for manufacturing the optical film according to the first embodiment of the present application.

FIG. 10 is a schematic view illustrating one example of construction of an apparatus for manufacturing the optical film according to the first embodiment of the present application. As illustrated in FIG. 10, the manufacturing apparatus includes laminating rolls 41 and 42, a guide roll 43, a coating device 45, and an irradiation device 46.

The laminating rolls 41 and 42 are arranged to be able to nip a reflecting-layer affixed optical layer 9 and the second base 5a therebetween. The reflecting-layer affixed optical layer 9 is a layer obtained by forming the reflecting layer 3 on one principal surface of the first optical layer 4. The reflecting-layer affixed optical layer 9 may further include the first base 4a disposed on the other principal surface of the first optical layer 4 on the opposite side to the one principal surface thereof on which the reflecting layer 3 is formed. In the illustrated example, the reflecting layer 3 is formed on the one principal surface of the first optical layer 4, and the first base 4a is disposed on the other principal surface of the first optical layer 4. The guide roll 43 is arranged in a conveying path inside the manufacturing apparatus to be able to convey the optical film 1 having a belt-like shape. Materials of the laminating rolls 41 and 42 and the guide roll 43 are not limited to particular ones. A metal such as stainless steel, rubber, silicone, etc. can be optionally used, as appropriate, depending on the desired roll characteristics.

The coating device 45 can be prepared as a device including a coating unit, such as a coater. As the coater, ordinary coaters including a gravure coater, a wire bar, and a die can be optionally used, as appropriate, in consideration of physical properties of the resin composition to be coated, etc. The irradiation device 46 is a device for irradiating the resin composition with an ionizing ray, e.g., an electron ray, an ultraviolet ray, a visible ray, or a gamma ray. In the illustrated example, a UV lamp emitting an ultraviolet ray is used as the irradiation device 46.

Method of Manufacturing Optical Film

One example of a method of manufacturing the optical film according to the first embodiment of the present application will be described below with reference to FIGS. 10 to 13. Note that, in consideration of productivity, part or the whole of a manufacturing process described below is preferably performed in the roll-to-roll manner, as illustrated in FIG. 10, except for a step of fabricating a mold (or a die).

Figure 11A:
FIGS. 11A to 11C illustrate successive steps to explain one example of a method of manufacturing the optical film according to the first embodiment of the present application.
Figure 11B:
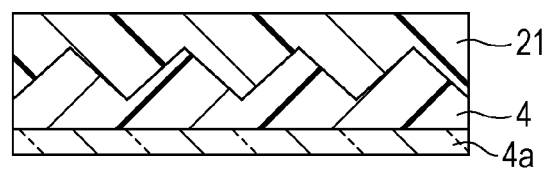

First, as illustrated in FIG. 11A, a mold (or a die) 21 having the same concave-convex shape as that of the structures 4c, or a mold (or a die) (replica) having a shape reversed to the concave-convex shape of the former mold (die) is formed by, e.g., bite machining or laser machining. Next, as illustrated in FIG. 11B, the concave-convex shape of the mold (die) 21 is transferred to a resin material in the form of a film by utilizing, e.g., a fusion extrusion process or a transfer process. The transfer process can be practiced, for example, by a method of pouring an energy-ray curable resin into a mold and irradiating the poured resin with an energy ray to cure the resin, or a method of applying heat and/or pressure to a resin for transferring the desired shape to the resin, or a method (laminating transfer process) of supplying a resin film from a stock roll and transferring the shape of a die to the resin film under application of heat. Through the above-described steps, as illustrated in FIG. 11C, the first optical layer 4 having the structures 4c on one principal surface thereof is formed.

Figure 11C:
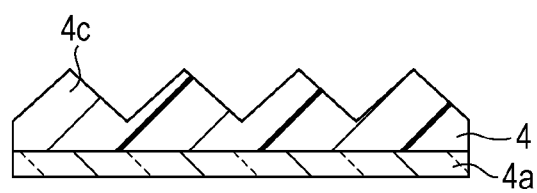

Further, as illustrated in FIG. 11C, the first optical layer 4 may be formed on the first base 4a. This case can be practiced, for example, by a process of supplying the first base 4a in the form of film from a stock roll, coating an energy-ray curable resin on the first base 4a, pressing the resin against a die to transfer the shape of the die to the resin, and irradiating the resin with an energy ray to cure it. Preferably, the resin further contains a cross-linking agent. The reason is that the cross-linking agent makes the resin heat-resistant without changing the storage modulus at the room temperature to a large extent.

Figure 12A:
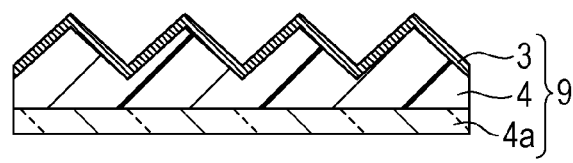
FIGS. 12A to 12C illustrate successive steps to explain one example of the method of manufacturing the optical film according to the first embodiment of the present application.
Figure 12B:
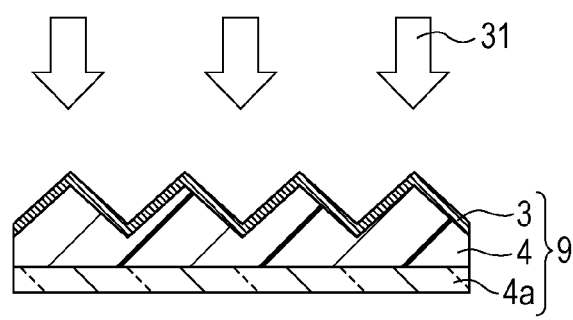

Next, as illustrated in FIG. 12A, the reflecting layer 3 is formed on the one principal surface of the first optical layer 4. The reflecting layer 3 can be formed, for example, by sputtering, evaporation, CVD (Chemical Vapor Deposition), dip coating, die coating, wet coating, or spray coating. Preferably, a practical method of forming the reflecting layer 3 is optionally selected from those film forming methods depending on the shape of the structure 4c, etc. Next, as illustrated in FIG. 12B, the reflecting layer 3 is subjected to annealing as indicated by 31, when necessary. The temperature of the annealing is in the range of, e.g., 100° C. or higher to 250° C. or lower.

Figure 12C:
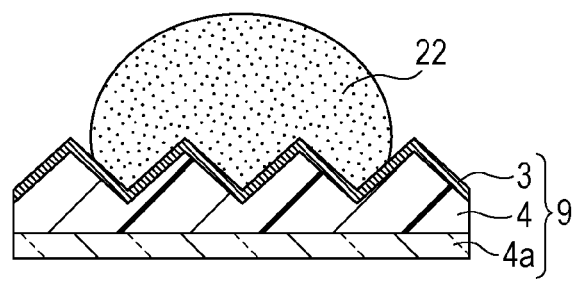
Figure 13A:
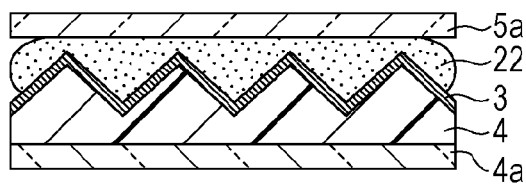
FIGS. 13A to 13C illustrate successive steps to explain one example of the method of manufacturing the optical film according to the first embodiment of the present application.
Figure 13B:
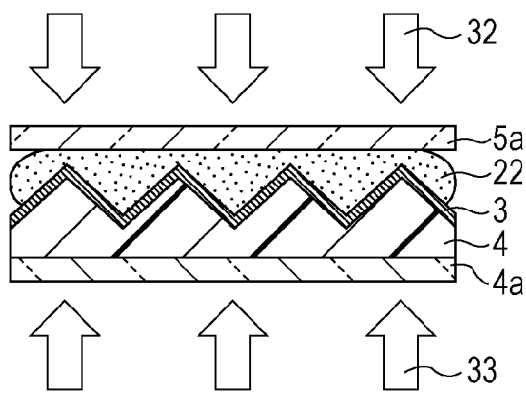
Figure 13C:
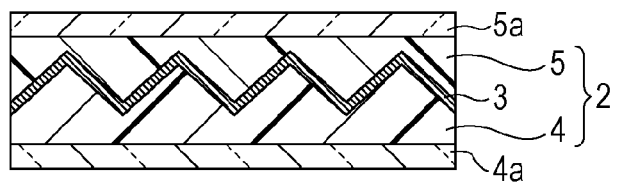

Next, as illustrated in FIG. 12C, a resin 22 in a not-yet-cured state is coated over the reflecting layer 3. The resin 22 may be, e.g., an energy-ray curable resin or a thermosetting resin. The energy-ray curable resin used here is preferably an ultraviolet-ray curable resin. Next, as illustrated in FIG. 13A, a laminate is formed by placing the second base 5a over the resin 22. Next, as illustrated in FIG. 13B, the resin 22 is cured by applying, e.g., an energy ray or heat as indicated by 32, while pressure is applied to the laminate as indicated by 33. Examples of the energy ray usable here include an electron ray, an ultraviolet ray, a visible ray, and a gamma ray. The ultraviolet ray is more preferable from the viewpoint of production equipment. Preferably, an integrated irradiation amount is selected, as appropriate, in consideration of the curing characteristic of the resin, suppression of yellowing of the resin and the second base 5a, etc. The pressure applied to the laminate is preferably in the range of 0.01 MPa or higher to 1 MPa or lower. If the applied pressure is lower than 0.01 MPa, a problem may occur in traveling of the film. On the other hand, if the applied pressure exceeds 1 MPa, a metal roll is to be used as the nip roll, and the applied pressure is more apt to fluctuate. Through the above-described steps, as illustrated in FIG. 13C, the second optical layer 5 is formed on the reflecting layer 3 and the optical film 1 is obtained.

A method of forming the optical film 1 by using the manufacturing apparatus, illustrated in FIG. 10, will be described in more detail below. First, the second base 5a is let out from a base supply roll (not shown), and the let-out second base 5a is guided to pass under the coating device 45. Next, an ionizing-ray curable resin 44 is coated by the coating device 45 on the second base 5a passing under the coating device 45. Next, the second base 5a coated with the ionizing-ray curable resin 44 is conveyed toward the laminating rolls 41 and 42. On the other hand, the reflecting-layer affixed optical layer 9 is let out from an optical layer supply roll (not shown) and is conveyed toward the laminating rolls 41 and 42.

Next, the second base 5a and the reflecting-layer affixed optical layer 9, each having been conveyed as described above, are sandwiched between the laminating rolls 41 and 42 without allowing bubbles to enter between the second base 5a and the reflecting-layer affixed optical layer 9, whereby the reflecting-layer affixed optical layer 9 is laminated on the second base 5a. Next, the second base 5a including the laminated reflecting-layer affixed optical layer 9 is conveyed along an outer circumferential surface of the laminating roll 41 while the irradiation device 46 irradiates the ionizing-ray curable resin 44 with the ionizing ray from the side including the second base 5a, thereby curing the ionizing-ray curable resin 44. As a result, the second base 5a and the reflecting-layer affixed optical layer 9 are affixed to each other with the ionizing-ray curable resin 44 interposed therebetween, and the objective optical film 1 having a long size is fabricated. Next, the fabricated belt-shaped optical film 1 is taken up by a take-up roll (not shown). Eventually, a stock roll in the rolled form of the belt-shaped optical film 1 is obtained.

Given that the process temperature in the above-described process of forming the second optical layer 5 is t° C., the first optical layer 4 in the cured state preferably has the storage modulus of $3 \times 10^7$ Pa or more at $(t-20)°$ C. Herein, the process temperature t is, for example, the heating temperature of the laminating roll 41. The first optical layer 4 is conveyed, for example, in such a state that the first optical layer 4 is formed on the first base 4a and is conveyed along the laminating roll 41 with the first base 4a interposed therebetween. It is, therefore, empirically confirmed that the actual temperature of the first optical layer 4 is about $(t-20)°$ C. Accordingly, by setting the storage modulus of the first optical layer 4 to be $3 \times 10^7$ Pa or more at $(t-20)°$ C., the concave-convex shape of the interface inside the optical layer can be prevented from deforming due to application of heat or both of heat and pressure.

Further, the first optical layer 4 preferably has the storage modulus of $3 \times 10^9$ Pa or less at 25° C. With such a property, the optical film 1 can be given with flexibility at the room temperature. Hence, the optical film 1 can be fabricated, for example, by using the roll-to-roll manufacturing process.

In consideration of the heat resistance of the resin used as the optical layer or the base, the process temperature t is preferably 200° C. or lower. However, when a resin having higher heat resistance is used, the process temperature t can be set to 200° C. or higher.

Setting of Film Thickness of Reflecting Layer

As described above, the redness index value and the blueness index value representing the reddish and bluish color tones, respectively, are changed depending on the film thicknesses of layers in the multilayer film of the reflecting layer 3. In the embodiment of the present application, therefore, the film thicknesses of the layers in the multilayer film of the reflecting layer 3 are set so as to satisfy the desired conditions of the redness index value and the blueness index value with the film thicknesses of the layers in the multilayer film being variables.

The film thicknesses of the layers in the multilayer film to satisfy the desired conditions of the redness index value and the blueness index value can be obtained, for example, through a simulation. More specifically, the film thicknesses of the layers in the multilayer film to satisfy the desired conditions of the redness index value and the blueness index value can be set by determining respective distributions of the redness index value and the blueness index value with respect to the film thicknesses through a simulation.

In the simulation, the film thicknesses of the layers in the multilayer film of the reflecting layer 3 are regarded as variables. In more detail, the redness index value and the blueness index value are each calculated by regarding, as variables, an optical film thickness x of the high refractive index layer as the first layer, a geometrical film thickness z of the metal layer as the second layer, and an optical film thickness y of the high refractive index layer as the third layer. Herein, the term "optical film thickness" implies a film thickness resulting from multiplying a geometrical film thickness by a refractive index.

Figure 14:
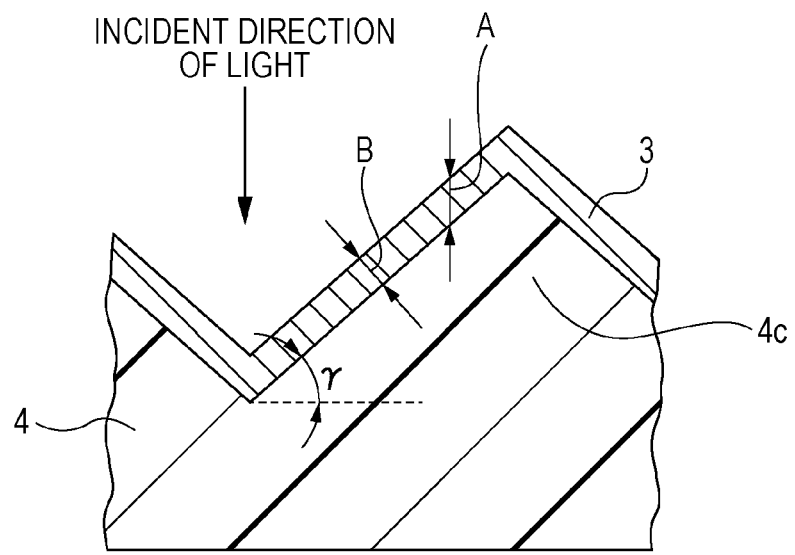
FIG. 14 is an illustration to explain a film thickness of the reflecting layer.

In the embodiment of the present application, as illustrated in FIG. 14, a direction perpendicular to a sloped surface of the structure 4c formed in the first optical layer 4 is defined as the thickness direction of each layer in the multilayer film of the reflecting layer 3. Given that an angle of the sloped surface of the structure 4c with respect to the principal surface of the first optical layer 4 is γ, there is a relationship of "A=B/cosγ" between a film thickness A in the direction perpendicular to the principal surface of the first optical layer 4 and a film thickness B in the direction perpendicular to the sloped surface of the structure 4c. For example, when the angle γ of the sloped surface of the structure 4c is 54°, "A≈1.7B" is resulted.

Figure 15:
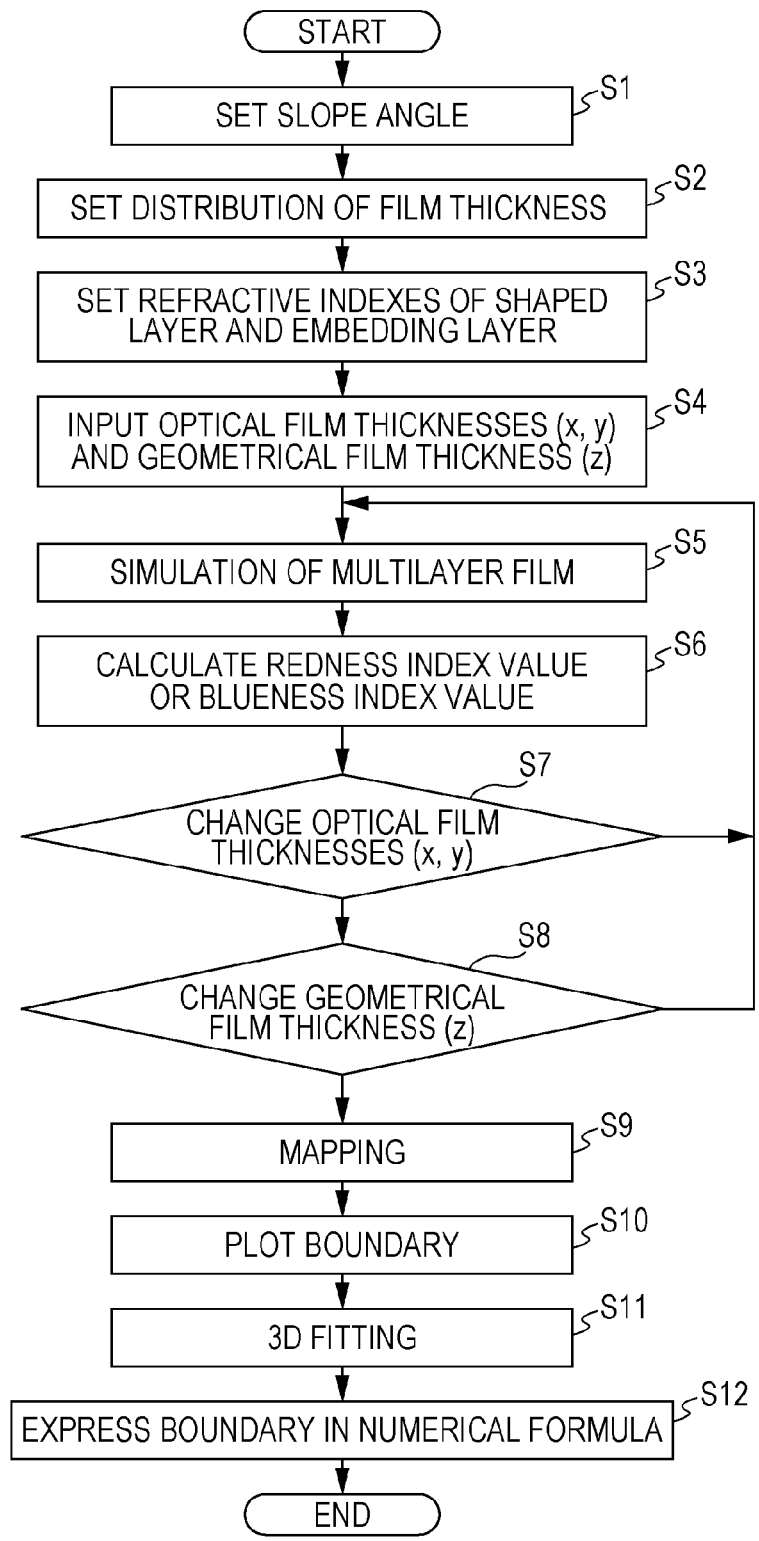
FIG. 15 is a flowchart illustrating one example of flow of processing to determine film thicknesses that satisfy respective desired values of a redness index and a blueness index.

One example of flow of processing to determine the film thicknesses that satisfy the desired conditions of the redness index value and the blueness index value will be described with reference to a flowchart of FIG. 15. First, conditions provided in steps S1 to S4 are set to perform the simulation when the film thicknesses of the layers in the multilayer film of the reflecting layer 3 are changed. The slope angle of the shape of the multilayer film is set in step S1. The film thickness distribution in each layer of the multilayer film is set in step S2. The refractive indexes of the shaped layer (first optical layer 4) and the embedding layer (second optical layer 5) are set in step S3. The optical film thicknesses x and y and the geometrical film thickness z are input in step S4.

In step S5, the simulation is performed based on the conditions set in steps S1 to S4. In step S6, the redness index value or the blueness index value is calculated for the optical film thicknesses x and y and the geometrical film thickness z, which have been set in step S4.

In step S7, the optical film thicknesses x and y are changed to vary the film thicknesses of the corresponding layers. Then, the redness index value or the blueness index value at a certain film thickness of the metal layer is calculated. In step S8, the geometrical film thickness z is changed. Then, the redness index value or the blueness index value is calculated by repeating the simulation in steps S5 to S7.

In step S9, the redness index value or the blueness index value calculated in step S6 is subjected to three-dimensional mapping on a three-dimensional orthogonal coordinate system (x-y-z). In step S10, a region satisfying the desired condition of the redness index value or the blueness index value and a region not satisfying the desired condition are separated by plotting boundary values.

Because the mapping performed in step S9 provides a set of discrete data for each value of z, 3D (three-dimensional) fitting is performed in step S11.

In step S12, a boundary between the region satisfying the desired condition of the redness index value or the blueness index value and the region not satisfying the desired condition is expressed by a numerical formula based on data obtained in step S11 after the 3D fitting. For example, predetermined values on the boundary are extracted and a curved surface approximating to the boundary between the region satisfying the desired condition of the redness index value or the blueness index value and the region not satisfying the desired condition is expressed by a numerical formula based on the extracted values. As a result, the region satisfying the desired condition of the redness index value or the blueness index value can be determined.

A series of processing steps described above may include appropriate coordinate transformation and inverse transformation.

The region satisfying the desired condition of the redness index value or the blueness index value for the optical film thicknesses x and y and the geometrical film thickness z will be described in more detail below. Preferable ranges of the redness index value and the blueness index value are first described.

Preferable Range of Redness Index Value: 0.258 or Smaller

Figure 16A:
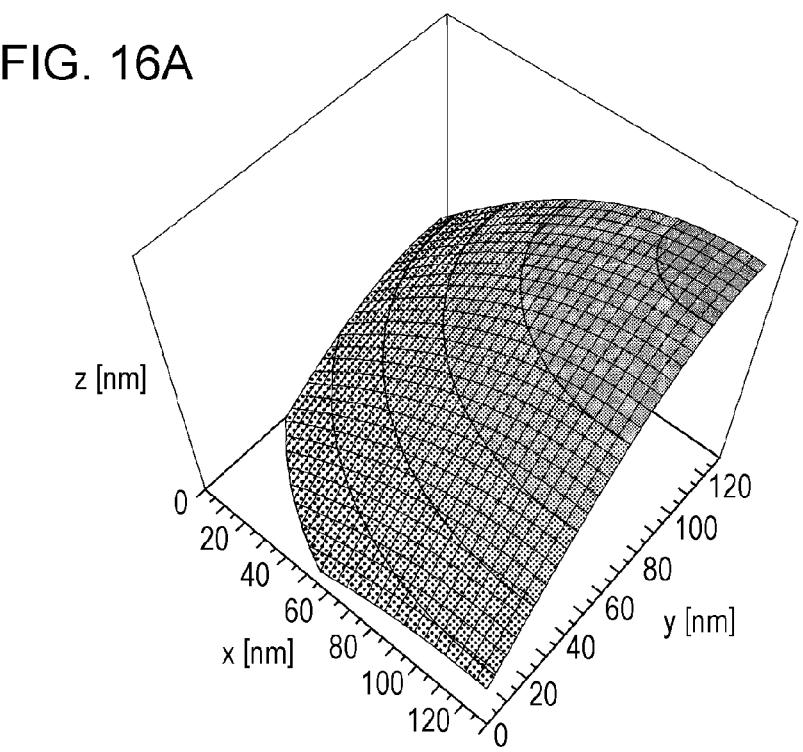
FIG. 16A illustrates the simulation result when the reflecting layer is formed on a shaped layer such that the redness index value is held in a preferable range.
Figure 16B:
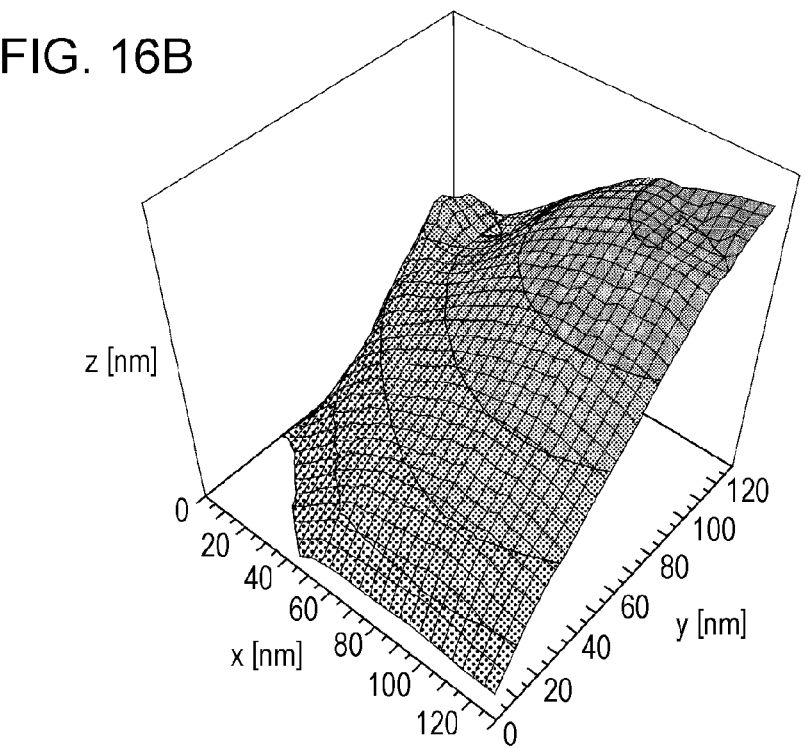
FIG. 16B illustrates the simulation result before 3D fitting when the reflecting layer is formed on the shaped layer such that the redness index value is held in the preferable range.

FIGS. 16A and 16B are plots to explain the combination of film thicknesses when the redness index value is in the preferable range with respect to (x, y, z). In FIGS. 16A and 16B, x represents the optical film thickness of the high refractive index layer as the first layer, y represents the optical film thickness of the high refractive index layer as the third layer, and z represents the geometrical film thickness of the metal layer (as the second layer). This is similarly applied to FIGS. 17A to FIG. 21B, which are referred to in the following description. FIG. 16A illustrates the simulation result when the reflecting layer is formed on the shaped layer such that the redness index value is held in the preferable range, and FIG. 16B illustrates the simulation result before the 3D fitting when the reflecting layer is formed on the shaped layer such that the redness index value is held in the preferable range.

A curved surface illustrated in FIG. 16A represents a set of points at which the redness index value takes 0.258 for each combination of (x, y, z), and it provides an interface boundary between the region where the redness index value is in the preferable range and the region where the redness index value is not in the preferable range.

A region expressed by the following formula (1) is derived based on the points that exist on the boundary illustrated in FIG. 16A:

$$z \le 12.1 \exp\left\{ -\frac{1}{2}\left(\frac{x-120}{145.17}\right)^2 - \frac{1}{2}\left(\frac{y-120}{123.14}\right)^2 \right\} \quad (1)$$

Thus, the region expressed by the formula (1) provides the region where the redness index value is in the preferable range for the combination of film thicknesses (x, y, z) of the reflecting layer.

Preferable Range of Blueness Index Value: 0.210 or Smaller

Figure 17A:
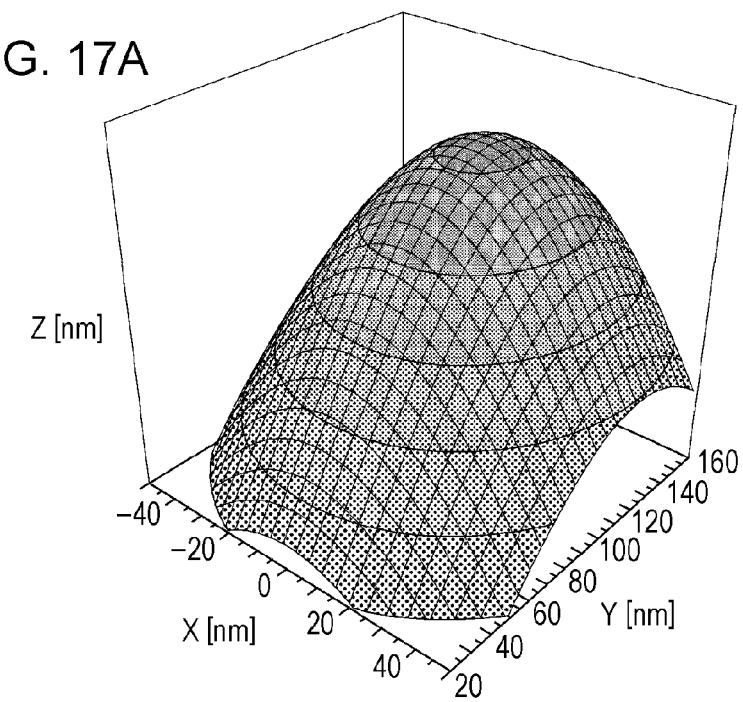
FIG. 17A illustrates the simulation result when the reflecting layer is formed on the shaped layer such that the blueness index value is held in a preferable range.
Figure 17B:
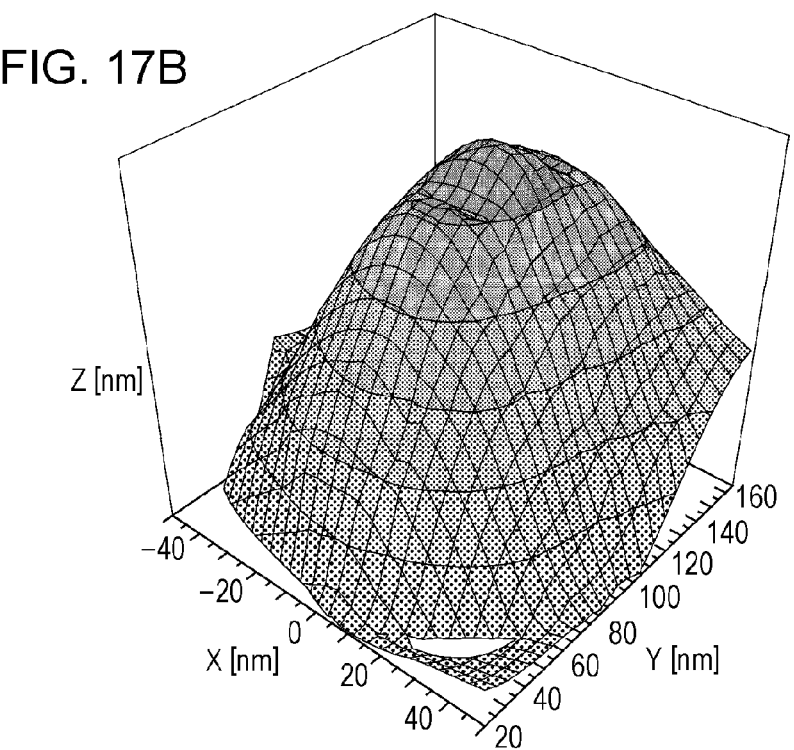
FIG. 17B illustrates the simulation result before 3D fitting when the reflecting layer is formed on the shaped layer such that the blueness index value is held in the preferable range.

FIGS. 17A and 17B are plots to explain the combination of film thicknesses when the blueness index value is in the preferable range with respect to (x, y, z). FIG. 17A illustrates the simulation result when the reflecting layer is formed on the shaped layer such that the blueness index value is held in the preferable range, and FIG. 17B illustrates the simulation result before the 3D fitting when the reflecting layer is formed on the shaped layer such that the blueness index value is held in the preferable range.

Here, the simulation for the blueness index value is performed by using (X, Y, Z) obtained through appropriate coordinate transformation H made on (x, y, z). Given that the coordinate transformation is symbolically expressed by H, (X, Y, Z)=H(x, y, z) is held. FIGS. 17A and 17B illustrate the simulation result in terms of (X, Y, Z). This is similarly applied to FIGS. 19A and 19B and FIGS. 21A and 21B, which are referred to in the following description. Such coordinate transformation is performed for the purpose of easier comparison with the simulation result for the redness index value, and is not important to the concept of the present application. For that reason, details of the coordinate transformation H are not described here.

A curved surface illustrated in FIG. 17A represents a set of points at which the blueness index value takes 0.210 for each combination of (X, Y, Z), and it provides an interface boundary between the region where the blueness index value is in the preferable range and the region where the blueness index value is not in the preferable range.

A region expressed by the following formula (2) in terms of (x, y, z) is derived based on the points, which exist on the boundary illustrated in FIG. 17A, through the inverse transformation $H^{-1}$ made on (X, Y, Z):

$$z \leq 12.2\exp\left\{-\frac{1}{4}\left(\frac{x-y}{62.71}\right)^2 - \frac{1}{2}\left(\frac{0.70(x+y)-120}{99.41}\right)^2\right\} \quad (2)$$

Thus, the region expressed by the formula (2) provides the region where the blueness index value is in the preferable range for the combination of film thicknesses (x, y, z) of the reflecting layer.

Next, more preferable ranges of the redness index value and the blueness index value are described.

More Preferable Range of Redness Index Value: 0.250 or Smaller

Figure 18A:
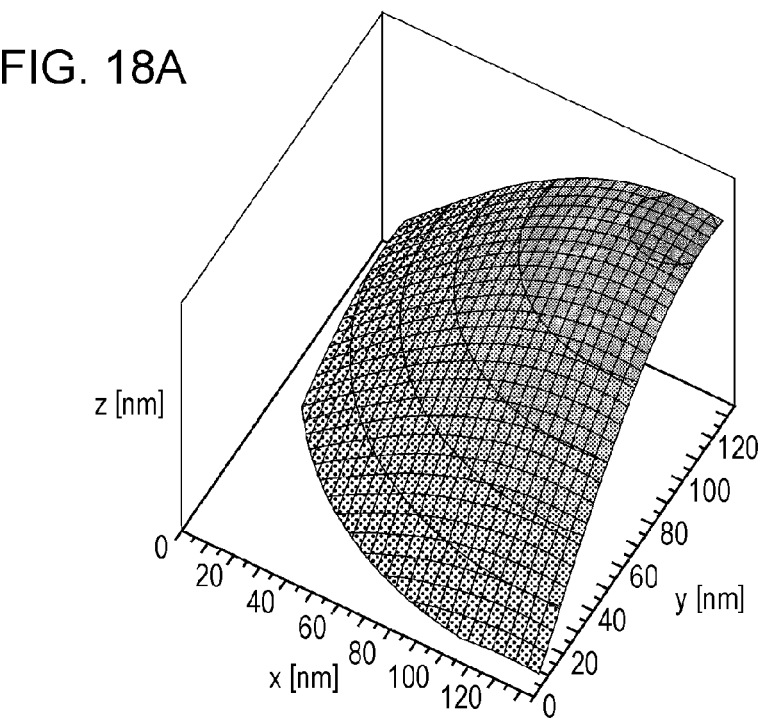
FIG. 18A illustrates the simulation result when the reflecting layer is formed on the shaped layer such that the redness index value is held in a more preferable range.
Figure 18B:
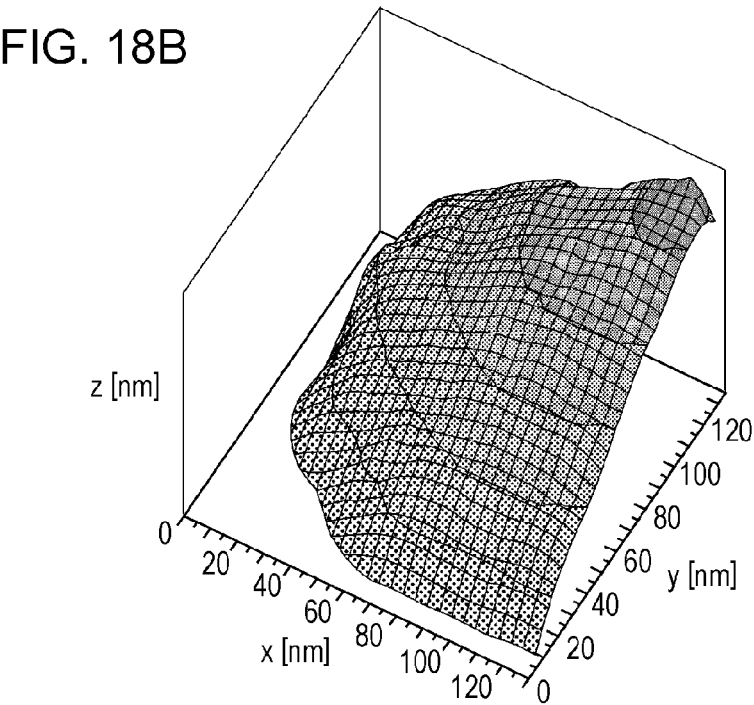
FIG. 18B illustrates the simulation result before 3D fitting when the reflecting layer is formed on the shaped layer such that the redness index value is held in the more preferable range.

FIGS. 18A and 18B are plots to explain the combination of film thicknesses when the redness index value is in the more preferable range with respect to (x, y, z). FIG. 18A illustrates the simulation result when the reflecting layer is formed on the shaped layer such that the redness index value is held in the more preferable range, and FIG. 18B illustrates the simulation result before the 3D fitting when the reflecting layer is formed on the shaped layer such that the redness index value is held in the more preferable range.

A curved surface illustrated in FIG. 18A represents a set of points at which the redness index value takes 0.250 for each combination of (x, y, z), and it provides an interface boundary between the region where the redness index value is in the more preferable range and the region where the redness index value is not in the more preferable range.

A region expressed by the following formula (3) is derived based on the points that exist on the boundary illustrated in FIG. 18A:

$$z \leq 12.1\exp\left\{-\frac{1}{2}\left(\frac{x-120}{121.57}\right)^2 - \frac{1}{2}\left(\frac{y-120}{107.57}\right)^2\right\} \quad (3)$$

Thus, the region expressed by the formula (3) provides the region where the redness index value is in the more preferable range for the combination of film thicknesses (x, y, z) of the reflecting layer.

More Preferable Range of Blueness Index Value: 0.200 or Smaller

Figure 19A:
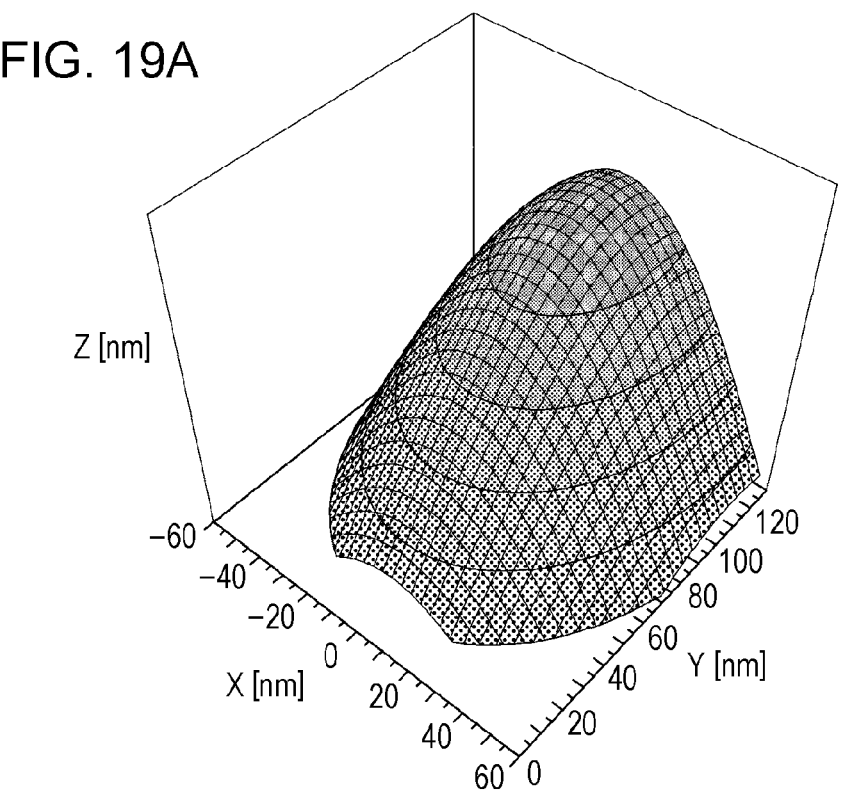
FIG. 19A illustrates the simulation result when the reflecting layer is formed on the shaped layer such that the blueness index value is held in a more preferable range.
Figure 19B:
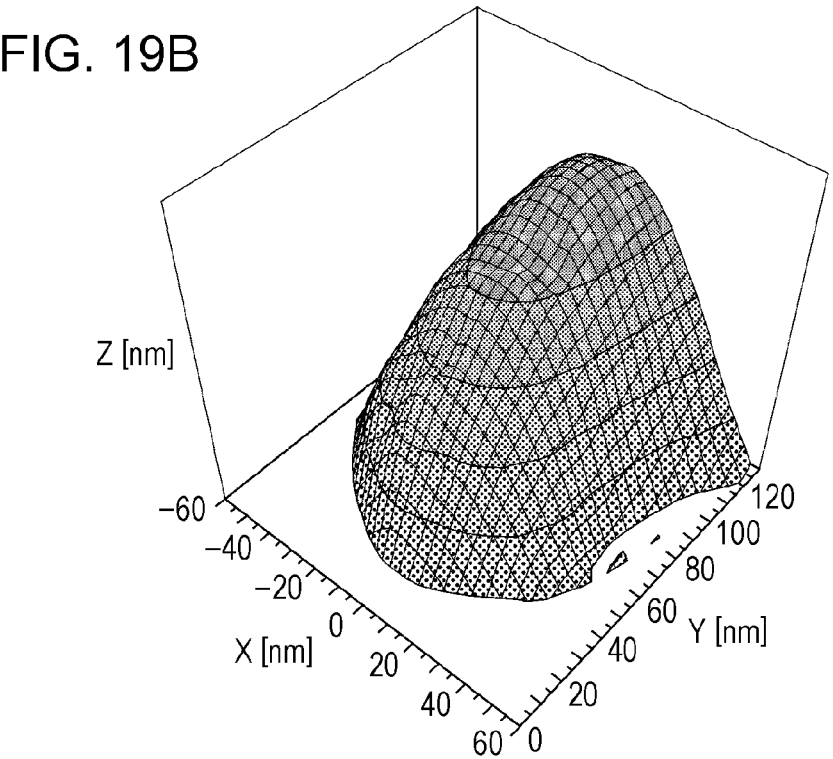
FIG. 19B illustrates the simulation result before 3D fitting when the reflecting layer is formed on the shaped layer such that the blueness index value is held in the more preferable range.

FIGS. 19A and 19B are plots to explain the combination of film thicknesses when the blueness index value is in the more preferable range with respect to (x, y, z). FIG. 19A illustrates the simulation result when the reflecting layer is formed on the shaped layer such that the blueness index value is held in the more preferable range, and FIG. 19B illustrates the simulation result before the 3D fitting when the reflecting layer is formed on the shaped layer such that the blueness index value is held in the more preferable range.

A curved surface illustrated in FIG. 19A represents a set of points at which the blueness index value takes 0.200 for each combination of (X, Y, Z), and it provides an interface boundary between the region where the blueness index value is in the more preferable range and the region where the blueness index value is not in the more preferable range.

A region expressed by the following formula (4) in terms of (x, y, z) is derived based on the points, which exist on the boundary illustrated in FIG. 19A, through the inverse transformation $H^{-1}$ made on (X, Y, Z):

$$z \leq 11.8\exp\left\{-\frac{1}{4}\left(\frac{x-y}{61.22}\right)^2 - \frac{1}{2}\left(\frac{0.70(x+y)-110}{97.89}\right)^2\right\} \quad (4)$$

Thus, the region expressed by the formula (4) provides the region where the blueness index value is in the more preferable range for the combination of film thicknesses (x, y, z) of the reflecting layer.

Next, especially preferable ranges of the redness index value and the blueness index value are described.

(Especially Preferable Range of Redness Index Value: 0.200 or Smaller)

Figure 20A:
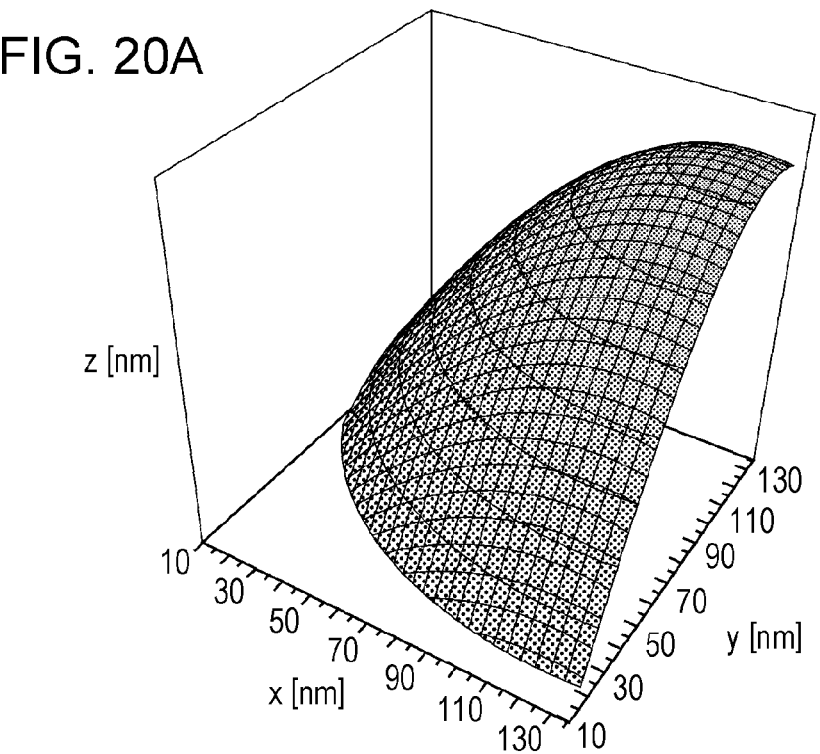
FIG. 20A illustrates the simulation result when the reflecting layer is formed on the shaped layer such that the redness index value is held in an especially preferable range.
Figure 20B:
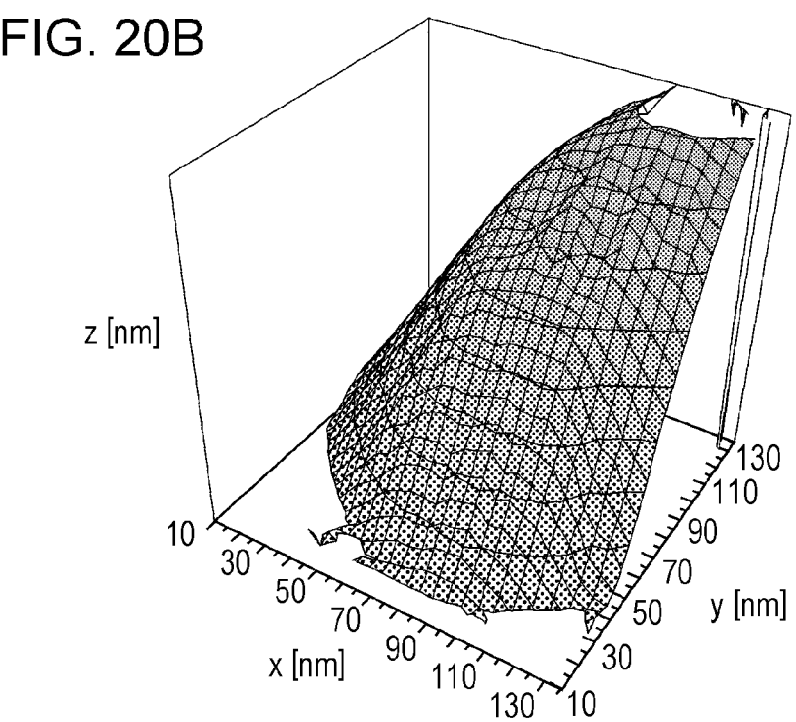
FIG. 20B illustrates the simulation result before 3D fitting when the reflecting layer is formed on the shaped layer such that the redness index value is held in the especially preferable range.

FIGS. 20A and 20B are plots to explain the combination of film thicknesses when the redness index value is in the especially preferable range with respect to (x, y, z). FIG. 20A illustrates the simulation result when the reflecting layer is formed on the shaped layer such that the redness index value is held in the especially preferable range, and FIG. 20B illustrates the simulation result before the 3D fitting when the reflecting layer is formed on the shaped layer such that the redness index value is held in the especially preferable range.

A curved surface illustrated in FIG. 20A represents a set of points at which the redness index value takes 0.200 for each combination of (x, y, z), and it provides an interface boundary between the region where the redness index value is in the especially preferable range and the region where the redness index value is not in the especially preferable range.

A region expressed by the following formula (5) is derived based on the points that exist on the boundary illustrated in FIG. 20A:

$$z \leq 9.70\exp\left\{-\frac{1}{2}\left(\frac{x-120}{147.139}\right)^2 - \frac{1}{2}\left(\frac{y-120}{121.942}\right)^2\right\} \quad (5)$$

Thus, the region expressed by the formula (5) provides the region where the redness index value is in the especially preferable range for the combination of film thicknesses (x, y, z) of the reflecting layer.

Especially Preferable Range of Blueness Index Value: 0.170 or Smaller

Figure 21A:
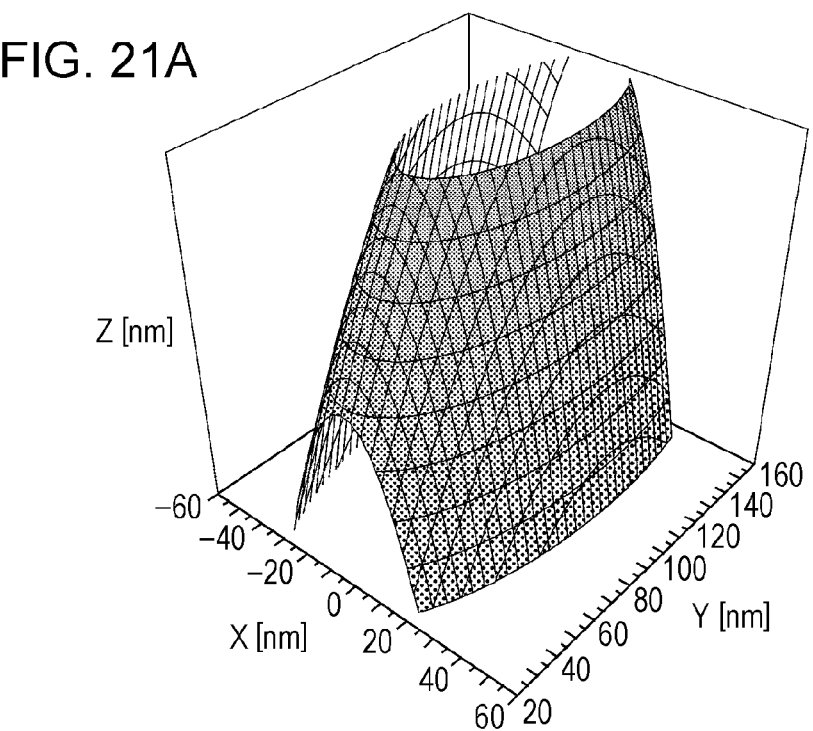
FIG. 21A illustrates the simulation result when the reflecting layer is formed on the shaped layer such that the blueness index value is held in an especially preferable range.
Figure 21B:
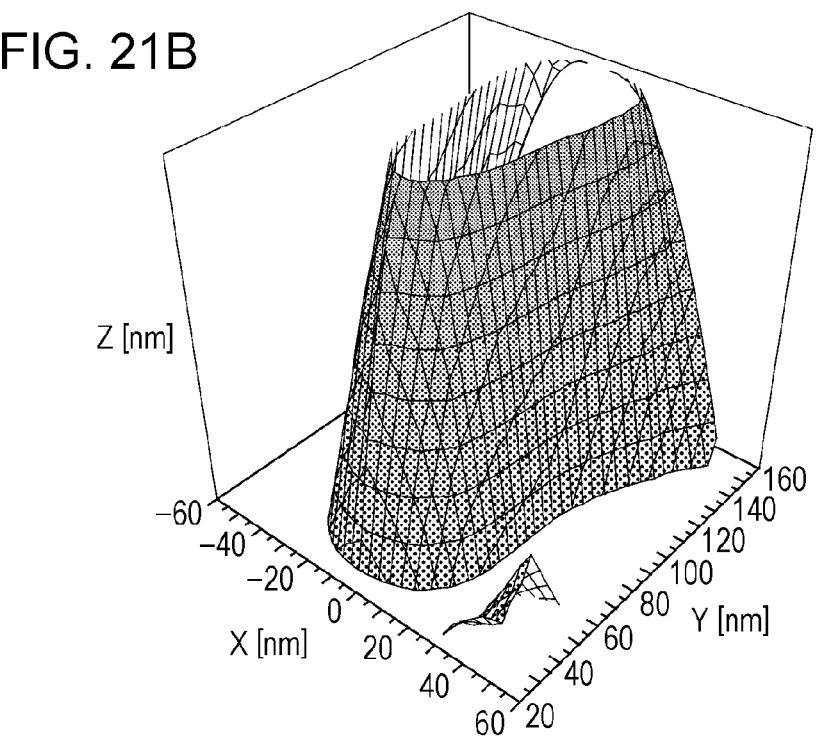
FIG. 21B illustrates the simulation result before 3D fitting when the reflecting layer is formed on the shaped layer such that the blueness index value is held in the especially preferable range.

FIGS. 21A and 21B are plots to explain the combination of film thicknesses when the blueness index value is in the especially preferable range with respect to (x, y, z). FIG. 21A illustrates the simulation result when the reflecting layer is formed on the shaped layer such that the blueness index value is held in the especially preferable range, and FIG. 21B illustrates the simulation result before the 3D fitting when the reflecting layer is formed on the shaped layer such that the blueness index value is held in the especially preferable range.

A curved surface illustrated in FIG. 21A represents a set of points at which the blueness index value takes 0.170 for each combination of (X, Y, Z), and it provides an interface boundary between the region where the blueness index value is in the especially preferable range and the region where the blueness index value is not in the especially preferable range.

A region expressed by the following formula (6) in terms of (x, y, z) is derived based on the points, which exist on the boundary illustrated in FIG. 21A, through the inverse transformation $H^{-1}$ made on (X, Y, Z):

$$z \le 9.72\exp\left\{-\frac{1}{2}\left(\frac{0.7(x-y)+5}{50.00}\right)^2 - \frac{1}{2}\left(\frac{0.7(x+y)-110}{134.16}\right)^2\right\} \quad (6)$$

Thus, the region expressed by the formula (6) provides the region where the blueness index value is in the especially preferable range for the combination of film thicknesses (x, y, z) of the reflecting layer.

In short, by setting the optical film thickness x of the high refractive index layer as the first layer, the optical film thickness y of the high refractive index layer as the third layer, and the geometrical film thickness z of the metal layer so as to fall within one of the regions described above, the multilayer film satisfying the desired condition of the redness index value or the blueness index value can be formed.

Generally, a blue-based color tone of the reflected light provides a cool (or refreshing) feeling, and hence constraint conditions imposed on the blue-based color tone in design is relatively moderate. On the other hand, a red-based color tone of the reflected light provides an impression disturbing harmony in color with respect to the surroundings, and hence constraint conditions imposed on the red-based color tone in design tend to be relatively severe.

While the above description is made in connection with the case of deriving the region that satisfies the desired condition of the redness index value or the blueness index value, it is also possible to derive the region satisfying the desired condition of the redness index value and the region satisfying the desired condition of the blueness index value, and to set a region satisfying both of those two conditions. By setting such a region, an optical body providing the reflected light in a neutral color tone can be designed.

Design of Optical Body Providing Reflected Light in Neutral Color Tone

The optical body providing the reflected light in the neutral color tone can be obtained by calculating the region satisfying the desired condition of the redness index value and the region satisfying the desired condition of the blueness index value, and taking a product set of both the regions. Stated another way, that type of optical body can be obtained by deriving a region where (x, y, z) satisfies the following formula (1) and the following formula (2):

$$z \le 12.1\exp\left\{-\frac{1}{2}\left(\frac{x-120}{145.17}\right)^2 - \frac{1}{2}\left(\frac{y-120}{123.14}\right)^2\right\} \quad (1)$$

$$z \le 12.2\exp\left\{-\frac{1}{4}\left(\frac{x-y}{62.71}\right)^2 - \frac{1}{2}\left(\frac{0.70(x+y)-120}{99.41}\right)^2\right\} \quad (2)$$

As a matter of course, a region where (x, y, z) satisfies the following formula (3) and the following formula (4) instead of the combination of the formulae (1) and (2) may be derived:

$$z \le 12.1\exp\left\{-\frac{1}{2}\left(\frac{x-120}{121.57}\right)^2 - \frac{1}{2}\left(\frac{y-120}{107.57}\right)^2\right\} \quad (3)$$

$$z \le 11.8\exp\left\{-\frac{1}{4}\left(\frac{x-y}{61.22}\right)^2 - \frac{1}{2}\left(\frac{0.70(x+y)-110}{97.89}\right)^2\right\} \quad (4)$$

Alternatively, a region where (x, y, z) satisfies the following formula (5) and the following formula (6) may be derived:

$$z \le 9.70\exp\left\{-\frac{1}{2}\left(\frac{x-120}{147.139}\right)^2 - \frac{1}{2}\left(\frac{y-120}{121.942}\right)^2\right\} \quad (5)$$

$$z \le 9.72\exp\left\{-\frac{1}{2}\left(\frac{0.7(x-y)+5}{50.00}\right)^2 - \frac{1}{2}\left(\frac{0.70(x+y)-110}{134.16}\right)^2\right\} \quad (6)$$

In addition to the above-described examples, a region where (x, y, z) satisfies one of the formulae (1), (3) and (5) and one of the formulae (2), (4) and (6) may be derived.

According to the first embodiment, the change in color tone can be suppressed by determining the region(s) satisfying the desired conditions of the redness index value and the blueness index value for the optical film thickness x of the high refractive index layer as the first layer, the optical film thickness y of the high refractive index layer as the third layer, and the geometrical film thickness z of the metal layer, and by setting the film thickness of the reflecting layer 3 such that the optical film thickness x of the high refractive index layer as the first layer, the optical film thickness y of the high refractive index layer as the third layer, and the geometrical film thickness z of the metal layer fall within the determined region(s).

Modifications

Modifications of the First Embodiment Will be Described Below.

First Modification

Figure 22A:
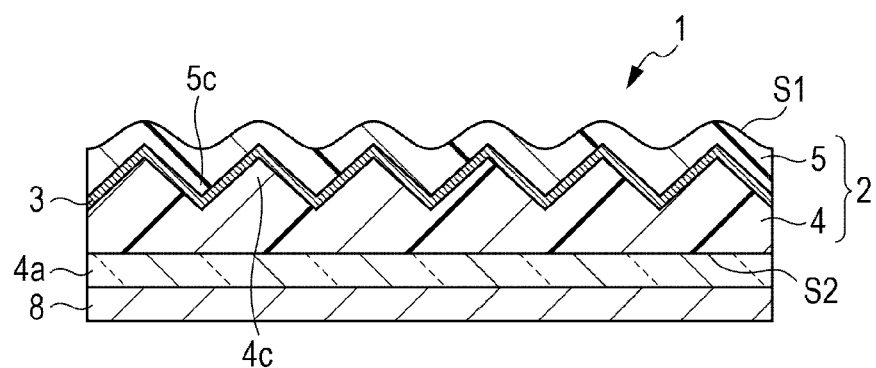
FIG. 22A is a sectional view illustrating a first modification of the first embodiment of the present application.

FIG. 22A is a sectional view illustrating a first modification of the first embodiment of the present application. As illustrated in FIG. 22A, an optical film 1 according to the first modification has an incident surface S1 in a concave-convex shape. The concave-convex shape of the incident surface S1 and the concave-convex shape of the first optical layer 4 are formed, for example, such that both the concave-convex shapes correspond to each other, namely such that positions of apex portions of convexes and positions of bottom portions of concaves are aligned between both the concave-convex shapes. The concave-convex shape of the incident surface S1 is preferably gentler than that of the first optical layer 4.

Second Modification

Figure 22B:
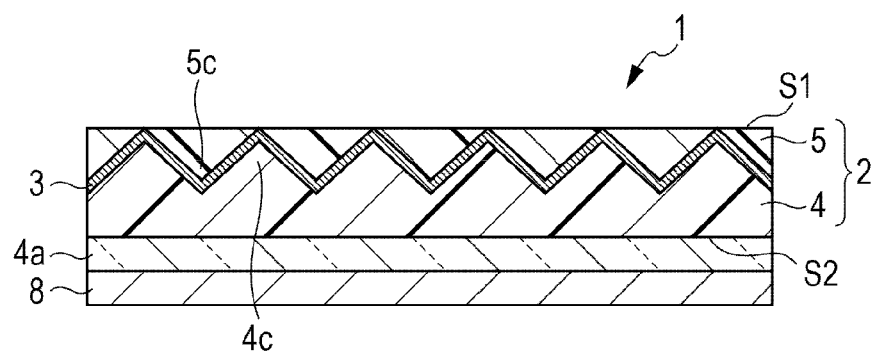
FIG. 22B is a sectional view illustrating a second modification of the first embodiment of the present application.

FIG. 22B is a sectional view illustrating a second modification of the first embodiment of the present application. As illustrated in FIG. 22B, an optical film 1 according to the second modification is formed such that apex portions of convexes in the concave-convex shape of the first optical layer 4, on which the reflecting layer 3 is formed, are substantially flush with the incident surface S1 of the second optical layer 5.

2. Second Embodiment

FIGS. 23A to 26B illustrate examples of configuration of optical films according to a second embodiment of the present application. In the second embodiment, components corresponding to those in the first embodiment are denoted by the same symbols. The second embodiment differs from the first embodiment in that structures 4c are two-dimensionally arrayed on one principal surface of the first optical layer 4. The two-dimensional array is preferably a two-dimensional array in a closest-packed state. Such an array can increase the directional reflectance.

Figure 23A:
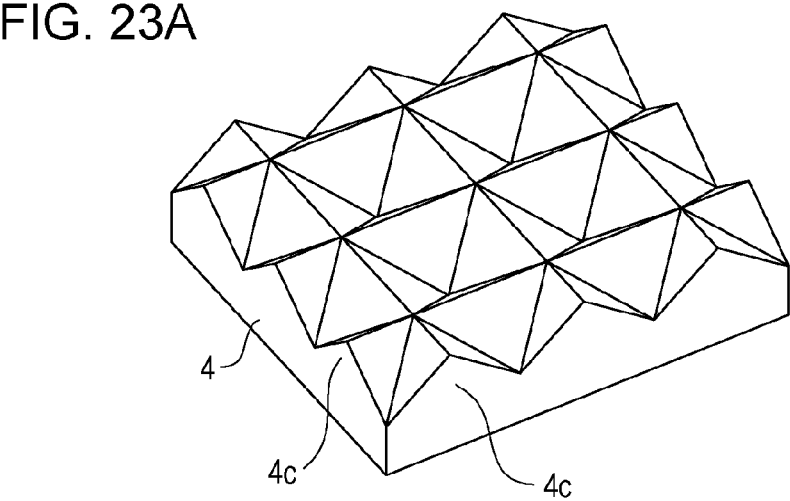
FIG. 23A is a perspective view illustrating a first example of configuration of a first optical layer in an optical film according to a second embodiment of the present application.
Figure 23B:
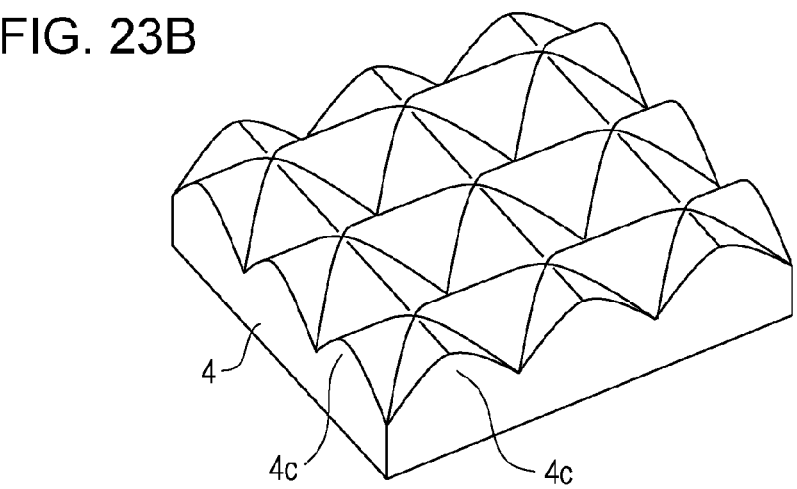
FIG. 23B is a perspective view illustrating a second example of configuration of the first optical layer in the optical film according to the second embodiment of the present application.
Figure 23C:
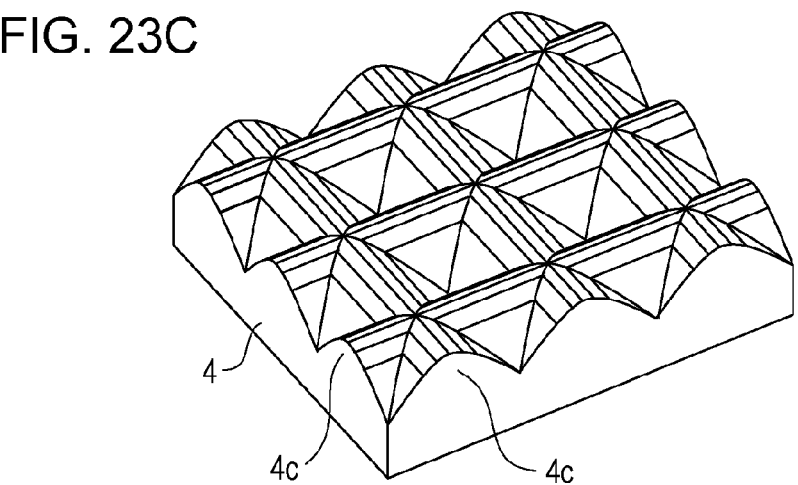
FIG. 23C is a perspective view illustrating a third example of configuration of the first optical layer in the optical film according to the second embodiment of the present application.

As illustrated in FIGS. 23A and 23B, for example, pillar-like structures (pillars) 4c are formed on the one principal surface of the first optical layer 4 in an orthogonal array. In more detail, first structures 4c arrayed side by side in a first direction and second structures 4c arrayed side by side in a second direction perpendicular to the first direction are formed such that the first and second structures intersect while transversely penetrating through each other in a cruciform pattern. The pillar-like structures 4c are each a convex or a concave having, e.g., a pillar-like shape, such as a prism-like shape (FIG. 23A) or a lenticular shape (FIG. 23B), or a shape obtained by modifying an apex portion of the pillar-like shape into a polygonal shape (e.g., a pentagonal shape) (FIG. 23C).

Figure 24A:
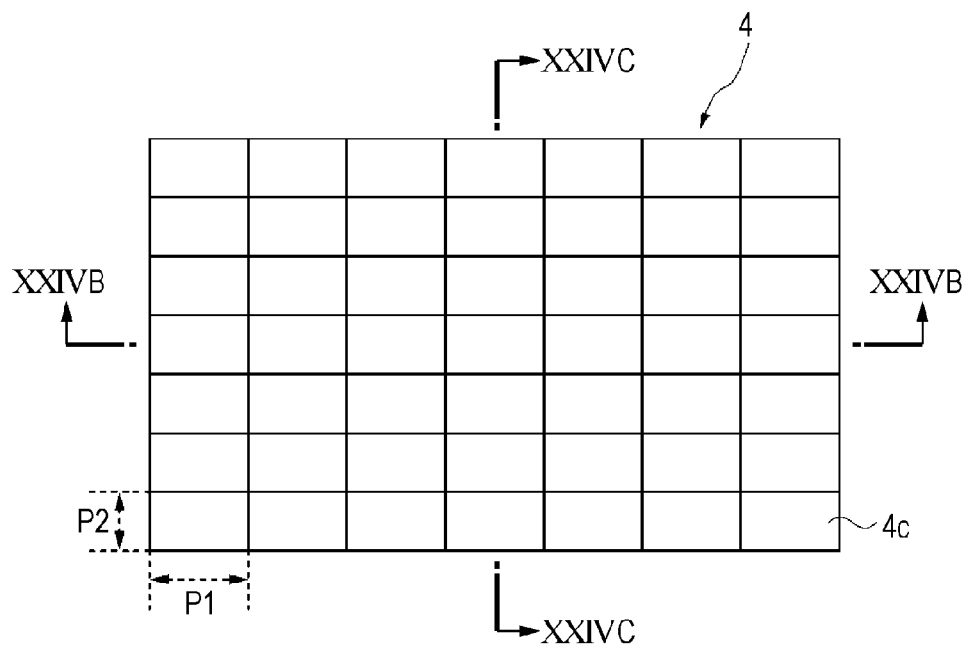
FIG. 24A is a plan view illustrating a fourth example of configuration of the first optical layer in the optical film according to the second embodiment of the present application.
Figure 24B:
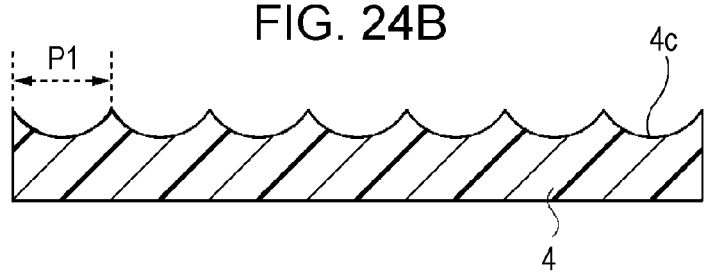
FIG. 24B is a sectional view, taken along line XXIVB-XXIVB, of the first optical layer illustrated in FIG. 24A.
Figure 24C:
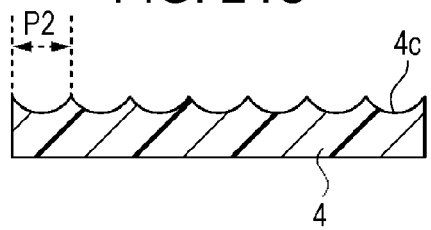
FIG. 24C is a sectional view, taken along line XXIVC-XXIVC, of the first optical layer illustrated in FIG. 24A.
Figure 25A:
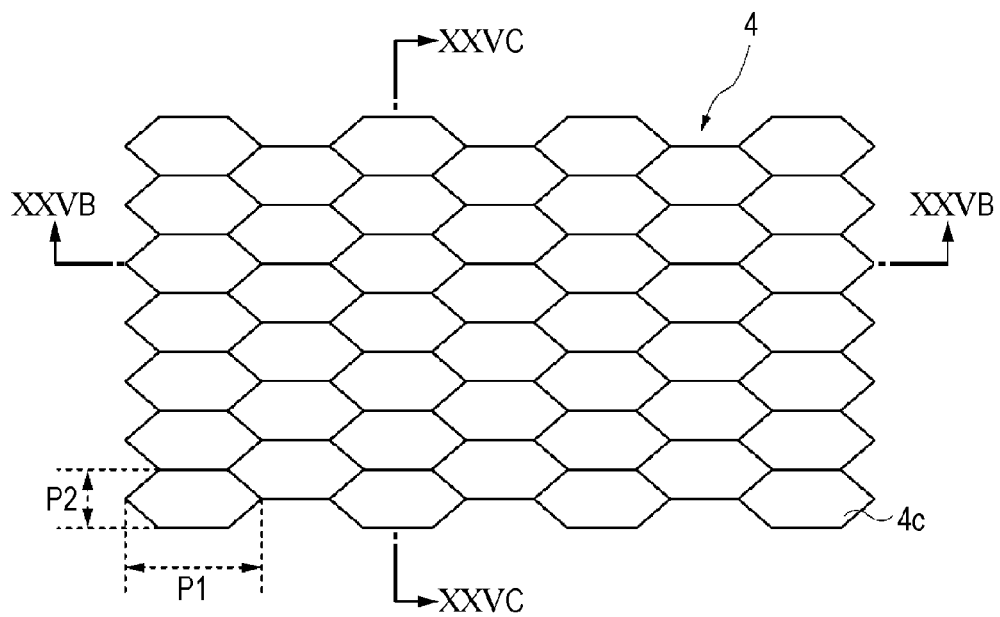
FIG. 25A is a plan view illustrating a fifth example of configuration of the first optical layer in the optical film according to the second embodiment of the present application.
Figure 25B:
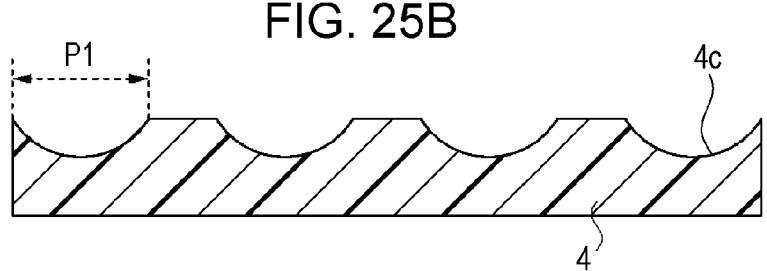
FIG. 25B is a sectional view, taken along line XXVB-XXVB, of the first optical layer illustrated in FIG. 25A.
Figure 25C:
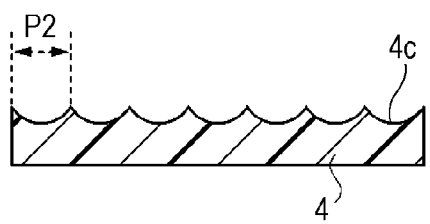
FIG. 25C is a sectional view, taken along line XXVC-XXVC, of the first optical layer illustrated in FIG. 25A.
Figure 26A:
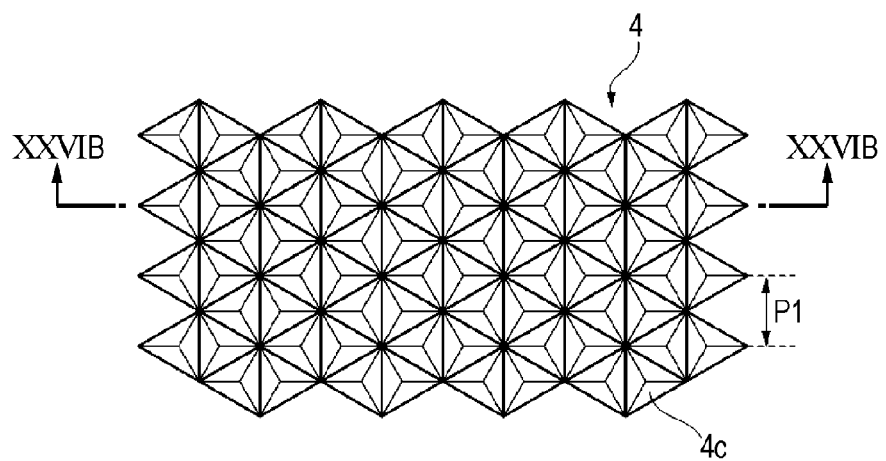
FIG. 26A is a plan view illustrating a sixth example of configuration of the first optical layer in the optical film according to the second embodiment of the present application.
Figure 26B:
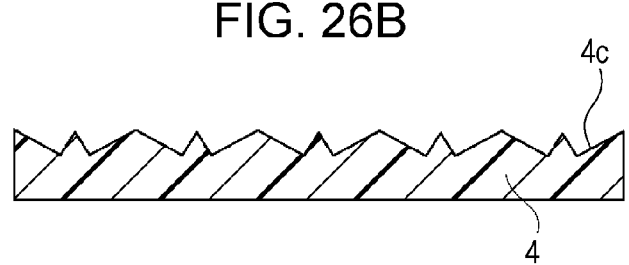
FIG. 26B is a sectional view, taken along line XXVIB-XXVIB, of the first optical layer illustrated in FIG. 26A.

Further, a close-packed array, such as a quadrangular close-packed array, a delta close-packed array, or a hexagonal close-packed array, may be formed by two-dimensionally arraying the structures 4c, each having, e.g., a spherical shape or a corner cube shape, on the one principal surface of the first optical layer 4 in a closest-packed state. In the quadrangular close-packed array, as illustrated in FIGS. 24A to 24C, for example, the structures 4c each having a rectangular (e.g., square) bottom surface are arrayed in a quadrangular closest-packed state, i.e., a matrix (lattice) pattern. In the hexagonal close-packed array, as illustrated in FIGS. 25A to 25C, for example, the structures 4c each having a hexagonal bottom surface are arrayed in a hexagonal closest-packed state. In the delta close-packed array, as illustrated in FIGS. 26A and 26B, for example, the structures 4c (e.g., triangular pyramids) each having a triangular bottom surface are arrayed in a closest-packed state.

The structure 4c is a convex or a concave having, e.g., a corner-cube, semi spherical, semi-ellipsoidal, prism-like, cylindrical, free-form, polygonal, conical, pyramidal, frusto-conical, or parabolic shape. The bottom surface of the structure 4c is, e.g., circular, elliptic, or polygonal, such as triangular, rectangular, hexagonal, or octagonal. Pitches P1 and P2 of the structures 4c are preferably selected, as appropriate, depending on the desired optical characteristics. When the principal axis of the structure 4c is inclined with respect to a line perpendicular to the incident surface of the optical film 1, the principal axis of the structure 4c is preferably inclined in at least one of two directions in which the structures 4c are two-dimensionally arrayed. Further, when the optical film 1 is affixed to a window member that is arranged substantially vertically to the ground, the principal axis of the structure 4c is preferably inclined downward of the window member (i.e., toward the ground side) with respect to a line perpendicular to the window member.

In the case of the structure 4c having the corner cube shape, when a ridgeline has a large curvature radius R, the structure 4c is preferably inclined toward the sky, i.e., upward. On the other hand, for the purpose of suppressing the downward reflection, the structure 4c is preferably inclined toward the ground side. Because the sunlight is obliquely incident on the optical film, the light is hard to reach the innermost of the structure, and the shape of the optical film on the incident side is important. Stated another way, when the ridgeline has the large curvature radius R, the amount of retroreflected light is reduced. Such a reduction in the amount of retroreflected light can be suppressed by inclining the structure 4c toward the sky. Further, in the case of the corner cube shape, the incident light is usually retroreflected after being reflected by the reflecting surface three times. However, some part of the incident light is leaked to directions other than the retroreflection direction after being reflected twice. The leaked light can be returned in a larger amount toward the sky by inclining the corner cube toward the ground side. Thus, the structure 4c may be inclined in any desired direction depending on the shape of the structure 4c and the purpose of the optical film.

3. Third Embodiment

Figure 27A:
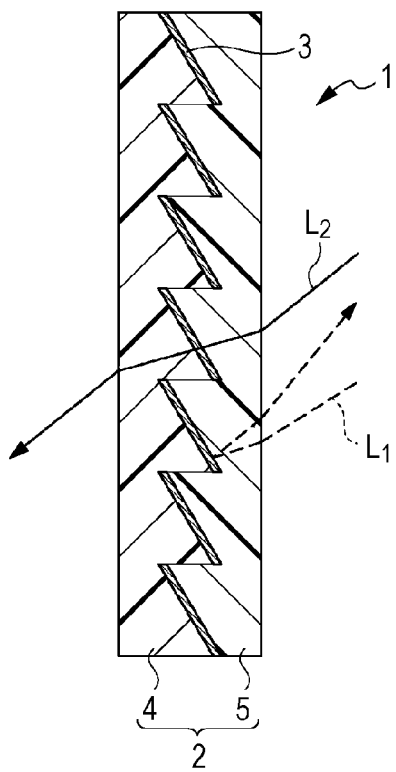
FIG. 27A is a sectional view illustrating one example of construction of an optical film according to a third embodiment of the present application.

FIG. 27A is a sectional view illustrating one example of construction of an optical film according to a third embodiment of the present application. In the third embodiment, the same components as those in the first embodiment are denoted by the same symbols and description of those components is omitted here. The third embodiment differs from the first embodiment in that a plurality of individual reflecting layers 3 inclined with respect to the light incident surface are formed in the optical layer 2 and are arranged parallel to each other.

Figure 27B:
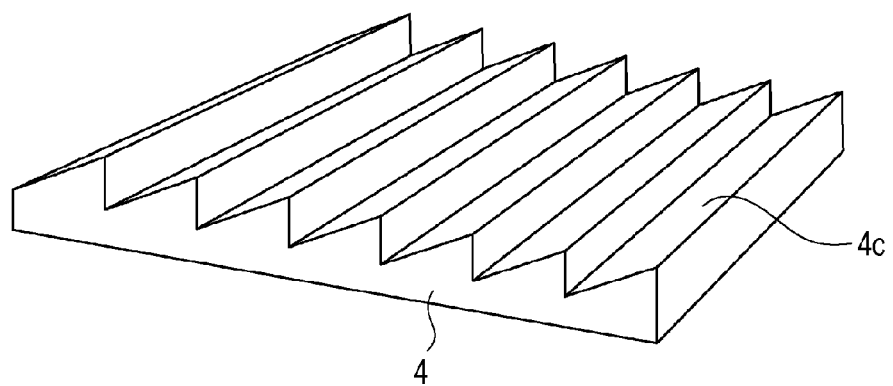
FIG. 27B is a perspective view illustrating one example of configuration of a first optical layer in the optical film according to the third embodiment of the present application.

FIG. 27B is a perspective view illustrating one example of configuration of structures 4c formed in the optical layer of the optical film according to the third embodiment of the present application. The structures 4c are each in the form of a triangular pillar-like convex extending in one direction, and the pillar-like structures 4c are arrayed side by side in one direction, i.e., in a one-dimensional pattern. A cross-section of the structure 4c in a direction perpendicular to the extending direction of the structure 4c has, e.g., a right-angled triangular shape. The reflecting layer 3 is formed on a sloped surface of the structure 4c, which is inclined at an acute angle, by a thin-film forming process that has directionality, such as vapor deposition or sputtering.

According to the third embodiment, the individual reflecting layers 3 are arranged parallel to each other in the optical layer 2. Therefore, the number of reflections by the reflecting layer 3 can be reduced in comparison with the case where the structure 4c is formed in the corner cube shape or the prism-like shape. It is hence possible to increase the reflectance and to reduce the amount of light absorbed by the reflecting layer 3.

4. Fourth Embodiment

A fourth embodiment differs from the first embodiment in that an optical film 1 according to the former directionally reflects light in a specific wavelength band, while scattering light other than the specific wavelength band. The optical film 1 according to the fourth embodiment includes a light scatterer for scattering the incident light. The light scatterer is disposed, for example, in at least one of positions on the surface of the optical layer 2, inside the optical layer 2, and between the reflecting layer 3 and the optical layer 2. Preferably, the light scatterer is disposed in at least one of positions between the reflecting layer 3 and the first optical layer 4, inside the first optical layer 4, and on the surface of the first optical layer 4. When the optical film 1 is affixed to a support such as a window member, it can be affixed to one of the indoor side and the outdoor side of the support. When the optical film 1 is affixed to the outdoor side, the light scatterer for scattering the light other than the specific wavelength band is preferably disposed only between the reflecting layer 3 and the support such as the window member. The reason is that if the light scatterer is present between the reflecting layer 3 and the incident surface, the directional reflection characteristic is lost. Also, when the optical film 1 is affixed to the indoor side, the light scatterer is preferably disposed between the emergent surface on the side opposite to the affixed surface of the optical film 1 and the reflecting layer 3.

Figure 28A:
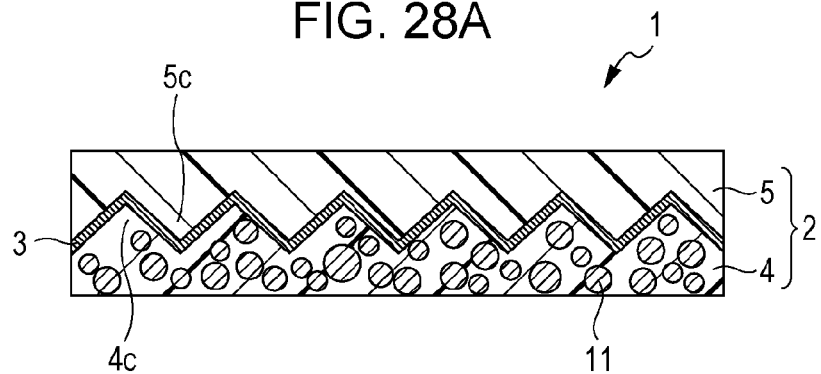
FIG. 28A is a sectional view illustrating a first example of construction of an optical film according to a fourth embodiment of the present application.

FIG. 28A is a sectional view illustrating a first example of construction of the optical film 1 according to the fourth embodiment of the present application. As illustrated in FIG. 28A, the first optical layer 4 includes a resin and fine particles 11. The fine particles 11 have a refractive index differing from that of the resin, which is a main component material of the first optical layer 4. For example, at least one kind of organic fine particles and inorganic fine particles can be used as the fine particles 11. The fine particles 11 may be hollow fine particles. Examples of the fine particles 11 include inorganic fine particles made of, e.g., silica or alumina, and organic fine particles made of, e.g., styrene, acryl, or a copolymer of the formers. Among those examples, silica fine particles are particularly preferable.

Figure 28B:
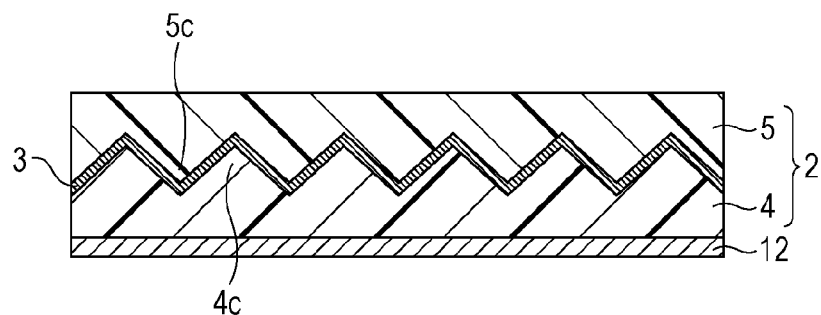
FIG. 28B is a sectional view illustrating a second example of construction of the optical film according to the fourth embodiment of the present application.

FIG. 28B is a sectional view illustrating a second example of construction of the optical film 1 according to the fourth embodiment of the present application. As illustrated in FIG. 28B, the optical film 1 further includes a light diffusion layer 12 on the surface of the first optical layer 4. The light diffusion layer 12 includes, for example, a resin and fine particles. The fine particles can be made of the same materials as those used in the above-described first example.

Figure 28C:
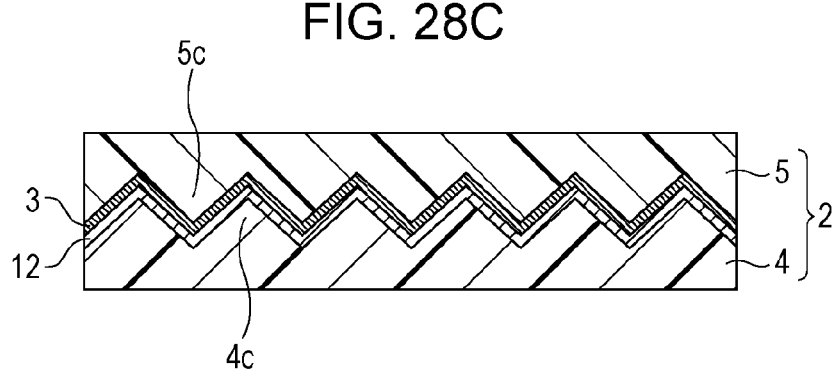
FIG. 28C is a sectional view illustrating a third example of construction of the optical film according to the fourth embodiment of the present application.

FIG. 28C is a sectional view illustrating a third example of construction of the optical film 1 according to the fourth embodiment of the present application. As illustrated in FIG. 28C, the optical film 1 further includes a light diffusion layer 12 between the reflecting layer 3 and the first optical layer 4. The light diffusion layer 12 includes, for example, a resin and fine particles. The fine particles can be made of the same materials as those used in the above-described first example.

According to the fourth embodiment, it is possible to directionally reflect the light in the specific wavelength band, e.g., an infrared ray, and to scatter the light other than the specific wavelength band, e.g., visible light. Hence, a visually attractive design can be given to the optical film 1 by making the optical film 1 clouded.

5. Fifth Embodiment

Figure 29A:
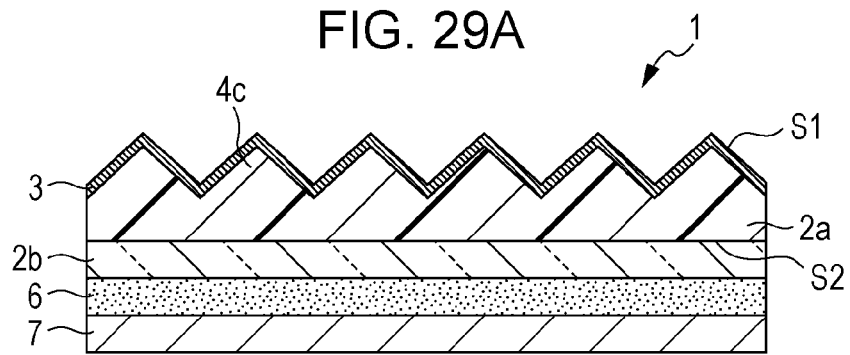
FIG. 29A is a sectional view illustrating one example of construction of an optical film according to a fifth embodiment of the present application.

FIG. 29A is a sectional view illustrating one example of construction of an optical film 1 according to a fifth embodiment of the present application. In the fifth embodiment, the same components as to those in the first embodiment are denoted by the same symbols and description of those components is omitted here. The optical film 1 according to the fifth embodiment differs from the first embodiment in that, as illustrated in FIG. 29A, a concave-convex surface of an optical layer 2a is not embedded with a resin material and the reflecting layer 3 formed on the concave-convex surface of the optical layer 2a is exposed. The optical film 1 has a concave-convex incident surface S1 on which light, e.g., the sunlight, is incident, and an emergent surface S2 from which part of the incident light entering the incident surface S1 emerges after having passed through the optical film 1.

The optical film 1 may further include a base 2b, when necessary, on the emergent surface S2 of the optical layer 2a. The optical film 1 may further include an affixing layer 6 and a peel-off layer 7, when necessary, on the emergent surface S2 of the optical layer 2a or on the base 2b. The optical layer 2a and the base 2b can be made of similar materials to those of the first optical layer 4 and the first base 4a in the first embodiment described above.

Figure 29B:
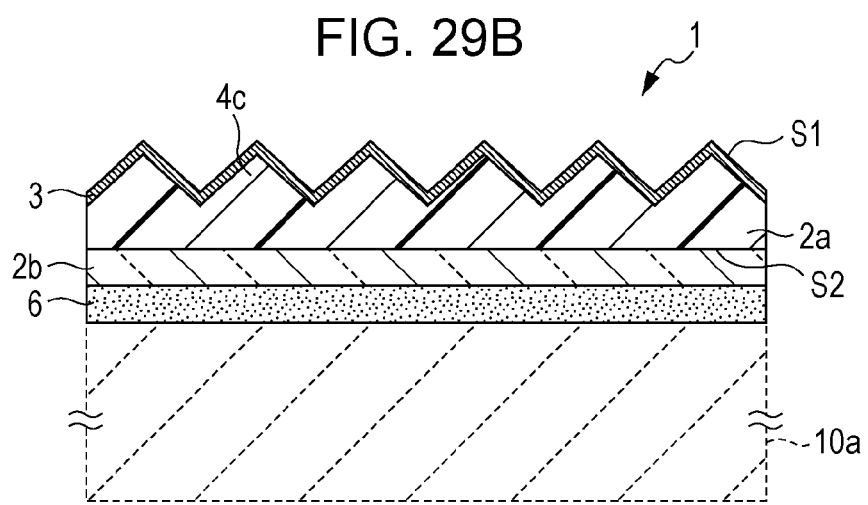
FIG. 29B is a sectional view illustrating an example in which the optical film according to the fifth embodiment of the present application is affixed to an adherend.

FIG. 29B is a sectional view illustrating an example in which the optical film according to the fifth embodiment of the present application is affixed to an adherend 10a. As illustrated in FIG. 29B, the emergent surface S2 of the optical film 1 is affixed, for example, to the adherend 10a with the affixing layer 6 interposed therebetween. The adherent 10a is preferably, e.g., a window member, a window blind (shade), a rolling screen, or a pleated screen.

According to the fifth embodiment, since the incident surface S1 is provided by the concave-convex surface of the optical layer 2a on which the reflecting layer 3 is formed, part of the incident light is scattered by the incident surface S1, while part of the not-scattered light passes through the optical film 1. It is therefore possible to provide the optical film 1, which can make people feel brightness with the incident light passing through the optical film, but which is opaque. The optical film 1 having such a characteristic can be suitably applied to an interior member, an exterior member, and a solar shading member, such as the window member, the window blind, the rolling screen, or the pleated screen, when protection of privacy is necessary.

6. Sixth Embodiment

Figure 30:
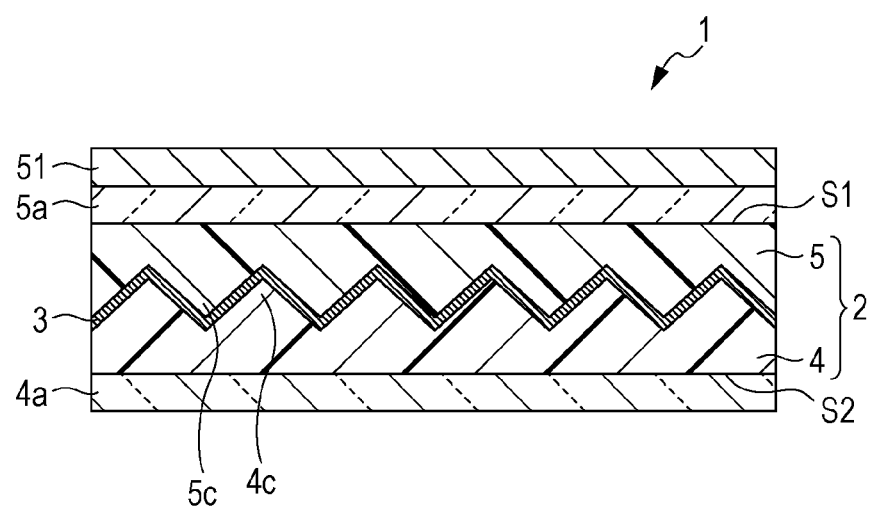
FIG. 30 is a sectional view illustrating one example of construction of an optical film according to a sixth embodiment of the present application.

FIG. 30 is a sectional view illustrating one example of construction of an optical film 1 according to a sixth embodiment of the present application. The sixth embodiment differs from the first embodiment in that the former further includes a self-cleaning effect layer 51, which develops a cleaning effect in itself, on an exposed surface of the optical film 1 on the opposite side to one of the incident surface S1 and the emergent surface S2 thereof, which one is affixed to the adherend. The self-cleaning effect layer 51 includes, for example, a photocatalyst. For example, $TiO_2$ can be used as the photocatalyst.

As described above, the optical film 1 is featured in transmitting part of the incident light therethrough. When the optical film 1 is used outdoors or in a dirty room, for example, light is scattered due to dirt and dust adhering to the surface of the optical film 1, whereby transmissivity and reflectivity are lost. Therefore, the surface of the optical film 1 is preferably optically transparent at all times. In other words, it is preferable that the surface of the optical film 1 is superior in the water-repellent or hydrophilic property, for example, and it can automatically develop the self-cleaning effect.

According to the sixth embodiment, since the optical film 1 includes the self-cleaning effect layer 51, the water-repellent or hydrophilic property, for example, can be given to the incident surface. Hence, it is possible to suppress dirt and dust from adhering to the incident surface and to suppress degradation of the directional reflection characteristic.

7. Seventh Embodiment

While the first embodiment has been described above, by way of example, in connection with case of applying the present application to, e.g., the window member, embodiments of the present application are not limited to the above-described application and can be further applied to various interior and exterior members, etc. other than the window member. Stated another way, the optical film according to the embodiment of the present application is applicable to not only fixedly installed interior and exterior members, such as walls and roofs, but also to a device capable of adjusting an amount of the transmitted and/or reflected sunlight by moving an interior or external member depending on changes in amount of the sunlight, which are caused with the shift of seasons and the elapse of time, etc., and taking the adjusted amount of the sunlight into an indoor space, etc. In a seventh embodiment, one example of such a device is described in connection with a solar shading device (in the form of a window blind or a shade) capable of adjusting a degree at which a group made up of plural solar shading members cuts off the incident light, by changing an angle of the solar shading member group.

Figure 31:
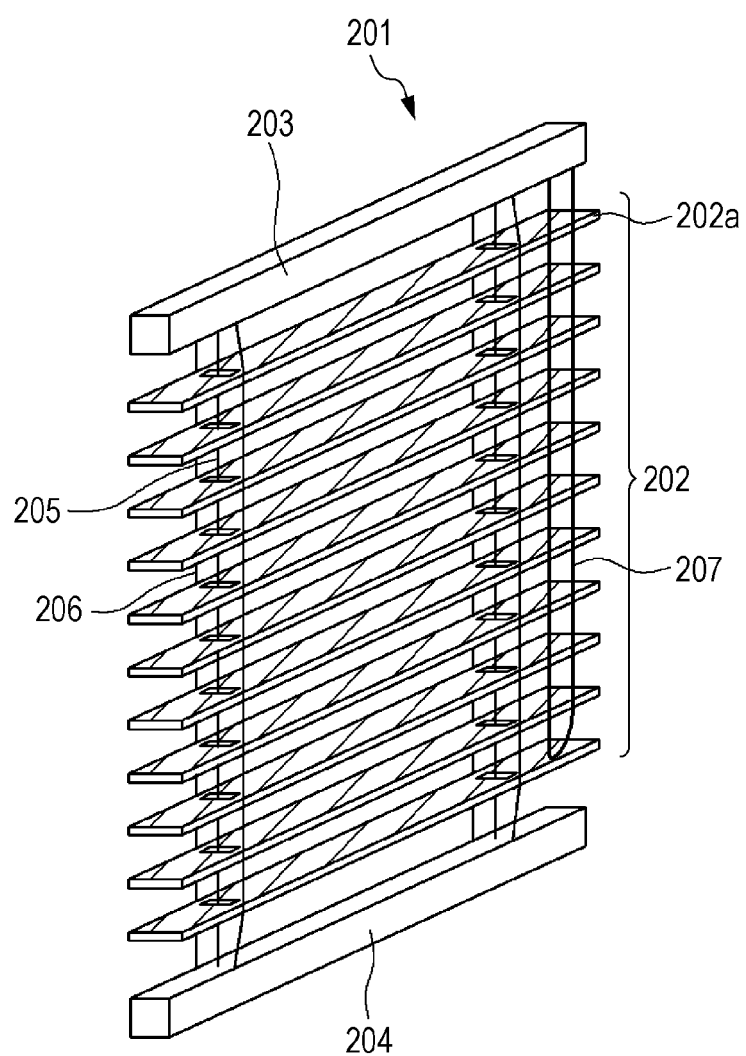
FIG. 31 is a perspective view illustrating one example of construction of a window blind (shade) according to a seventh embodiment of the present application.

FIG. 31 is a perspective view illustrating one example of construction of a window blind (shade) 201 according to the seventh embodiment of the present application. As illustrated in FIG. 31, the window blind 201 as one example of the solar shading device includes a head box 203, a slat group (solar shading member group) 202 made up of plural slats (blades) 202a, and a bottom rail 204. The head box 203 is disposed above the slat group 202 made up of the plural slats 202a. Ladder chords 206 and rise-and-fall chords 205 are extended downward from the head box 203, and the bottom rail 204 is suspended at lower ends of those chords. The slats 202a serving as the solar shading members are each formed in a slender rectangular shape, for example, and are supported by the ladder chords 206, which are extended downward from the head box 203, at predetermined intervals in a suspended state. Further, the head box 203 is provided with an operating member (not shown), such as a rod, for adjusting an angle of the slat group 202 made up of the plural slats 202a.

The head box 203 serves as a driving unit for rotating the slat group 202 made up of the plural slats 202a in accordance with operation of the operating member, such as the rod, thereby adjusting the amount of light taken into an indoor space, for example. Further, the head box 203 has the function of a driving unit (raising and lowering unit) for raising and lowering the slat group 202, as appropriate, in accordance with operation of an operating member, e.g., a rise-and-fall operating chord 207.

Figure 32A:
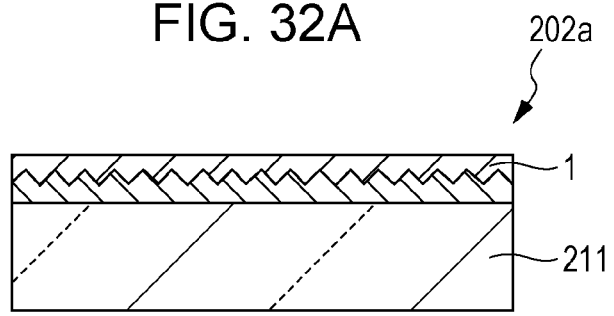
FIG. 32A is a sectional view illustrating a first example of construction of a slat.

FIG. 32A is a sectional view illustrating a first example of construction of the slat 202a. As illustrated in FIG. 32A, the slat 202a includes a base 211 and an optical film 1. The optical film 1 is preferably disposed on one of two principal surfaces of the base 211, the one principal surface being positioned on the side including an incident surface on which extraneous light is incident when the slat group 202 is in a closed state (e.g., on the side facing the window member). The optical film 1 and the base 211 are affixed to each other with an affixing layer, e.g., a bonding layer or an adhesive layer, interposed between them.

The base 211 can be formed in the shape of, e.g., a sheet, a film, or a plate. The base 211 can be made of, e.g., glass, resin, paper, or cloth. In consideration of the case of taking visible light into a predetermined indoor space, for example, a resin having transparency is preferably used as the material of the base 211. The glass, the resin, the paper, or the cloth used here may be the same as that generally used in ordinary rolling screens. The optical film 1 used here may be one type or a combination of two or more types of the optical films 1 according to the above-described first to sixth embodiments.

Figure 32B:
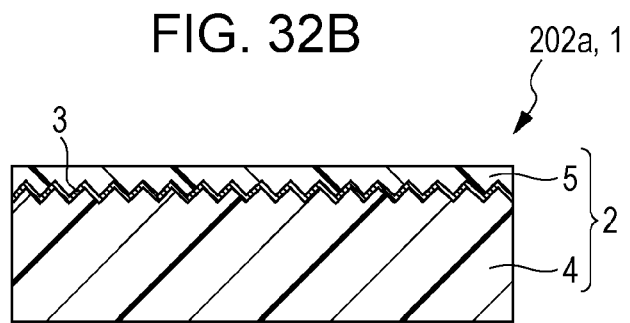
FIG. 32B is a sectional view illustrating a second example of construction of the slat.

FIG. 32B is a sectional view illustrating a second example of construction of the slat 202a. In the second example, as illustrated in FIG. 32B, the optical film 1 is used itself as the slat 202a. In this case, the optical film 1 preferably has such a level of rigidity that the optical film 1 can be supported by the ladder chords 206 and can maintain its shape in a supported state.

8. Eighth Embodiment

An eighth embodiment will be described below in connection with a rolling screen device, i.e., another example of the solar shading device capable of adjusting a degree at which a solar shading member cuts off the incident light, by winding or unwinding the solar shading member.

Figure 33A:
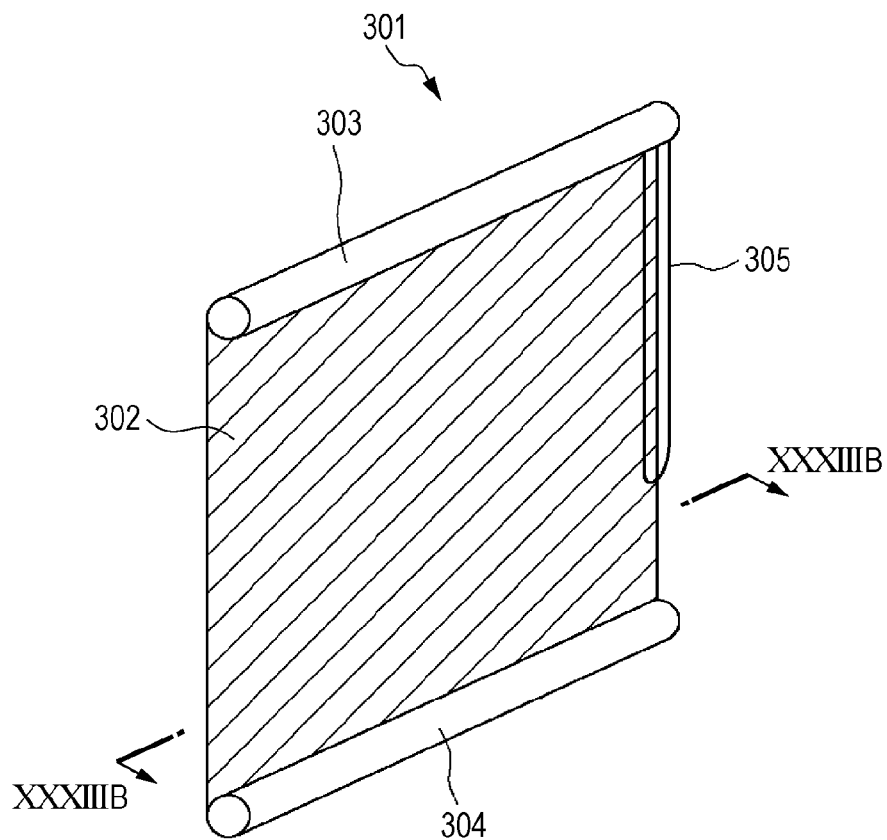
FIG. 33A is a perspective view illustrating one example of construction of a rolling screen device according to an eighth embodiment of the present application.

FIG. 33A is a perspective view illustrating one example of construction of a rolling screen device 301 according to the eighth embodiment of the present application. As illustrated in FIG. 33A, the rolling screen device 301 as another example of the solar shading device includes a screen 302, a head box 303, and a core member 304. The head box 303 can raise and fall the screen 302 with operation of an operating member, such as a chain 305. The head box 303 includes therein a winding shaft for taking up and letting out the screen 302, and one end of the screen 302 is coupled to the winding shaft. Further, the core member 304 is coupled to the other end of the screen 302. Preferably, the screen 302 has flexibility. The shape of the screen 302 is not limited to particular one and is preferably selected depending on the shape of, e.g., a window member to which the rolling screen device 301 is applied. For example, the screen 302 has a rectangular shape.

Figure 33B:
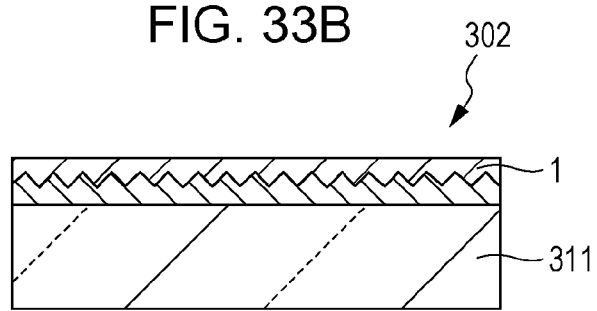
FIG. 33B is a sectional view, taken along line XXXIIIB-XXXIIIB in FIG. 33A, illustrating one example of construction of a screen.

FIG. 33B is a sectional view, taken along line XXXIIIB-XXXIIIB in FIG. 33A, illustrating one example of construction of the screen 302. As illustrated in FIG. 33B, the screen 302 includes a base 311 and an optical film 1. The screen 302 preferably has flexibility. The optical film 1 is preferably disposed on one of two principal surfaces of the base 311, the one principal surface being positioned on the side including an incident surface on which extraneous light is incident (e.g., on the side facing the window member). The optical film 1 and the base 311 are affixed to each other with an affixing layer, a bonding layer or an adhesive layer, interposed between them. Note that the construction of the screen 302 is not limited to the illustrated example and the optical film 1 may be used itself as the screen 302.

The base 311 can be formed in the shape of, e.g., a sheet, a film, or a plate. The base 311 can be made of, e.g., glass, resin, paper, or cloth. In consideration of the case of taking visible light into a predetermined indoor space, for example, a resin having transparency is preferably used as the material of the base 311. The glass, the resin, the paper, or the cloth used here may be the same as that generally used in ordinary rolling screens. The optical film 1 used here may be one type or a combination of two or more types of the optical films 1 according to the above-described first to sixth embodiments.

9. Ninth Embodiment

A ninth embodiment will be described in connection with the case of applying the present application to a fitting (e.g., an interior or exterior member) that includes a lighting portion provided with an optical body having the directional reflective property.

Figure 34A:
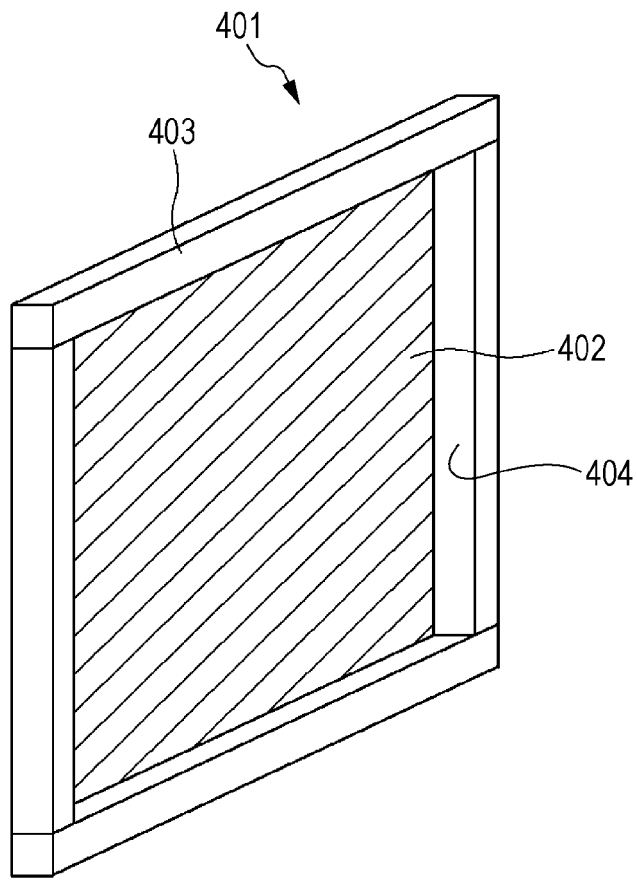
FIG. 34A is a perspective view illustrating one example of construction of a shoji (i.e., a paper-made and/or glass-fitted sliding door) according to a ninth embodiment of the present application.

FIG. 34A is a perspective view illustrating one example of construction of a fitting 401 according to the ninth embodiment of the present application. As illustrated in FIG. 34A, the fitting 401 includes a lighting portion 404 provided with an optical body 402. More specifically, the fitting 401 includes the optical body 402 and a frame member 403 that is disposed in a peripheral portion of the optical body 402. The optical body 402 is fixedly held by the frame member 403, but the optical body 402 can be removed, when necessary, by disassembling the frame member 403. While one example of the fitting 401 is a shoji (i.e., a paper-made and/or glass-fitted sliding door), applications of the present application are not limited to such an example and embodiments of the present application can be applied to various types of fittings that include lighting portions.

Figure 34B:
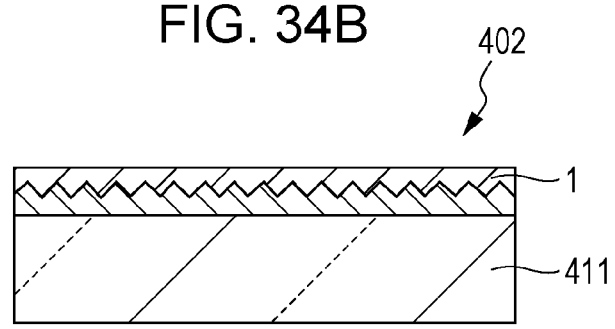
FIG. 34B is a sectional view illustrating one example of construction of the shoji.

FIG. 34B is a sectional view illustrating one example of construction of the optical body 402. As illustrated in FIG. 34B, the optical body 402 includes a base 411 and an optical film 1. The optical film 1 is disposed on one of two principal surfaces of the base 411, the one principal surface being positioned on the side including an incident surface on which extraneous light is incident (e.g., on the side facing the window member or outward). The optical film 1 and the base 411 are affixed to each other with an affixing layer, e.g., a bonding layer or an adhesive layer, interposed between them. Note that the construction of the shoji (specifically the optical body 402) is not limited to the illustrated example and the optical film 1 may be used itself as the optical body 402.

The base 411 is formed of, e.g., a sheet, a film, or a plate each having flexibility. The base 411 can be made of, e.g., glass, resin, paper, or cloth. In consideration of the case of taking visible light into a predetermined indoor space, for example, a resin having transparency is preferably used as the material of the base 411. The glass, the resin, the paper, or the cloth used here may be the same as that generally used as optical bodies in ordinary fittings. The optical film 1 used here may be one type or a combination of two or more types of the optical films 1 according to the above-described first to sixth embodiments.

EXAMPLES

The present application will be described in more detail below in connection with EXAMPLES, but the present application is not limited to the following EXAMPLES.

Simulation

In EXAMPLES described below, optical characteristics of multilayer films were determined through a simulation when the film thicknesses of the layers in the multilayer film of the reflecting layer 3 were changed. The simulation was performed on multilayer films, mentioned in the following TEST EXAMPLES 1-1 to 1-5, by using the optical simulation software (Light Tools) available from ORA (Optical Research Associates). In the simulation, an optical film thickness was used as the film thickness of each of the high refractive index layers as the first and third layers. Respective values of the blueness index, the redness index, the transmittance of visible light, and the shading factor were determined when the optical film thickness x of the high refractive index layer as the first layer, the optical film thickness y of the high refractive index layer as the third layer, and the geometrical film thickness z of the metal layer were changed.

Test Example 1-1

A multilayer film was assumed which had a three-layer structure obtained by stacking a high refractive index layer and a metal layer. Details of construction of the multilayer film are as follows:

Layer structure: high refractive index layer/metal layer/high refractive index layer High refractive index layer:
Material: GAZO
Refractive index: 1.936
Geometrical film thickness of first layer: 10 nm
Geometrical film thickness of third layer: 20 nm
Metal layer:
Material: AgNdCu
Refractive index: 0.164
Geometrical film thickness: 7 nm Test Example 1-2

A multilayer film was assumed as in TEST EXAMPLE 1-1 except for changing the film thicknesses of the layers in the multilayer film such that the geometrical film thickness of the high refractive index layer as the first layer, the geometrical film thickness of the metal layer, and the geometrical film thickness of the high refractive index layer as the third layer were 25 nm, 7 nm, and 15 nm, respectively.

Test Example 2-1

A multilayer film was assumed as in TEST EXAMPLE 1-1 except for changing the film thicknesses of the layers in the multilayer film such that the geometrical film thickness of the high refractive index layer as the first layer, the geometrical film thickness of the metal layer, and the geometrical film thickness of the high refractive index layer as the third layer were 45 nm, 9 nm, and 45 nm, respectively.

Test Example 2-2

A multilayer film was assumed as in TEST EXAMPLE 1-1 except for changing the film thicknesses of the layers in the multilayer film such that the geometrical film thickness of the high refractive index layer as the first layer, the geometrical film thickness of the metal layer, and the geometrical film thickness of the high refractive index layer as the third layer were 15 nm, 9 nm, and 35 nm, respectively.

Test Example 3-1

A multilayer film was assumed as in TEST EXAMPLE 1-1 except for changing the film thicknesses of the layers in the multilayer film such that the geometrical film thickness of the high refractive index layer as the first layer, the geometrical film thickness of the metal layer, and the geometrical film thickness of the high refractive index layer as the third layer were 40 nm, 10 nm, and 40 nm, respectively.

Test Example 3-2

A multilayer film was assumed as in TEST EXAMPLE 1-1 except for changing the film thicknesses of the layers in the multilayer film such that the geometrical film thickness of the high refractive index layer as the first layer, the geometrical film thickness of the metal layer, and the geometrical film thickness of the high refractive index layer as the third layer were 31 nm, 10 nm, and 29 nm, respectively.

Test Example 3-3

A multilayer film was assumed as in TEST EXAMPLE 1-1 except for changing the film thicknesses of the layers in the multilayer film such that the geometrical film thickness of the high refractive index layer as the first layer, the geometrical film thickness of the metal layer, and the geometrical film thickness of the high refractive index layer as the third layer were 45 nm, 10 nm, and 49 nm, respectively.

Test Example 4-1

A multilayer film was assumed as in TEST EXAMPLE 1-1 except for changing the film thicknesses of the layers in the multilayer film such that the geometrical film thickness of the high refractive index layer as the first layer, the geometrical film thickness of the metal layer, and the geometrical film thickness of the high refractive index layer as the third layer were 45 nm, 11 nm, and 50 nm, respectively.

Test Example 4-2

A multilayer film was assumed as in TEST EXAMPLE 1-1 except for changing the film thicknesses of the layers in the multilayer film such that the geometrical film thickness of the high refractive index layer as the first layer, the geometrical film thickness of the metal layer, and the geometrical film thickness of the high refractive index layer as the third layer were 31 nm, 11 nm, and 27 nm, respectively.

Test Example 5-1

A multilayer film was assumed as in TEST EXAMPLE 1-1 except for changing the film thicknesses of the layers in the multilayer film such that the geometrical film thickness of the high refractive index layer as the first layer, the geometrical film thickness of the metal layer, and the geometrical film thickness of the high refractive index layer as the third layer were 45 nm, 12 nm, and 51 nm, respectively.

Test Example 5-2

A multilayer film was assumed as in TEST EXAMPLE 1-1 except for changing the film thicknesses of the layers in the multilayer film such that the geometrical film thickness of the high refractive index layer as the first layer, the geometrical film thickness of the metal layer, and the geometrical film thickness of the high refractive index layer as the third layer were 51 nm, 12 nm, and 55 nm, respectively.

Test Example 5-3

A multilayer film was assumed as in TEST EXAMPLE 1-1 except for changing the film thicknesses of the layers in the multilayer film such that the geometrical film thickness of the high refractive index layer as the first layer, the geometrical film thickness of the metal layer, and the geometrical film thickness of the high refractive index layer as the third layer were 37 nm, 12 nm, and 43 nm, respectively.

Test Example 5-4

A multilayer film was assumed as in TEST EXAMPLE 1-1 except for changing the film thicknesses of the layers in the multilayer film such that the geometrical film thickness of the high refractive index layer as the first layer, the geometrical film thickness of the metal layer, and the geometrical film thickness of the high refractive index layer as the third layer were 55 nm, 12 nm, and 59 nm, respectively.

Simulation Results

Table 1 lists the results of the simulations performed on the multilayer films in TEST EXAMPLES 1-1 to 5-4.

The following points are understood from Table 1.

(Geometrical Film Thickness of Metal Layer=7 Nm)

In TEST EXAMPLE 1-1, the redness index value is larger than 0.258, and hence the combination of (x, y, z) does not fall within the region represented by the formula (1). On the other hand, the blueness index value is smaller than 0.170, and hence the combination of (x, y, z) falls within the region represented by the formula (6).

In TEST EXAMPLE 1-2, the redness index value is larger than 0.200 and smaller than 0.250, and hence the combination of (x, y, z) falls within the region represented by the formula (3). Also, the blueness index value is smaller than 0.170, and hence the combination of (x, y, z) falls within the region represented by the formula (6).

(Geometrical Film Thickness of Metal Layer=9 nm)

In TEST EXAMPLE 2-1, the redness index value is not larger than 0.200, and hence the combination of (x, y, z) falls within the region represented by the formula (5). Also, the blueness index value is smaller than 0.170, and hence the combination of (x, y, z) falls within the region represented by the formula (6).

In TEST EXAMPLE 2-2, the redness index value is larger than 0.258, and hence the combination of (x, y, z) does not falls within the region represented by the formula (1). On the other hand, the blueness index value is larger than 0.170 and smaller than 0.200, and hence the combination of (x, y, z) falls within the region represented by the formula (4).

(Geometrical Film Thickness of Metal Layer=10 nm)

In TEST EXAMPLE 3-1, the redness index value is larger than 0.200 and smaller than 0.250, and hence the combination of (x, y, z) falls within the region represented by the formula (3). Also, the blueness index value is larger than 0.170 and smaller than 0.200, and hence the combination of (x, y, z) falls within the region represented by the formula (4).

In TEST EXAMPLE 3-2, the redness index value is larger than 0.258, and hence the combination of (x, y, z) does not fall within the region represented by the formula (1). On the other hand, the blueness index value is larger than 0.170 and smaller than 0.200, and hence the combination of (x, y, z) falls within the region represented by the formula (4).

In TEST EXAMPLE 3-3, the redness index value is larger than 0.200 and smaller than 0.250, and hence the combination of (x, y, z) falls within the region represented by the formula (3). Also, the blueness index value is larger than 0.170 and smaller than 0.200, and hence the combination of (x, y, z) falls within the region represented by the formula (4).

TABLE 1

| | Construction of multilayer film | Combination of film thicknesses [nm] 1st/2nd/3rd layer | Redness index | Blueness index | Visible light Transmittance [%] | Shading factor |
|---|---|---|---|---|---|---|
| TEST EXAMPLE 1-1 | GAZO/AgNdCu/GAZO | 10/7/20 | 0.263 | 0.163 | 72% | 0.68 |
| TEST EXAMPLE 1-2 | GAZO/AgNdCu/GAZO | 25/7/15 | 0.227 | 0.159 | 75% | 0.71 |
| TEST EXAMPLE 2-1 | GAZO/AgNdCu/GAZO | 45/9/45 | 0.190 | 0.161 | 76% | 0.72 |
| TEST EXAMPLE 2-2 | GAZO/AgNdCu/GAZO | 15/9/35 | 0.268 | 0.171 | 70% | 0.65 |
| TEST EXAMPLE 3-1 | GAZO/AgNdCu/GAZO | 40/10/40 | 0.229 | 0.172 | 74% | 0.67 |
| TEST EXAMPLE 3-2 | GAZO/AgNdCu/GAZO | 31/10/29 | 0.278 | 0.177 | 70% | 0.64 |
| TEST EXAMPLE 3-3 | GAZO/AgNdCu/GAZO | 45/10/49 | 0.212 | 0.172 | 75% | 0.69 |
| TEST EXAMPLE 4-1 | GAZO/AgNdCu/GAZO | 45/11/50 | 0.240 | 0.187 | 72% | 0.65 |
| TEST EXAMPLE 4-2 | GAZO/AgNdCu/GAZO | 31/11/27 | 0.337 | 0.205 | 65% | 0.59 |
| TEST EXAMPLE 5-1 | GAZO/AgNdCu/GAZO | 45/12/51 | 0.269 | 0.203 | 69% | 0.62 |
| TEST EXAMPLE 5-2 | GAZO/AgNdCu/GAZO | 51/12/55 | 0.257 | 0.210 | 70% | 0.63 |
| TEST EXAMPLE 5-3 | GAZO/AgNdCu/GAZO | 37/12/43 | 0.299 | 0.201 | 67% | 0.60 |
| TEST EXAMPLE 5-4 | GAZO/AgNdCu/GAZO | 55/12/59 | 0.250 | 0.219 | 70% | 0.63 |

(Geometrical Film Thickness of Metal Layer=11 nm)

In TEST EXAMPLE 4-1, the redness index value is larger than 0.200 and smaller than 0.250, and hence the combination of (x, y, z) falls within the region represented by the formula (3). Also, the blueness index value is larger than 0.170 and smaller than 0.200, and hence the combination of (x, y, z) falls within the region represented by the formula (4).

In TEST EXAMPLE 4-2, the redness index value is larger than 0.258, and hence the combination of (x, y, z) does not fall within the region represented by the formula (1). On the other hand, the blueness index value is larger than 0.200 and smaller than 0.210, and hence the combination of (x, y, z) falls within the region represented by the formula (2).

(Geometrical Film Thickness of Metal Layer=12 nm)

In TEST EXAMPLE 5-1, the redness index value is larger than 0.258, and hence the combination of (x, y, z) does not fall within the region represented by the formula (1). On the other hand, the blueness index value is larger than 0.200 and smaller than 0.210, and hence the combination of (x, y, z) falls within the region represented by the formula (2).

In TEST EXAMPLE 5-2, the redness index value is larger than 0.250 and smaller than 0.258, and hence the combination of (x, y, z) falls within the region represented by the formula (1). Also, the blueness index value is larger than 0.200 and smaller than 0.210, and hence the combination of (x, y, z) falls within the region represented by the formula (2).

In TEST EXAMPLE 5-3, the redness index value is larger than 0.258, and hence the combination of (x, y, z) does not fall within the region represented by the formula (1). On the other hand, the blueness index value is larger than 0.200 and smaller than 0.210, and hence the combination of (x, y, z) falls within the region represented by the formula (2).

In TEST EXAMPLE 5-4, the redness index value is larger than 0.200 and smaller than 0.250, and hence the combination of (x, y, z) falls within the region represented by the formula (3). On the other hand, the blueness index value is larger than 0.210, and hence the combination of (x, y, z) does not fall within the region represented by the formula (2).

Observation of External Appearances and Simulations of Optical Bodies

Next, optical bodies were fabricated according to the following Example 1-1 and COMPARATIVE EXAMPLES 1-1 to 1-2. Further, optical characteristics of multilayer films according to the following TEST EXAMPLE 6-1 and TEST EXAMPLES 7-1 to 7-2, which were assumed respectively corresponding to the fabricated multilayer films of EXAMPLE 1-1 and COMPARATIVE EXAMPLES 1-1 to 1-2, were determined through simulations. Further, the observation results of external appearances of EXAMPLE 1-1 and COMPARATIVE EXAMPLES 1-1 to 1-2 were compared respectively with the simulation results of TEST EXAMPLE 6-1 and TEST EXAMPLES 7-1 to 7-2.

Example 1-1

The multilayer film constituting the reflecting layer of the optical body had a three-layer structure obtained by stacking a high refractive index layer and a metal layer. Details of construction of the multilayer film are as follows:

Layer structure: high refractive index layer/metal layer/high refractive index layer
  High refractive index layer:
    Material: GAZO
    Geometrical film thickness of first layer: 40 nm
    Geometrical film thickness of third layer: 40 nm
  Metal layer:
    Material: AgNdCu
    Geometrical film thickness: 10 nm The multilayer film was formed by vacuum sputtering using targets with compositions set forth in Table 2. Refractive indexes of GAZO and AgNdCu in Table 2 indicate values at a wavelength of 550 nm.

TABLE 2

|  | GAZO | AgNdCu |
|---|---|---|
| Target composition | $Ga_2O_3$: 0.57 wt % | Ag: 99 wt % |
|  | $Al_2O_3$: 0.31 wt % | Nd: 0.4 wt % |
|  |  | Cu: 0.6 wt % |
| Refractive index | 1.936 | 0.164 |

Comparative Example 1-1

The optical body was fabricated as in EXAMPLE 1-1 except for changing the film thicknesses of the layers in the multilayer film such that the geometrical film thickness of the high refractive index layer as the first layer, the geometrical film thickness of the metal layer, and the geometrical film thickness of the high refractive index layer as the third layer were 29 nm, 10 nm, and 31 nm, respectively.

Comparative Example 1-2

The optical body was fabricated as in EXAMPLE 1-1 except for changing the film thicknesses of the layers in the multilayer film such that the geometrical film thickness of the high refractive index layer as the first layer, the geometrical film thickness of the metal layer, and the geometrical film thickness of the high refractive index layer as the third layer were 55 nm, 12 nm, and 59 nm, respectively.

In EXAMPLES, AgNdCu was used as the target composition. However, the target composition is not limited to AgNdCu, and the above-mentioned metal or alloy having a high reflectance in the infrared range can also be used. The metal layer having a high reflectance in the infrared range contains, as a main component, Au, Ag, Cu, Al, Ni, Cr, Ti, Pd, Co, Si, Ta, W, Mo or Ge alone, or an alloy containing two or more selected from among those elements, for example. Of those examples, Ag-, Cu-, Al-, Si- or Ge-based materials are preferable in consideration of practicability. When an alloy is used as the material of the metal layer, the metal layer preferably contains, as a main component, AlCu, Alti, AlCr, AlCo, AlNdCu, AlMgSi, AgBi, AgNdCu, AgPdCu, AgPdTi, AgCuTi, AgPdCa, AgPdMg, AgPdFe, Ag, or SiB, for example.

The geometrical film thickness of the metal layer is preferably 7 nm or more and 9 nm or less. The reason is that, when such a condition is satisfied, the transmittance and the reflectance for the light incident on the optical body can be each held in a preferable range.

Observation Results of External Appearance

Example 1-1

As a result of observing the external appearance of the optical body fabricated according to EXAMPLE 1-1, the color tone of light reflected by the optical body was neutral.

Comparative Example 1-1

As a result of observing the external appearance of the optical body fabricated according to COMPARATIVE EXAMPLE 1-1, a reddish color tone was perceived in the light reflected by the optical body.

Comparative Example 1-2

As a result of observing the external appearance of the optical body fabricated according to COMPARATIVE EXAMPLE 1-2, a bluish color tone was perceived in the light reflected by the optical body was perceived.

Simulation

Next, optical characteristics of each multilayer film constituting the reflecting layer of the optical body were determined through a simulation performed on the multilayer films according to the following TEST EXAMPLE 6-1 and TEST EXAMPLES 7-1 to 7-2, which were assumed respectively corresponding to the multilayer films in the fabricated optical bodies of EXAMPLE 1-1 and COMPARATIVE EXAMPLES 1-1 to 1-2. The simulation was performed by using the optical simulation software (Light Tools) available from ORA (Optical Research Associates).

Test Example 6-1

A multilayer film was assumed which had a three-layer structure obtained by stacking a high refractive index layer and a metal layer. Details of construction of the multilayer film are as follows:

Layer structure: high refractive index layer/metal layer/high refractive index layer High refractive index layer:
Material: GAZO
Geometrical film thickness of first layer: 40 nm
Geometrical film thickness of third layer: 40 nm
Metal layer:
Material: AgNdCu
Geometrical film thickness: 10 nm Test Example 7-1

A multilayer film was assumed as in TEST EXAMPLE 6-1 except for changing the film thicknesses of the layers in the multilayer film such that the geometrical film thickness of the high refractive index layer as the first layer, the geometrical film thickness of the metal layer, and the geometrical film thickness of the high refractive index layer as the third layer were 29 nm, 10 nm, and 31 nm, respectively.

Test Example 7-2

A multilayer film was assumed as in TEST EXAMPLE 6-1 except for changing the film thicknesses of the layers in the multilayer film such that the geometrical film thickness of the high refractive index layer as the first layer, the geometrical film thickness of the metal layer, and the geometrical film thickness of the high refractive index layer as the third layer were 55 nm, 12 nm, and 59 nm, respectively.

[Simulation Results]

Table 3 lists the results of the simulations performed on the multilayer films in TEST EXAMPLE 6-1 and TEST EXAMPLES 7-1 to 7-2.

TABLE 3

| | Construction of multilayer film | Combination of film thicknesses [nm] 1st/2nd/3rd layer | Redness index | Blueness index | Visible light Transmittance [%] | Shading factor |
|---|---|---|---|---|---|---|
| TEST EXAMPLE 6-1 | GAZO/AgNdCu/GAZO | 40/10/40 | 0.229 | 0.172 | 74% | 0.67 |
| TEST EXAMPLE 7-1 | GAZO/AgNdCu/GAZO | 29/10/31 | 0.278 | 0.177 | 70% | 0.64 |
| TEST EXAMPLE 7-2 | GAZO/AgNdCu/GAZO | 55/12/59 | 0.250 | 0.219 | 70% | 0.63 |

Figure 35A:
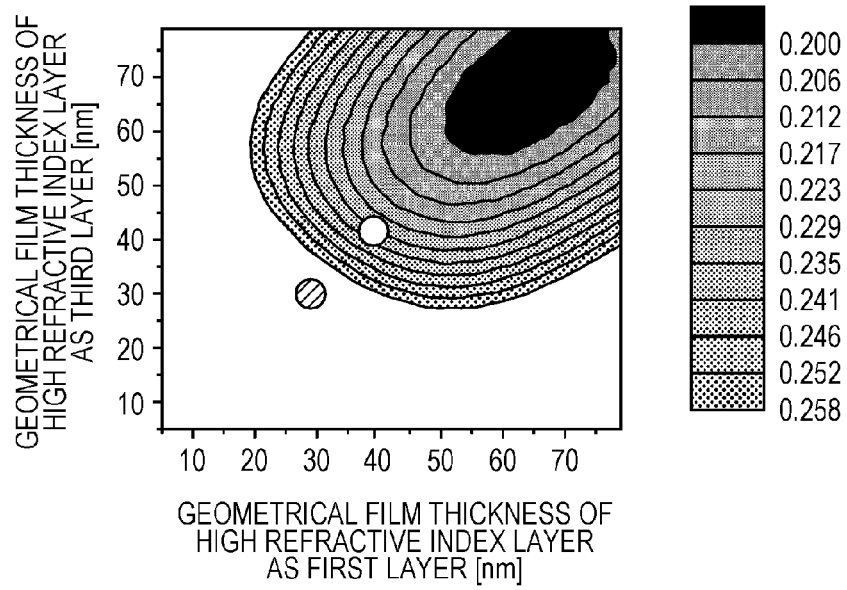
FIG. 35A is a contour plot at z=10 nm, illustrating the calculation result of the redness index with respect to a geometrical film thickness of the high refractive index layer as the first layer and a geometrical film thickness of the high refractive index layer as the third layer.
Figure 35B:
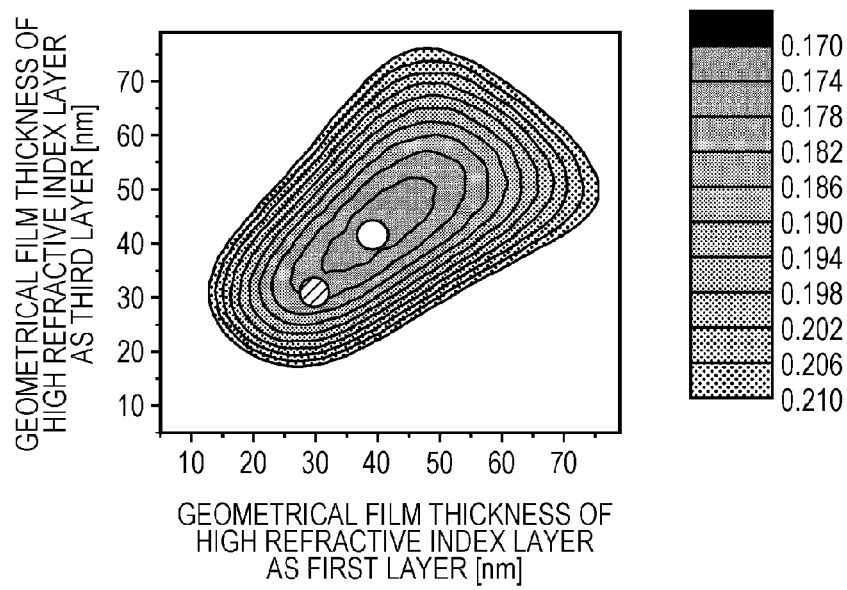
FIG. 35B is a contour plot at z=10 nm, illustrating the calculation result of the blueness index with respect to the geometrical film thickness of the high refractive index layer as the first layer and the geometrical film thickness of the high refractive index layer as the third layer.

FIG. 35A is a contour plot at z=10 nm, illustrating the calculation result of the redness index with respect to the geometrical film thickness of the high refractive index layer as the first layer and the geometrical film thickness of the high refractive index layer as the third layer, and FIG. 35B is a contour plot at z=10 nm, illustrating the calculation result of the blueness index with respect to the geometrical film thickness of the high refractive index layer as the first layer and the geometrical film thickness of the high refractive index layer as the third layer.

In FIG. 35A, a point denoted by "o" represents the redness index value obtained in TEST EXAMPLE 6-1, and a point denoted by "o" hatched with rightward rising slants represents the redness index value obtained in TEST EXAMPLE 7-1. In FIG. 35B, a point denoted by "o" represents the blueness index value obtained in TEST EXAMPLE 6-1, and a point denoted by "o" hatched with rightward rising slants represents the blueness index value obtained in TEST EXAMPLE 7-1.

Figure 36A:
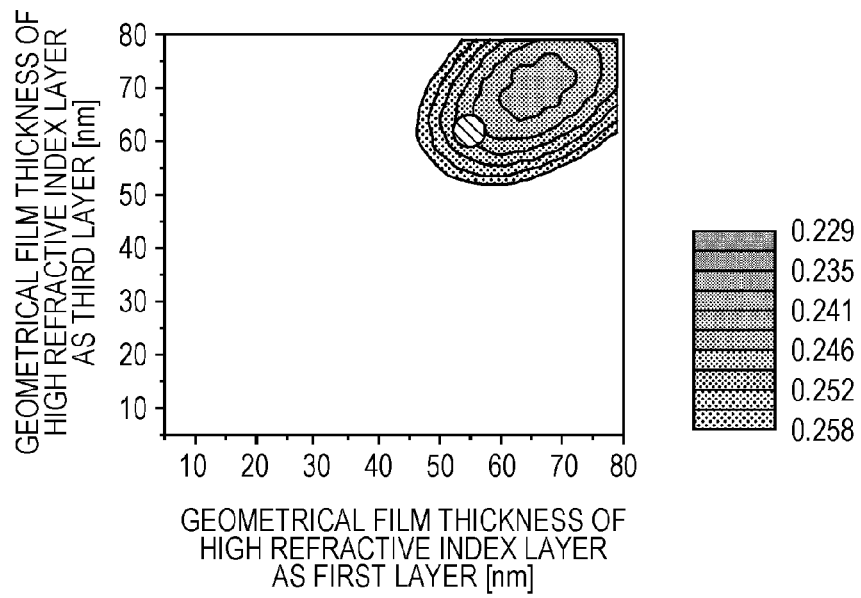
FIG. 36A is a contour plot at z=12 nm, illustrating the calculation result of the redness index with respect to the geometrical film thickness of the high refractive index layer as the first layer and the geometrical film thickness of the high refractive index layer as the third layer.
Figure 36B:
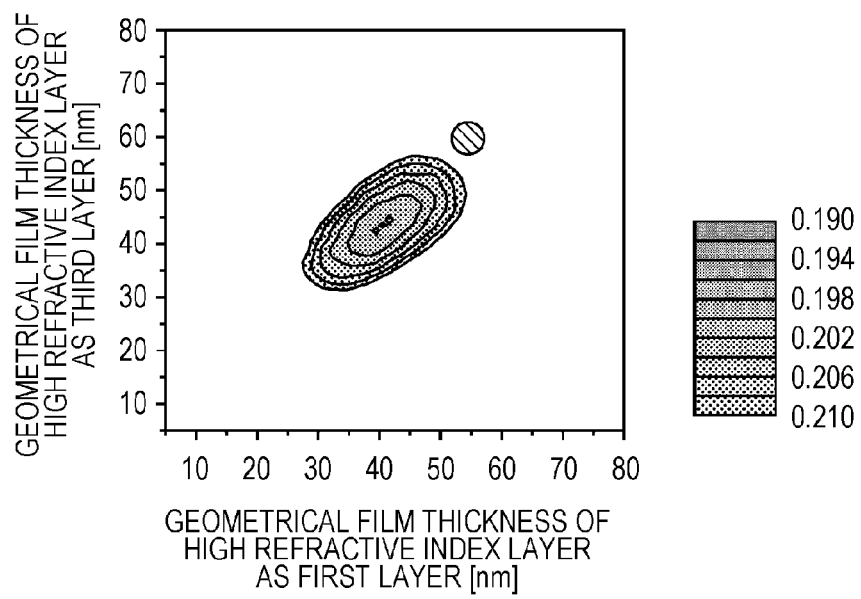
FIG. 36B is a contour plot at z=12 nm, illustrating the calculation result of the blueness index with respect to the geometrical film thickness of the high refractive index layer as the first layer and the geometrical film thickness of the high refractive index layer as the third layer.

FIG. 36A is a contour plot at z=12 nm, illustrating the calculation result of the redness index with respect to the geometrical film thickness of the high refractive index layer as the first layer and the geometrical film thickness of the high refractive index layer as the third layer, and FIG. 36B is a contour plot at z=12 nm, illustrating the calculation result of the blueness index with respect to the geometrical film thickness of the high refractive index layer as the first layer and the geometrical film thickness of the high refractive index layer as the third layer.

In FIG. 36A, a point denoted by "o" hatched with rightward falling slants represents the redness index value obtained in TEST EXAMPLE 7-2. In FIG. 36B, a point denoted by "o" hatched with rightward falling slants represents the blueness index value obtained in TEST EXAMPLE 7-2.

The following points are understood from Table 3 and FIGS. 35A, 35B, 36A and 36B.

Test Example 6-1

In TEST EXAMPLE 6-1, when the geometrical film thickness of the high refractive index layer as the first layer and the geometrical film thickness of the high refractive index layer as the third layer are converted to optical film thicknesses, (z, y, z)=(77.44, 10, 77.44) is resulted. In this case, the combination of (x, y, z) corresponding to TEST EXAMPLE 6-1 corresponds to a point that falls within the region represented by the formula (1) and that falls within the region represented by the formula (2).

Further, as illustrated in FIG. 35A, the point representing the redness index value in TEST EXAMPLE 6-1 is positioned inside the boundary at which the redness index value takes 0.258 and, as illustrated in FIG. 35B, the point representing the blueness index value in TEST EXAMPLE 6-1 is positioned inside the boundary at which the blueness index value takes 0.210.

Accordingly, the color tone of the reflected light in TEST Example 6-1 is thought as being viewed neutral. Thus, the simulation result matches with the observation result of the external appearance of the optical body according to Example 1-1.

Test Example 7-1

In TEST EXAMPLE 7-1, when the geometrical film thickness of the high refractive index layer as the first layer and the geometrical film thickness of the high refractive index layer as the third layer are converted to optical film thicknesses, (x, y, z)=(56.144, 10, 60.016) is resulted. In this case, the combination of (x, y, z) corresponding to TEST EXAMPLE 7-1 corresponds to a point that does not fall within the region represented by the formula (1) and that falls within the region represented by the formula (2).

Further, as illustrated in FIG. 35A, the point representing the redness index value in TEST EXAMPLE 7-1 is positioned outside the boundary at which the redness index value takes 0.258 and, as illustrated in FIG. 35B, the point representing the blueness index value in TEST EXAMPLE 7-1 is positioned inside the boundary at which the blueness index value takes 0.210.

Accordingly, the color tone of the reflected light in TEST Example 7-1 is thought as being viewed reddish. Thus, the simulation result matches with the observation result of the external appearance of the optical body according to COMPARATIVE EXAMPLE 1-1.

Test Example 7-2

In TEST EXAMPLE 7-2, when the geometrical film thickness of the high refractive index layer as the first layer and the geometrical film thickness of the high refractive index layer as the third layer are converted to optical film thicknesses, (x, y, z)=(106.48, 12, 114.224) is resulted. In this case, the combination of (x, y, z) corresponding to TEST EXAMPLE 7-2 corresponds to a point that falls within the region represented by the formula (1) and that does not fall within the region represented by the formula (2).

Further, as illustrated in FIG. 36A, the point representing the redness index value in TEST EXAMPLE 7-2 is positioned inside the boundary at which the redness index value takes 0.258 and, as illustrated in FIG. 36B, the point representing the blueness index value in TEST EXAMPLE 7-2 is positioned outside the boundary at which the blueness index value takes 0.210.

Accordingly, the color tone of the reflected light in TEST Example 7-2 is thought as being viewed bluish. Thus, the simulation result matches with the observation result of the external appearance of the optical body according to COMPARATIVE EXAMPLE 1-2.

As described above, the change in color tone of the optical body can be suppressed by setting the film thicknesses of the layers in the multilayer film of the wavelength-selective reflecting layer such that the redness index value and the blueness index value are each held in the predetermined region.

While the embodiments of the present application have been described in detail above, the present application is not limited to the above-described embodiments and can be variously modified on the basis of the technical concept of the present application.

For example, the constructions (configurations), the methods, the shapes, the materials, the numerical values, etc. explained in the foregoing embodiments are merely mentioned for illustrative purpose, and different constructions (configurations), methods, shapes, materials, numerical values, etc. can also be used when necessary.

Also, the constructions (configurations) in the above-described embodiments can be selectively combined with each other without departing from the scope of the present application.

While the foregoing embodiments have been described, by way of example, in connection with the case where the window blind and the rolling screen device are manually operated, the window blind and the rolling screen device may be electrically operated.

The foregoing embodiments have been described, by way of example, in connection with the case where the optical film is affixed to the adherend, such as the window member. However, the adherend, such as the window member, may be constituted as the first optical layer or the second optical layer itself of the optical film. That modification enables the adherend, such as the window member, to have the directional reflection function in advance.

While the foregoing embodiments have been described, by way of example, in connection with the case where the optical body is the optical film, the shape of the optical body is not limited to a film, and the optical body may have a plate- or block-like shape.

While the foregoing embodiments have been described, by way of example, in connection with the case of applying the present application to the interior or exterior members, such as the window member, the fitting, the slat of the window blind, and the screen of the rolling screen device, application examples of the present application are not limited to the illustrated ones, and embodiments of the present application are further applicable to other interior and exterior members than the above-described ones.

Examples of the interior or exterior members to which the optical body according to the embodiment of the present application can be applied include an interior or exterior member formed by the optical body itself, and an interior or exterior member formed by a transparent base to which a directional reflector is affixed. By installing such an interior or exterior member indoors or outdoors near a window, it is possible, for example, to directionally reflect only an infrared ray to the outdoor and to take visible light into the indoor. Accordingly, when the interior or exterior member is installed, necessity of lighting for an indoor space is reduced. Further, since the interior or exterior member hardly causes scatter reflection toward the indoor side, a temperature rise in the surroundings can be suppressed. In addition, the optical body may be applied to other affixing target members (adherends) than the transparent base depending on the desired purpose of, for example, controlling visibility and/or increasing strength.

While the foregoing embodiments have been described, by way of example, in connection with the case of applying the present application to the window blind and the rolling screen device, application examples of the present application are not limited to the illustrated ones, and embodiments of the present application are further applicable to various types of solar shading devices installed on the indoor or outdoor side.

While the foregoing embodiments have been described, by way of example, in connection with the case of applying the present application to the solar shading device (e.g., the rolling screen device) where a degree at which the solar shading member cuts off the incident light can be adjusted by taking up or letting out the solar shading member, application examples of the present application are not limited to the illustrated one. For example, embodiments of the present application are further applicable to a solar shading device where a degree at which a solar shading member cuts off the incident light can be adjusted by folding or unfolding the solar shading member. One example of such a solar shading device is a pleated screen device where a degree at which a solar shading member cuts off the incident light can be adjusted by folding or unfolding a screen as the solar shading member in the form of bellows.

While the foregoing embodiments have been described, by way of example, in connection with the case of applying the present application to a horizontal-type window blind (Venetian window blind), embodiments of the present application are further applicable to a vertical-type window blind.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. An optical body comprising:
a first optical layer having a concave-convex surface;
a wavelength-selective reflecting layer formed on the concave-convex surface; and
a second optical layer formed on the wavelength-selective reflecting layer to embed the concave-convex surface,
the wavelength-selective reflecting layer having a multi-layer structure formed by successively stacking a first high refractive index layer, a metal layer, and a second high refractive index layer,
wherein, given that optical film thicknesses of the first high refractive index layer and the second high refractive index layer are x (nm) and y (nm), respectively, and a geometrical film thickness of the metal layer is z, x, y and z satisfy formula (1) when the refractive indices of the first high refractive index layer and of the second high refractive index layer are measured at a wavelength of 550 nm:

$$z \leq 12.1\exp\left\{-\frac{1}{2}\left(\frac{x-120}{145.17}\right)^2 - \frac{1}{2}\left(\frac{y-120}{123.14}\right)^2\right\} \quad (1)$$

where x and y are each 10 nm or more and 120 nm or less.

2. An optical body comprising:
a first optical layer having a concave-convex surface;
a wavelength-selective reflecting layer formed on the concave-convex surface; and
a second optical layer formed on the wavelength-selective reflecting layer to embed the concave-convex surface,
the wavelength-selective reflecting layer having a multi-layer structure formed by successively stacking a first high refractive index layer, a metal layer, and a second high refractive index layer,
wherein, given that optical film thicknesses of the first high refractive index layer and the second high refractive index layer are x (nm) and y (nm), respectively, and a geometrical film thickness of the metal layer is z, x, y and z satisfy formula (2) when the refractive indices of the first high refractive index layer and of the second high refractive index layer are measured at a wavelength of 550 nm:

$$z \leq 12.2\exp\left\{-\frac{1}{4}\left(\frac{x-y}{62.71}\right)^2 - \frac{1}{2}\left(\frac{0.70(x+y)-120}{99.41}\right)^2\right\} \quad (2)$$

where x and y each are 10 nm or more and 120 nm or less.

3. The optical body according to claim 1, wherein x, y and z further satisfy formula (3) when the refractive indices of the first high refractive index layer and of the second high refractive index layer are measured at a wavelength of 550 nm:

$$z \leq 12.1\exp\left\{-\frac{1}{2}\left(\frac{x-120}{121.57}\right)^2 - \frac{1}{2}\left(\frac{y-120}{107.57}\right)^2\right\} \quad (3)$$

where x and y each are 10 nm or more and 120 nm or less.

4. The optical body according to claim 2, wherein x, y and z further satisfy formula (4) when the refractive indices of the first high refractive index layer and of the second high refractive index layer are measured at a wavelength of 550 nm:

$$z \leq 11.8\exp\left\{-\frac{1}{4}\left(\frac{x-y}{61.22}\right)^2 - \frac{1}{2}\left(\frac{0.70(x+y)-110}{97.89}\right)^2\right\} \quad (4)$$

where x and y each are 10 run or more and 120 nm or less.

5. The optical body according to claim 3, wherein x, y and z further satisfy formula (5) when the refractive indices of the first high refractive index layer and of the second high refractive index layer are measured at a wavelength of 550 nm:

$$z \leq 9.70\exp\left\{-\frac{1}{2}\left(\frac{x-120}{147.139}\right)^2 - \frac{1}{2}\left(\frac{y-120}{121.942}\right)^2\right\} \quad (5)$$

where x and y each are 10 nm or more and 120 nm or less.

6. The optical body according to claim 4, wherein x, y and z further satisfy formula (6) when the refractive indices of the first high refractive index layer and of the second high refractive index layer are measured at a wavelength of 550 nm:

$$z \leq 9.72\exp\left\{-\frac{1}{2}\left(\frac{0.7(x-y)+5}{50.00}\right)^2 - \frac{1}{2}\left(\frac{0.70(x+y)-110}{134.16}\right)^2\right\} \quad (6)$$

where x and y each are 10 nm or more and 120 nm or less.

7. An optical body comprising:
a first optical layer having a concave-convex surface;
a wavelength-selective reflecting layer formed on the concave-convex surface; and
a second optical layer formed on the wavelength-selective reflecting layer to embed the concave-convex surface,
the wavelength-selective reflecting layer having a multi-layer structure formed by successively stacking a first high refractive index layer, a metal layer, and a second high refractive index layer, wherein, given that optical film thicknesses of the first high refractive index layer and the second high refractive index layer are x (nm) and y (nm), respectively, and a geometrical film thickness of the metal layer is z, x, y and z satisfy the formulae (1) and (2) when the refractive indices of the first high refractive index layer and of the second high refractive index layer are measured at a wavelength of 550 nm:

$$z \le 12.1\exp\left\{-\frac{1}{2}\left(\frac{x-120}{145.17}\right)^2 - \frac{1}{2}\left(\frac{y-120}{123.14}\right)^2\right\} \quad (1)$$

$$z \le 12.2\exp\left\{-\frac{1}{4}\left(\frac{x-y}{62.71}\right)^2 - \frac{1}{2}\left(\frac{0.70(x+y)-120}{99.41}\right)^2\right\} \quad (2)$$

where x and y each are 10 nm or more and 120 nm or less.

8. The optical body according to claim 1, wherein x, y and z satisfy relational expressions of 19.36 nm <x, y <135 nm, 7 nm <z<12 nm.

9. The optical body according to claim 1, wherein the high refractive index layer contains at least one selected from among a group including niobium oxide, zinc oxide, titanium oxide, and tantalum oxide, and the metal layer contains a silver alloy.

10. The optical body according to claim 1, wherein the high refractive index layer has a refractive index of 1.7 or more and 2.6 or less.

11. The optical body according to claim 1, wherein the wavelength-selective reflecting layer selectively directionally reflects light in a specific wavelength band while transmitting light other than the specific wavelength band therethrough, and a value of transmission image clarity for the light at wavelengths transmitting through the optical body is 50 or larger when measured in conformity with JIS K-7105 by using an optical comb with a comb width of 0.5 mm.

12. The optical body according to claim 1, wherein a total value of transmission image clarity for light at wavelengths transmitting through the optical body is 230 or larger when measured in conformity with JIS K-7105 by using optical combs with comb widths of 0.125 mm, 0.5 mm, 1.0 mm and 2.0 mm.

13. The optical body according to claim 1, wherein the concave-convex surface of the first optical layer is formed by arraying many structures in a one-dimensional pattern or a two-dimensional pattern, and the structures have a prism-like shape, a lenticular shape, a semispherical shape, or a corner cube shape.

14. The optical body according to claim 1, wherein the structures are arrayed at a pitch of 5μm or more and 5 mm or less.

15. The optical body according to claim 1, wherein a difference in refractive index between the first optical layer and the second optical layer is 0.010 or less.

16. The optical body according to claim 1, wherein the first optical layer and the second optical layer are made of a same resin having transparency in a visible range, and the second optical layer contains one or more additives.

17. The optical body according to claim 1, further comprising a water-repellent or hydrophilic layer on an incident surface of the optical body.

18. The optical body according to claim 1, wherein the optical body directionally reflects light in a specific wavelength band to prevent the light in the specific wavelength band from entering a predetermined space, while transmitting light other than the specific wavelength band therethrough to be taken into the predetermined space.

19. A window member comprising the optical body according to claim 1 affixed to a rigid member having transparency.

20. A fitting comprising a lighting portion provided with the optical body according to claim 1 and a frame member that is disposed in a peripheral portion of the optical body.

21. A solar shading device capable of adjusting a degree at which a solar shading member cuts off incident light, by winding or unwinding the solar shading member, or capable of adjusting a degree at which a group made up of plural solar shading members cuts off the incident light, by changing an angle of the solar shading member group, wherein the solar shading member comprises the optical body according to claim 1.

22. The optical body according to claim 1, further comprising a compound containing phosphoric acid in at least one of the first optical layer and the second optical layer.

23. The optical body according to claim 2, further comprising a compound containing phosphoric acid in at least one of the first optical layer and the second optical layer.

24. The optical body according to claim 7, further comprising a compound containing phosphoric acid in at least one of the first optical layer and the second optical layer.

25. The optical body according to claim 1, wherein the wavelength-selective reflecting layer having a multilayer structure formed by successively stacking only a first high refractive index layer, a metal layer, and a second high refractive index layer.

* * * * *